United States Patent
Wu et al.

(10) Patent No.: US 8,767,709 B2
(45) Date of Patent: Jul. 1, 2014

(54) METHODS AND APPARATUS RELATED TO SIGNALING REQUEST TO TRANSMIT TRAFFIC IN WIRELESS COMMUNICATIONS

(75) Inventors: Xinzhou Wu, Monmouth Junction, NJ (US); Junyi Li, Chester, NJ (US); Rajiv Laroia, Far Hills, NJ (US); Thomas Richardson, South Orange, NJ (US); Saurabh Tavildar, Jersey City, NJ (US)

(73) Assignee: QUALCOMM Incorporated, San Diego, CA (US)

(*) Notice: Subject to any disclaimer, the term of this patent is extended or adjusted under 35 U.S.C. 154(b) by 126 days.

(21) Appl. No.: 13/112,598

(22) Filed: May 20, 2011

(65) Prior Publication Data

US 2011/0216657 A1 Sep. 8, 2011

Related U.S. Application Data

(63) Continuation of application No. 11/933,009, filed on Oct. 31, 2007.

(51) Int. Cl.
*H04W 28/12* (2009.01)

(52) U.S. Cl.
USPC .......................................... 370/350; 455/502

(58) Field of Classification Search
None
See application file for complete search history.

(56) References Cited

U.S. PATENT DOCUMENTS

| | | | |
|---|---|---|---|
| 7,394,791 B2 * | 7/2008 | Proctor, Jr. ..................... | 370/335 |
| 2001/0031646 A1 | 10/2001 | Williams | |
| 2002/0077081 A1 | 6/2002 | Kido | |
| 2002/0186659 A1 * | 12/2002 | Hazama ........................ | 370/241 |
| 2004/0008627 A1 | 1/2004 | Garg et al. | |
| 2005/0030967 A1 * | 2/2005 | Ohmi et al. .................... | 370/445 |
| 2006/0050742 A1 | 3/2006 | Grandhi et al. | |
| 2006/0294217 A1 | 12/2006 | Chambers | |
| 2007/0053134 A1 | 3/2007 | Kramer | |
| 2007/0053315 A1 | 3/2007 | Sugaya | |

(Continued)

FOREIGN PATENT DOCUMENTS

| | | |
|---|---|---|
| EP | 1686744 | 8/2006 |
| JP | 2006325175 A | 11/2006 |

(Continued)

OTHER PUBLICATIONS

International Search Report and Written Opinion—PCT/US2008/062704, International Search Authority—European Patent Office—Oct. 10, 2008.

(Continued)

*Primary Examiner* — Jianye Wu
(74) *Attorney, Agent, or Firm* — James K. O'Hare

(57) ABSTRACT

Methods and apparatus related to the communication of traffic in peer to peer communications are described. A peer to peer communications system includes traffic slots, and for a pair of devices (first and second) having a connection a first transmission request resource and a second transmission request resource are associated with a traffic transmission interval of the traffic slot, the first request resource preceding the second request resource. The first device can utilize the first resource to transmit a request to transmit traffic to the second device, and when it does, it also uses the second resource to transmit additional information corresponding to the request and/or traffic. If the second device doesn't detect a request on the first resource, then it can use the second resource to transmit a request to first device to transmit traffic to the first device.

44 Claims, 23 Drawing Sheets

(56) References Cited

U.S. PATENT DOCUMENTS

| | | | |
|---|---|---|---|
| 2007/0124449 A1* | 5/2007 | Kang | 709/223 |
| 2008/0144493 A1* | 6/2008 | Yeh | 370/230 |
| 2009/0019165 A1 | 1/2009 | Li et al. | |
| 2009/0109949 A1 | 4/2009 | Wu et al. | |

FOREIGN PATENT DOCUMENTS

| | | |
|---|---|---|
| JP | 2008510380 A | 4/2008 |
| TW | M292848 | 6/2006 |
| TW | I272785 B | 2/2007 |
| WO | WO2004103009 | 11/2004 |

OTHER PUBLICATIONS

International Search Report and Written Opinion—PCT/US2008/062706, International Search Authority—European Patent Office—Oct. 13, 2008.

Taiwan Search Report—TW097117290—TIPO—Dec. 16, 2011.

Taiwan Search Report—TW097117299—TIPO—Oct. 19, 2011.

\* cited by examiner

METHODS AND APPARATUS RELATED TO SIGNALING REQUEST TO TRANSMIT TRAFFIC IN WIRELESS COMMUNICATIONS

CROSS-REFERENCE TO RELATED APPLICATION

This application is a continuation of U.S. patent application Ser. No. 11/933,009, filed 31 Oct. 2007 and entitled "METHODS AND APPARATUS RELATED TO SIGNALING REQUEST TO TRANSMIT TRAFFIC IN A WIRELESS COMMUNICATIONS SYSTEM," the disclosure of which is hereby incorporated by reference herein in its entirety.

FIELD

Various embodiments are directed to methods and apparatus for wireless communications and, more particularly, to method and apparatus for use in peer to peer wireless communication.

BACKGROUND

In peer to peer communications system a pair of wireless terminals having a connection generally desires to exchange traffic signals. An approach of strictly defining a first set of air link resources reserved for traffic flow in a first direction and a second set of air link resources reversed for traffic flow in a second direction, said first and second sets being non-overlapping, leads to wasted resources when flow levels do not match the predefined sets. An approach of allowing either wireless terminal of the pair to transmit a traffic request as needed on a shared request resource can lead to collisions where neither request is recovered and/or approved resulting in the traffic resource, e.g., traffic segment, being requested being wasted. Accordingly, there is a need for improved methods and apparatus related to control signaling in a peer to peer wireless communications system.

It would be beneficial if methods and apparatus were developed which facilitated efficient control signaling related to peer to peer traffic signaling. In a peer to peer communications in which a pair of connected wireless terminals utilizes the same frequency band for both transmission and reception, it is desirable to avoid transmission collisions which tend to waste air link resources. Methods and apparatus that facilitate coordination between transmission and receptions of connected peers would be beneficial. Methods and apparatus which provide flexibility, allowing for different balances of directional traffic flows between a connected pair of wireless terminals at different times and/or are responsive to different priority considerations, would also be beneficial.

It would also be beneficial if at least some methods and apparatus provided for communicating additional information corresponding to a request to transmit peer to peer traffic signals. It would be advantageous if the additional information could be communicated using a resource that was designated to be utilized for another purpose when such a request was not communicated.

SUMMARY

Various embodiments are directed to methods and apparatus for wireless communications and are well suited for use in a peer to peer communications system. Consider that a pair of peer to peer wireless communications devices has established a connection and wishes to communicate traffic signals. Some embodiments utilize an implemented recurring timing structure including a plurality of traffic transmission intervals and sets of air link resources associated with each transmission traffic interval. For example, corresponding to a pair of peer to peer communications devices having a peer to peer connection, for a particular traffic slot, there is a first transmission request resource associated with the first communications device and a second transmission request resource associated with the second communications device, the first transmission request resource preceding the second transmission request resource. There is also gap between the first and second transmission request resources to allow for the latency involved when a communications device switches from the transmit mode to receive mode or vice versa.

The first communications device utilizes the first transmission request resource to transmit a request to transmit data to the second communications device during the associated transmission traffic interval. When the first device transmits a request on the first transmission request resource, the first device also utilizes the second transmission request resource to transmit additional information pertaining to the request and/or traffic to be transmitted, e.g., quality of service information and/or power level information. When, the first device does not utilize the first transmission request resource to send a request, the first device monitors the second transmission request resource to detect a request by the second communications device to transmit data in the transmission traffic interval to the first communications device. Thus, the second transmission request resource serves different purposes at different times.

The second communications device utilizes the first transmission request resource to monitor for a request from the first communications device, the request being a request to transmit data to the second communications device during the associated transmission traffic interval. If the second communications device receives a request from the first communications device on the first transmission request resource, then the second device monitors the second transmission request resource to receive an additional signal from the first device communicating additional information from the first device relating to the request and/or traffic signals, e.g., quality of service information and/or power level information. If the second device has not received a request on the first transmission request resource, then the second device can, and sometimes does, utilize the second transmission request resource to transmit a transmission request to the first device corresponding to the same transmission traffic interval, the request being a request to transmit traffic to the first device.

In some embodiments, there is a shared request response resource, which occurs subsequent to both of the transmission request resources but prior to the transmission interval. This shared request response resource is used to communicate a positive request response acknowledgement corresponding to either of the potential requests. From the perspective of the first wireless communications device, its setting of receive mode or transmit mode during a particular interval in unambiguous, and this is advantageous to avoid collisions which waste air link resources. For example, the first wireless communications device is controlled to be in transmit mode during the first transmission request interval and second transmission request interval when it desires to transmit a request, and is controlled to be in a receive mode during the second transmission request interval when it has not transmitted a request in the first transmission request interval. The receive or transmit settings during the request response interval and during traffic transmission interval are in accordance with the request signaling communicated between the peers. From the perspective of the second wireless communications device, its setting of receive mode or transmit mode during a particular interval in unambiguous, and this is advantageous to avoid collisions which waste air link resources, e.g., waste a traffic segment. For example, the second wireless communications device is controlled to be in receive mode during the first transmission request interval, is controlled to be in a receive mode during the second transmission request interval when it has received a request during the first transmission request interval, is controlled to be in a transmit mode during the second transmission request interval when it has data to transmit and has not received a request in the first transmission request interval. The receive or transmit settings for the second communications device during the request response interval and during traffic transmission interval are in accordance with the request signaling communicated between the peers and rules in effect.

In some embodiments, a request signal utilizes a relatively small amount of air link resources, e.g., a single OFDM tone for the duration of one OFDM symbol transmission time interval. The dual functionality of the second transmission request resource facilitates the communication of additional information corresponding to a request. The use of a shared request response resource, instead of individual request response resources corresponding to each request resource, reduces the amount of air link resources allocated for overhead, and makes available more air link resources to carry traffic signals.

An exemplary method of operating a first communications device to communicate with a second communications device in a system will be described. The system has a plurality of transmission units, each transmission unit communicating at least one symbol, a first pair of said transmission units corresponding to a first pair of communications devices, said first pair of communications devices including said first and second communications devices, the first and second communications devices having an existing connection, said first pair of transmission units including a first transmission unit corresponding to the first device and a second transmission unit corresponding to the second device, the first and second transmission units being non-overlapping in time, the first transmission unit preceding the second transmission unit. The exemplary method comprises: transmitting on the first transmission unit a first signal indicating a request to transmit to said second device; and transmitting data in a data transmission interval to the second device, said data transmission interval occurring subsequent to said second transmission unit. In various embodiments, the method further comprises: prior to transmitting data in the data transmission interval, transmitting a second signal in the second transmission unit, said second signal conveying additional information corresponding to the data.

An exemplary first communications device for use in a system including a second communications device will be described. The system has a plurality of transmission units, each transmission unit communicating at least one symbol, a first pair of said transmission units corresponding to a first pair of communications devices, said first pair of communications devices having a connection, said first pair of communications devices including said first and second communications devices, said first pair of transmission units including a first transmission unit corresponding to the first device and a second transmission unit corresponding to the second device, the first and second transmission units being non-overlapping in time, the first transmission unit preceding the second transmission unit. The exemplary first communications device comprises: a wireless transmitter module for transmitting on the first transmission unit a first signal indicating a request to transmit to said second device; and for transmitting data in a data transmission interval to the second device, said data transmission interval occurring subsequent to said second transmission unit; and a first signal generation module for generating said first signal prior to transmitting said first signal. In various embodiments, the first communications device further comprises a second signal generation module for generating a second signal, e.g., a second signal communicating additional information, and the wireless transmitter module transmits the generated second signal in the second transmission unit prior to transmitting data in the data transmission interval.

An exemplary method of operating a second communications device to communicate with a first communications device in a system will be described. The system has a plurality of transmission units, each transmission unit communicating at least one symbol, a first pair of said transmission units corresponding to a first pair of communications devices, said first pair of communications devices including said first and second communications devices, the first and second communications devices having an existing connection, said first pair of transmission units including a first transmission unit corresponding to the first device and a second transmission unit corresponding to the second device, the first and second transmission units being non-overlapping in time, the first transmission unit preceding the second transmission unit. The exemplary method comprises: monitoring the first transmission unit to detect a first signal from the first device requesting permission to transmit to the second device; if a first signal is detected in the first transmission unit, receiving in a data transmission interval corresponding to the first transmission unit and occurring subsequent to said second transmission unit. In various embodiments, the method further comprises: when the first signal has been detected from the first communications device on the first transmission unit, receiving a second signal from the first communications device on the second transmission unit, prior to receiving in said data transmission interval.

An exemplary second communications device for use in a system including a first communications device will be described. The system has a plurality of transmission units, each transmission unit communicating at least one symbol, a first pair of said transmission units corresponding to a first pair of communications devices having a connection, said first pair of communications devices including said first and second communications devices, said first pair of transmission units including a first transmission unit corresponding to the first device and a second transmission unit corresponding to the second device, the first and second transmission units being non-overlapping in time, the first transmission unit preceding the second transmission unit. The exemplary second communications device comprises: a monitoring module for monitoring the first transmission unit to detect a signal from the first device; a wireless transmitter module for transmitting a request to transmit data on the second transmission unit when a signal from the first device is not detected on the first transmission unit and when the second device has data to transmit to the first device, and for transmitting data to the first device during the transmission time interval corresponding to said second transmission unit following a transmitted request on the second transmission unit. In various embodiments, the second communications device further comprises: an additional information recovery module for recovering additional information from a second signal from the first communications device communicated on the second transmission unit if the second communications device has detected a signal from the first device on the first transmission unit.

While various embodiments have been discussed in the summary above, it should be appreciated that not necessarily all embodiments include the same features and some of the features described above are not necessary but can be desirable in some embodiments. Numerous additional features, embodiments and benefits are discussed in the detailed description which follows.

DETAILED DESCRIPTION

Figure 1:
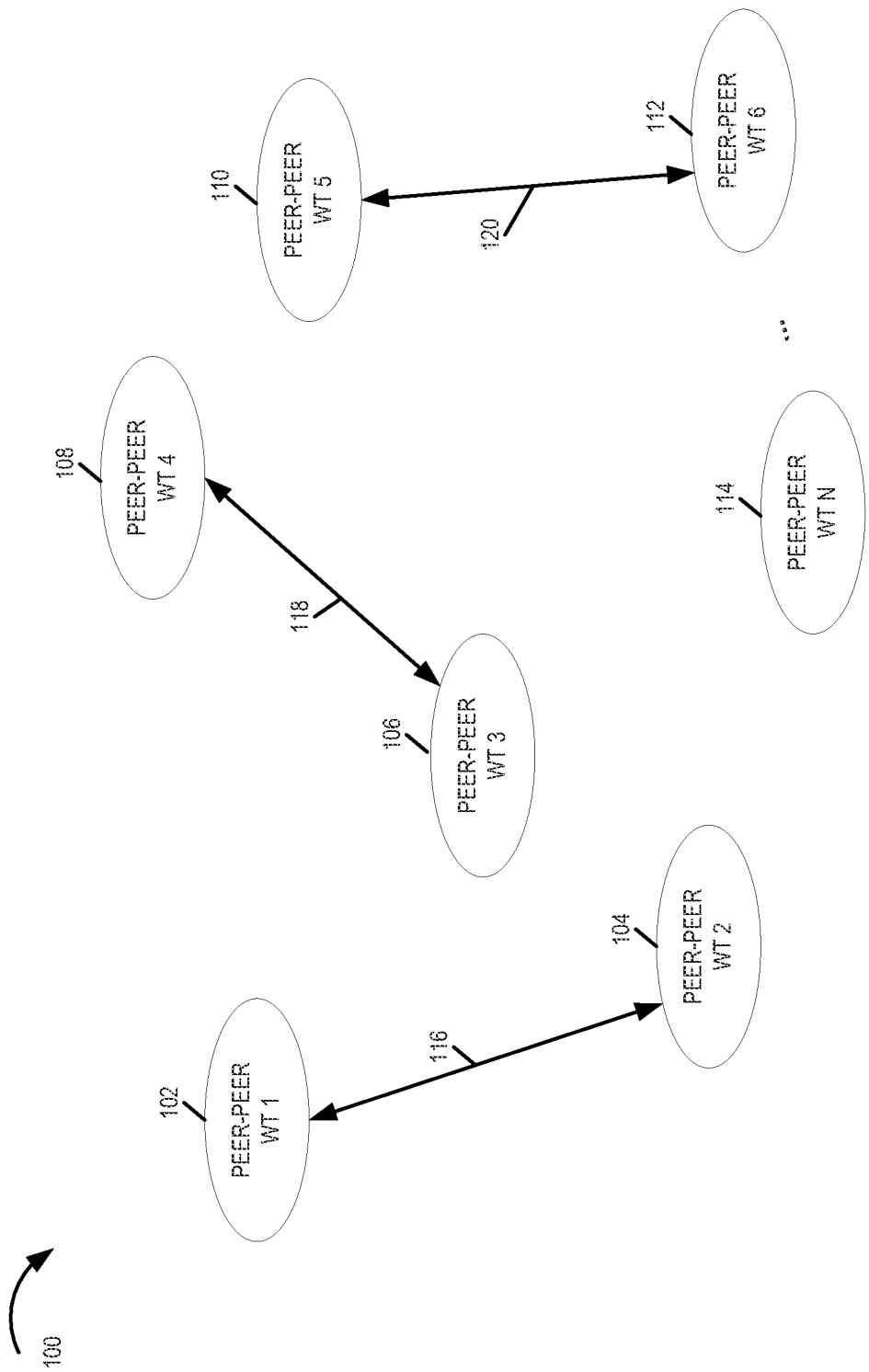
FIG. 1 is a drawing of an exemplary peer to peer wireless communications system in accordance with various embodiments.

FIG. 1 is a drawing of an exemplary peer to peer wireless communications system 100 in accordance with various embodiments. Exemplary wireless communications system 100 includes a plurality of wireless terminals, e.g., mobile nodes, supporting peer to peer communications (peer to peer wireless terminal 1 102, peer to peer wireless terminal 2 104, peer to peer wireless terminal 3 106, peer to peer wireless terminal 4 108, peer to peer wireless terminal 5 110, peer to peer wireless terminal 6 112, . . . , peer to peer wireless terminal N 114). In this example, at the time represented by FIG. 1, peer to peer wireless terminal 1 102 has an active connection with peer to peer wireless terminal 2 104 as indicated by arrow 116; peer to peer wireless terminal 3 106 has an active connection with peer to peer wireless terminal 4 108 as indicated by arrow 118; and peer to peer wireless terminal 5 110 has an active connection with peer to peer wireless terminal 6 112 as indicated by arrow 120.

In accordance with a feature of various embodiments, a decision whether or not to transmit on a peer to peer air link traffic resource, e.g., a peer to peer traffic segment, is performed in a distributed manner with both the transmission node and receiving node having an input into the decision process. In various embodiments, interference considerations regarding other peer to peer communications devices which may desire to transmit on the same peer to peer air link traffic resource are considered in making a transmission decision. In some such embodiments, monitored peer to peer signals from peer to peer devices with which a peer to peer device does not have an active connection are used in the transmission decision process.

In some embodiments, following a transmission request to transmit traffic signals, both the intended receiving device and the intended transmission device have an opportunity to yield to other peer to peer devices and refrain from allowing the requested peer to peer traffic signaling to proceed.

In some embodiments, following the transmission device's decision to transmit traffic and prior to transmission of said traffic, the transmission device transmits a peer to peer pilot signal. In some such embodiments, the peer to peer pilot signal is utilized by the receiving device to determine information, which is to be used to determine a data rate for the traffic data. In some embodiments, the air link resource conveying the traffic signals also conveys data rate information of the traffic.

Figure 2:
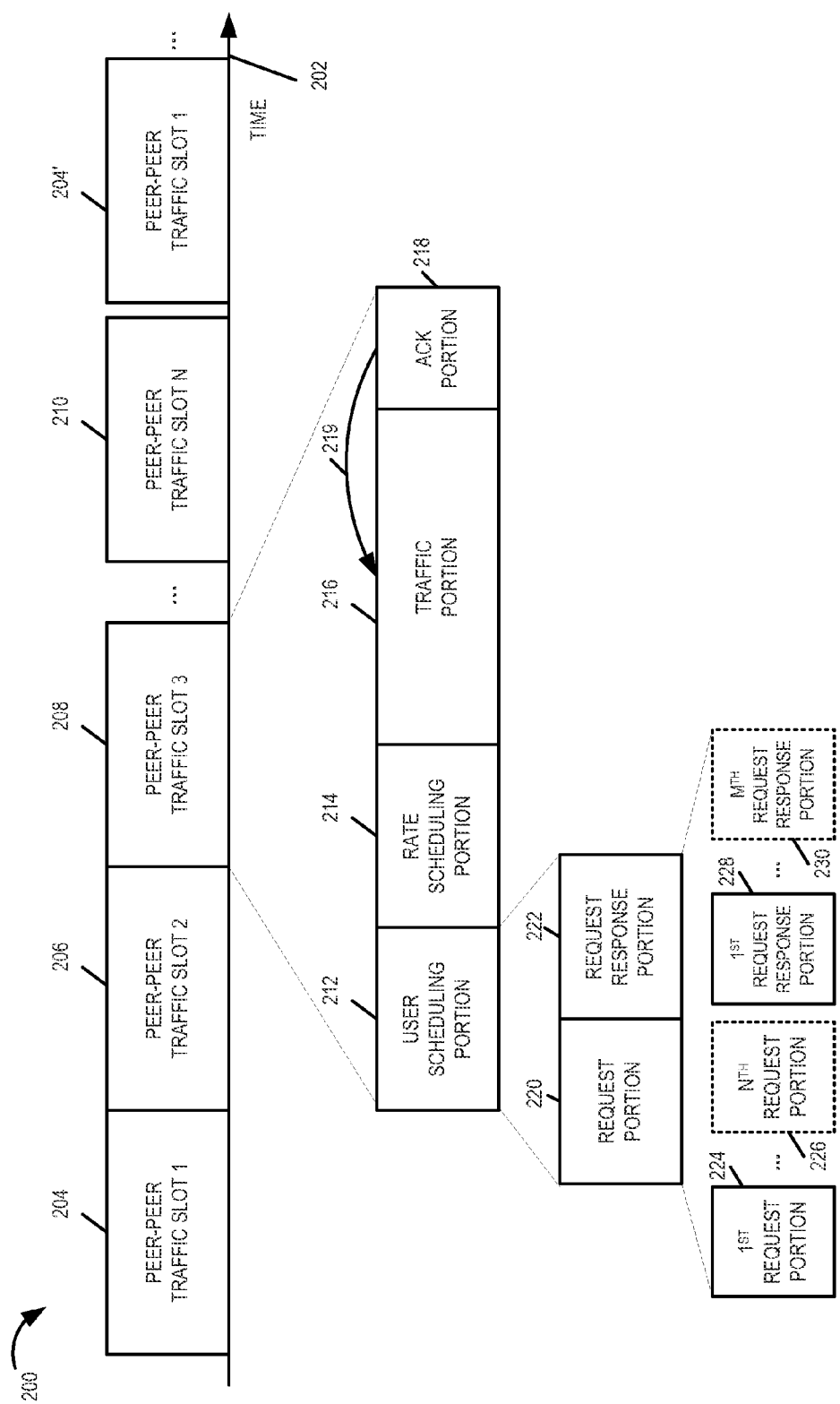
FIG. 2 is a drawing of exemplary peer to peer traffic slots in accordance with various embodiments.

FIG. 2 is a drawing 200 of exemplary peer to peer traffic slots in accordance with various embodiments. Drawing 200 illustrates an exemplary sequence of peer to peer traffic slots (peer to peer traffic slot 1 204, peer to peer traffic slot 2 206, peer to peer traffic slot 3 208, . . . , peer to peer traffic slot N 210) along time axis 202. In this exemplary embodiment, the sequence repeats as part of a recurring timing structure as indicated by peer to peer traffic slot 1 204' following peer to peer traffic slot N 210.

The exemplary drawing 200 is, e.g., a logical representation. In some embodiments, logical structure communications resources are mapped to physical air link resources. For example, peer-to-peer traffic slot 208 is shown to include user scheduling portion 212, rate scheduling portion 214, traffic portion 216, and acknowledgment portion 218, and those portions are adjacent to each other. The physical air link resources associated with those portions may have time gaps between them, e.g., to allow processing time. In some embodiments, tone hopping is implemented as part of the mapping.

Each exemplary peer to peer traffic slot, in some embodiments, includes a user scheduling portion, a rate scheduling portion, a traffic portion and an acknowledgement portion. In one exemplary embodiment, an exemplary peer to peer traffic slot, e.g., peer to peer traffic slot 3 208 includes user scheduling portion 212, rate scheduling portion 214, traffic portion 216 and acknowledgement portion 218. Acknowledgement portion 218 corresponds to traffic portion 216 as indicated by arrow 219.

The user scheduling portion 212 includes a request portion 220 for conveying traffic transmission request signals, e.g., a TX request signal, and a request response portion 222 for conveying traffic transmission request response signals, e.g., an RX echo signal. The request portion 220 includes a first request portion 224 and, in some embodiments, includes additional request portions, e.g., Nth request portion 226. The request response portion 222 includes a $1^{st}$ request response portion 228 and, in some embodiments, includes additional request response portions, e.g., Mth request response portion 230.

This exemplary representation of FIG. 2 may be, and in some embodiments is, a logical representation of slots. For example, the air link resources corresponding to logical peer to peer traffic slot 1 204 may include a set of tone-symbols some of which are non-contiguous.

Figure 3:
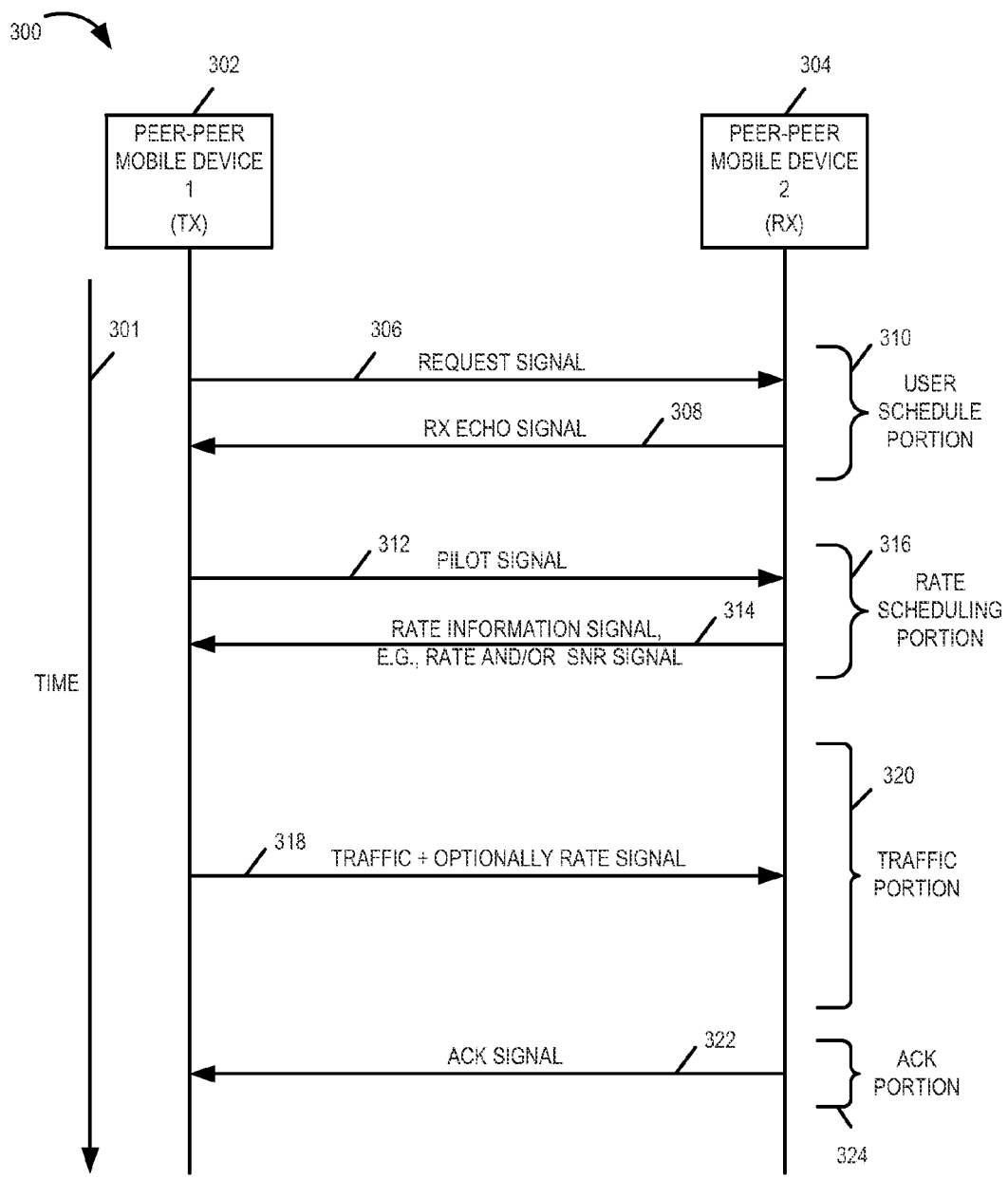
FIG. 3 is a drawing illustrating exemplary peer to peer mobile communications devices and exemplary signaling exchanged between the devices to support peer to peer traffic in accordance with various embodiments.

FIG. 3 is a drawing 300 illustrating peer to peer mobile communications devices (302, 304) and exemplary signaling exchanged between the devices (302, 304) to support peer to peer traffic in accordance with various embodiments, e.g., under the situation where the first device wants to send traffic in the slot and the second device does not or under the situation where both devices may desire to transmit traffic but the first device has priority. The communications devices (302, 304) may be any of the peer to peer wireless terminals of FIG. 1. In this example, peer to peer mobile device 1 302 desires to transmit traffic signals to peer to peer mobile device 2 304. Line 301 indicates time; and there is a user scheduling portion 310, followed by a rate scheduling portion 316, followed by a traffic portion 320, followed by an acknowledgment portion 324.

During the user scheduling portion 310, peer to peer mobile device 1 302 generates and transmits request signal 306. Peer to peer mobile device 2 304, the intended recipient of request signal 306 receives request signal 306, processes the signal, considers the request, and sends an RX echo signal 308, if it approves of the request. If it does not approve the request, the peer to peer mobile device 2 304 does not send a response.

During rate scheduling portion 316, the peer to peer mobile communications device 1 302 sends pilot signal 312. Peer to peer mobile device 2 304 receives the pilot signal 312, measure the received signal strength, and generates a rate information signal 314. The rate information signal 314 communicates, e.g., a rate, an SNR value, an interference value, and/or an SIR value, so that peer to peer mobile device 1 302 can determine a maximum allowable data rate to be used during subsequent traffic portion 320. Peer to per mobile device 2 304 transmits the generated rate information signal 314 to peer to peer mobile device 1 302.

Peer to peer mobile device 1 302 receives the rate information signal 314 and determines a maximum allowed transmission rate to be used for traffic portion 320. Peer to peer mobile device 1 302 determines an actual data rate to use as a function of the determined maximum allowed transmission rate, wherein the actual data rate is less than or equal to the maximum allowed transmission rate. In various embodiments, the peer to peer mobile device 1 302 also considers (i) the amount of traffic data waiting to be communicated and/or (ii) its power status, e.g., remaining battery power and/or mode of operation, in determining the actual transmission data rate to use for the traffic.

Peer to peer mobile device 1 302 generates and transmits traffic signals 318 during traffic portion 320. The traffic signals communicate data at the determined actual data rate. In some embodiments, the traffic signals also carry an indication of the actual data rate. In one such embodiment, the rate information is communicated using a subset of the resources allocated for the traffic, e.g., the traffic resource includes a first portion, e.g., a first set of OFDM tone symbols, allocated to carry rate information, and a second portion, e.g., a second set of OFDM tone symbols, allocated to carry the traffic, e.g., user data, wherein the first and second sets are non-overlapping. In another such embodiment, the rate information is communicated using the same resources carrying traffic, e.g., the rate information is communicated via varying the transmit power of modulation symbols carrying traffic signals, e.g., some OFDM tone-symbols carrying the traffic are scaled at a first power level and others are scaled at a second power level, and the rate information is communicated by which positions are scaled at which levels.

Peer to peer mobile device 2 304 receives traffic signals 318 during traffic portion 320 and recovers the data being communicated. In some embodiments, rate information is also communicated with the traffic data. In some such embodiments, peer to peer mobile device 2 304 recovers the communicated rate information being communicated, and then decodes the traffic data signals. The peer to peer mobile device 2 304 determines whether or not the communicated data of the traffic signals 318 has been successfully recovered and generates a positive or negative acknowledgement signal.

During acknowledgment portion 324, the peer to peer mobile device 2 304 transmits the generated ACK signal 322 to mobile peer to peer to peer device 1 302. Peer to peer mobile device 1 302 receives the ACK signal 322, and updates transmission queue information based on the information conveyed by ACK signal 322.

Note that if peer to peer mobile device 1 302 does not receive an RX echo signal or subsequently decides not to proceed with transmission, the device 302 does not transmit pilot signal 312 and can terminate operation with regard to this traffic slot. Similarly, if peer to peer mobile device 304 decides not to proceed with transmission after it receives the request signal 306, the mobile device 304 does not transmit an RX echo signal and can terminate operation with regard to this traffic slot.

The process is repeated for additional traffic slots, e.g., as a function of traffic transmission needs of peer to per mobile device 1 302.

Figure 4:
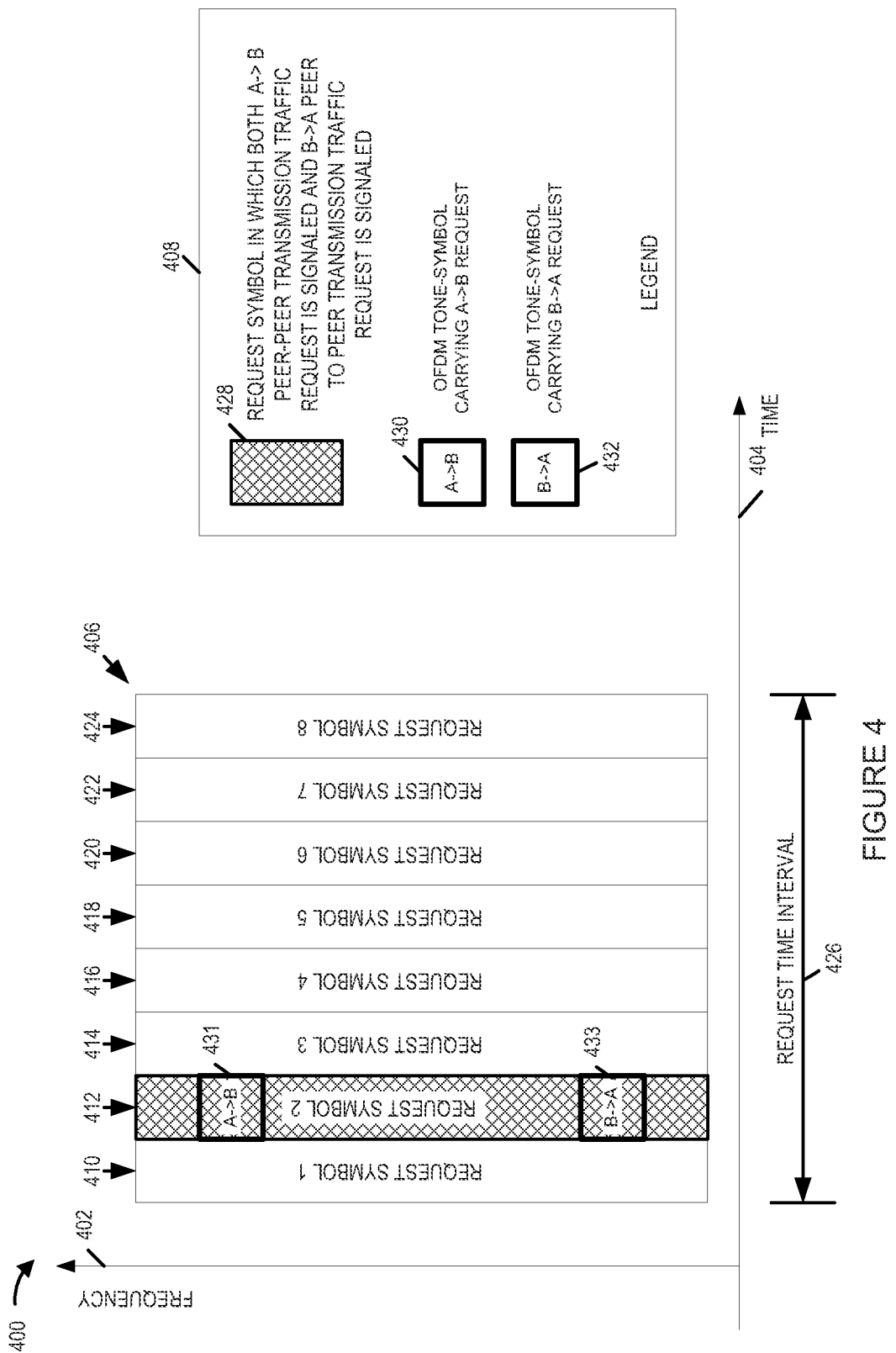
FIG. 4 is a drawing illustrating an exemplary problematic condition where two half-duplex peer to peer communications devices are attempting to signal requests to each other concurrently.

FIG. 4 is a drawing 400 illustrating an exemplary problematic condition where two half-duplex peer to peer communications devices are attempting to signal requests to each other concurrently. In this example, the peer to peer wireless terminals of a connected pair (WT A and WT B) can each transmit a request to use a transmission traffic interval, and the request structure is such that requests are not precluded from colliding. In this example, two peer to peer communications devices having an existing connection, WT A and WT B, each signal a request in the same request symbol. Since both start to transmit at the same time, both will be in transmit mode and will not be listening; therefore, the request signals will not be received.

Drawing 400 includes a vertical axis 402 representing frequency, e.g., OFDM tones, and a horizontal axis 404 representing time, e.g., symbol transmission time intervals. Drawing 400 includes request air link resource 406 which occurs during request time interval 426 and corresponding to a transmission traffic interval, e.g., a peer to peer traffic segment which occurs subsequent to the request time interval 426. Request air link resource 406 includes a plurality of request symbols (request symbol 1 410, request symbol 2 412, request symbol 3 414, request symbol 4 416, request symbol 5 418, request symbol 6 420, request symbol 7 422, request symbol 8 424). Legend 408 identifies that in this example a request symbol in which both an A->B peer to peer transmission traffic request is signaled by WT A and a B->A peer to peer transmission traffic request is signaled by WT B is indicated by crosshatch shading as indicated by block 428. In this example, request symbol 2 412 is such a symbol. Legend 408 indicates that an OFDM tone-symbol, e.g., a basic unit of air link resource comprising one OFDM tone for the duration of one symbol transmission time interval, carrying an A->B request is indicated by a square with designation A->B as shown by sample 430 in legend 408, and represented by square 431 in request symbol 412. Legend 408 also indicates that an OFDM tone-symbol carrying a B->A request is indicated by a square with designation B->A as shown by sample 432 in legend 408 and represented by square 433 in request symbol 412.

If both devices signal an intent to transmit to each other during the same request symbol, as in this example, a conflict is created. Both devices with have been in transmit mode concurrently and neither will see the other's request. Therefore, neither will generate and send a positive request response signal and neither will receive a positive request response signal. Therefore neither will transmit during the corresponding traffic transmission interval, even though both want to communicate traffic during that traffic transmission interval. Thus in this exemplary embodiment, a deadlock condition can, and sometimes does, occur, and the transmission slot can be wasted.

Figure 5:
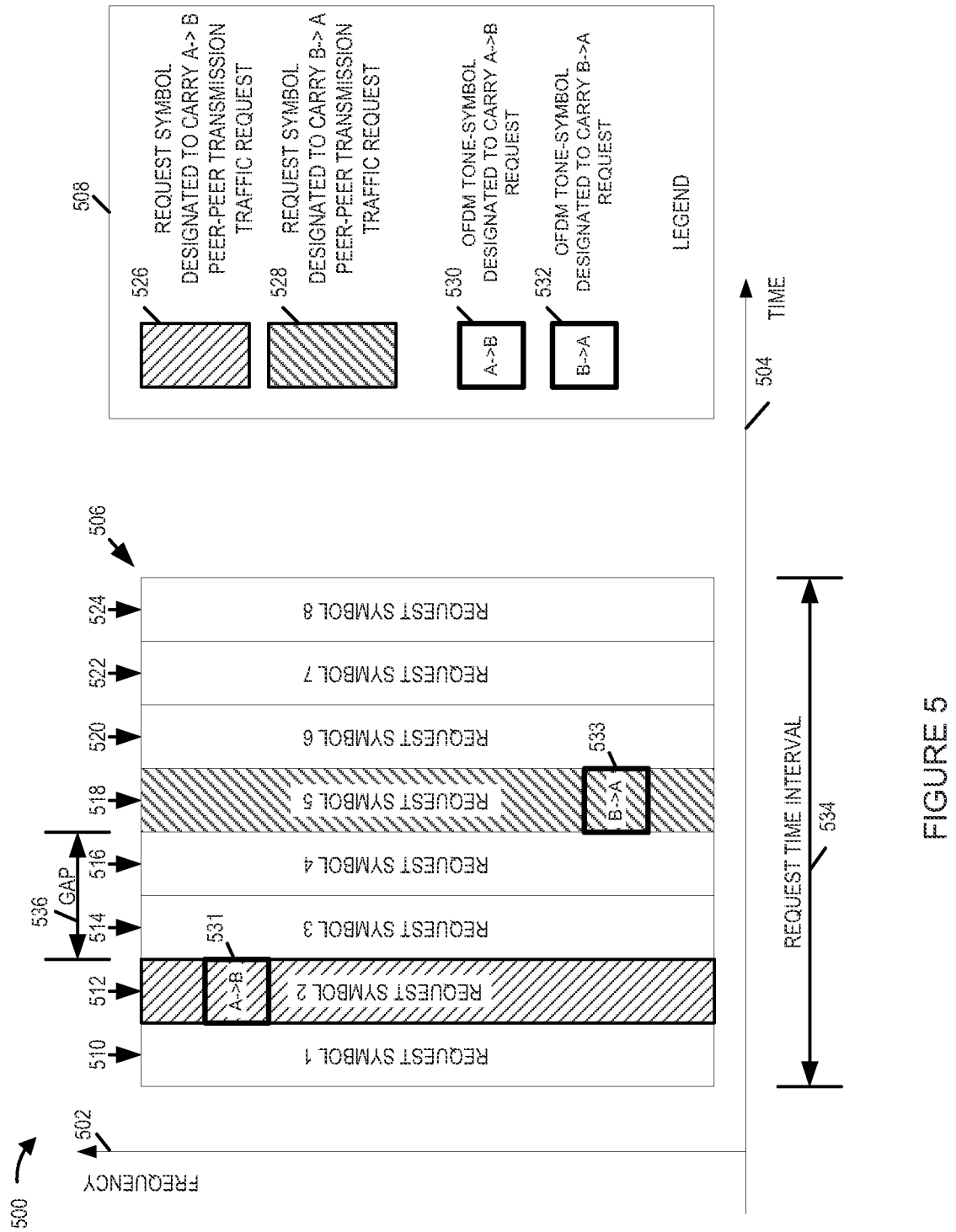
FIG. 5 illustrates an exemplary embodiment in which the request structure is intentionally coordinated such as to prevent the conflict condition from occurring as shown in FIG. 4.

FIG. 5 illustrates an exemplary embodiment in which the request structure is intentionally coordinated such as to prevent the conflict condition from occurring as shown in FIG. 4. In this example, request resources corresponding to a connected pair are intentionally structured such that a request from a first wireless terminal of the pair directed to a second wireless terminal of the pair occurs on a different request symbol than a request from a second wireless terminal of the pair to the first wireless terminal of the pair. In addition, there is an intentional gap between the two request symbols which may carry the requests such as to allow wireless terminal device reconfiguration between transmit to receive mode and receive to transmit mode.

Drawing 500 includes a vertical axis 502 representing frequency, e.g., OFDM tones, and a horizontal axis 504 representing time, e.g., symbol transmission time intervals. Drawing 500 includes request air link resource 506 which occurs during request time interval 534 and corresponding to a transmission traffic interval, e.g., a peer to peer traffic segment which occurs subsequent to the request time interval 534. Request air link resource 506 includes a plurality of request symbols (request symbol 1 510, request symbol 2 512, request symbol 3 514, request symbol 4 516, request symbol 5 518, request symbol 6 520, request symbol 7 522, request symbol 8 524). Legend 508 identifies that in this example a request symbol designated to carry an A->B peer to peer transmission traffic request to be signaled by WT A is indicated by descending slanted line shading from left to right as indicated by block 526. In this example, request symbol 2 512 is such a symbol. Legend 508 also identifies that in this example a request symbol designated to carry a B->A peer to peer transmission traffic request to be signaled by WT B is indicated by ascending slanted line shading from left to right as indicated by block 528. In this example, request symbol 5 518 is such a symbol. Legend 508 indicates that an OFDM tone-symbol, e.g., a basic unit of air link resource comprising one OFDM tone for the duration of one symbol transmission time interval, designated to carry an A->B request is indicated by a square with designation A->B as shown by sample 530 in legend 508, and represented by square 531 in request symbol 512. Legend 508 also indicates that an OFDM tone-symbol carrying a B->A request is indicated by a square with designation B->A as shown by sample 532 in legend 508 and represented by square 533 in request symbol 518. Note that there is a gap 536 between the two request symbols (512, 518) which correspond to the pair to allow for device reconfiguration, e.g., device A can reconfigure from transmitter mode to receiver mode during gap 536, while device B can reconfigure from receive mode to transmitter mode during the gap 536.

Figure 6:
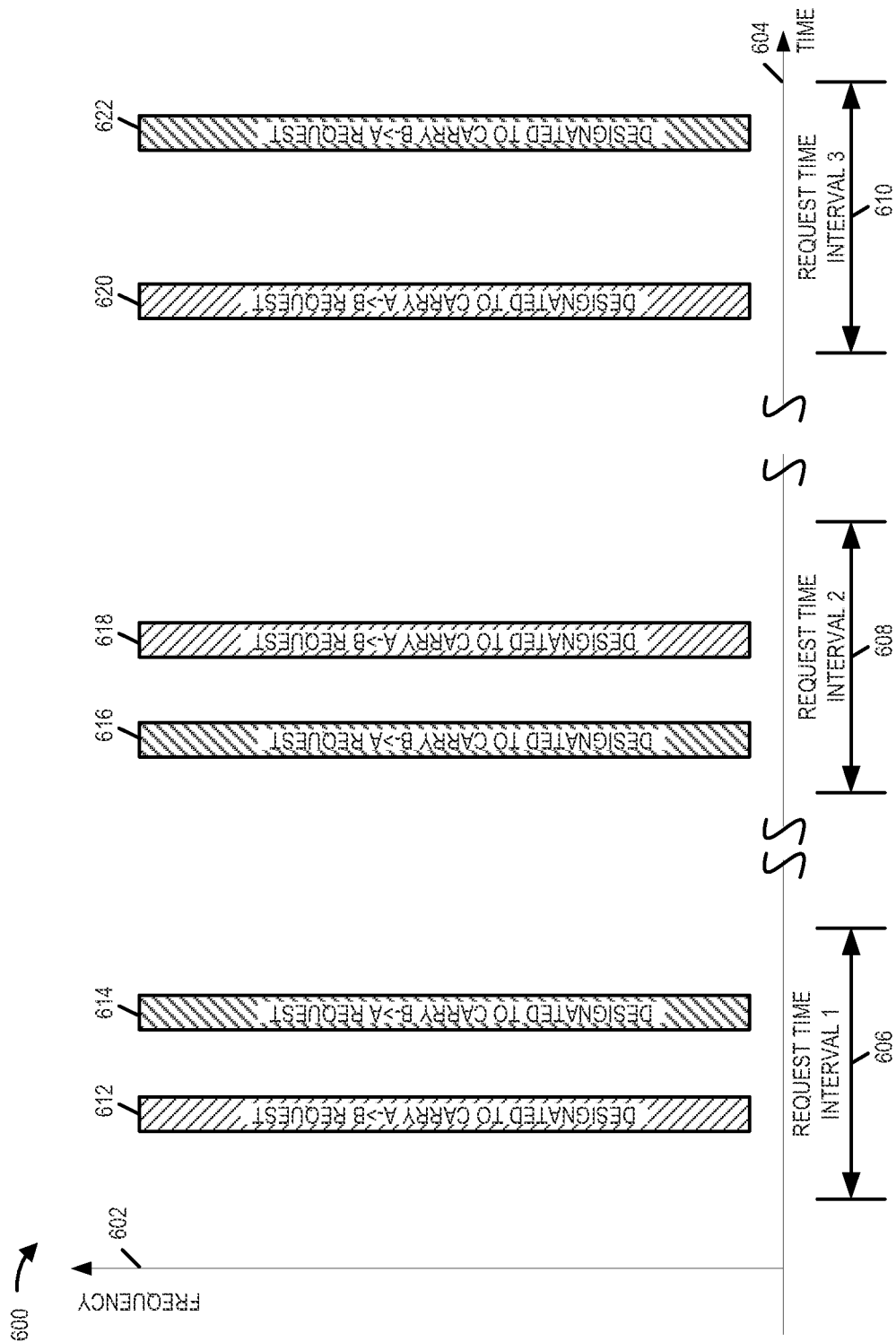
FIG. 6 illustrates an exemplary embodiment in which the order of the traffic transmission request symbols corresponding to a pair of request positions for a pair of peer to peer wireless terminals, having an existing connection, vary from one traffic slot to the next.

FIG. 6 illustrates an exemplary embodiment in which the order of the traffic transmission request symbols corresponding to a pair of request positions for a pair of peer to peer wireless terminals having an existing connection varies from one traffic slot to the next. In some such embodiments, the position of the request opportunity conveys priority information, e.g., the WT which has the first request position gets priority for that particular slot. Drawing 600 includes a vertical axis 602 representing frequency, e.g., OFDM tones, and a horizontal axis 604 representing time, e.g., symbol transmission time intervals in a recurring timing structure.

Requests during request time interval 1 606 corresponding to a first traffic transmission time interval, e.g., traffic segment, which is subsequent to request time interval 1 606. In request time interval 1 606, request symbol 612 is designated to carry an A->B peer to peer transmission traffic request from WT A directed to WT B; request symbol 614 is designated to carry a B->A peer to peer transmission traffic request from WT B directed to WT A; and request symbol 612 precedes request symbol 614. In request time interval 2 608, request symbol 616 is designated to carry a B->A peer to peer transmission traffic request from WT B directed to WT A; request symbol 618 is designated to carry an A->B peer to peer transmission traffic request from WT A directed to WT B; and request symbol 616 precedes request symbol 618. In request time interval 3 610, request symbol 620 is designated to carry an A->B peer to peer transmission traffic request from WT A directed to WT B; request symbol 622 is designated to carry a B->A peer to peer transmission traffic request from WT B directed to WT A; and request symbol 620 precedes request symbol 622.

In this example, for any give request slot corresponding to a pair of peer to peer wireless terminals having a connection, there are at least two request symbols which are non-overlapping, a first request symbol associated with a first direction with regard to the pair and a second request symbol associated with a second direction with regard to the pair, and there is a gap between the two symbols to allow for transmitter/receiver turnaround at a given device.

In some embodiments, the order as to which request opportunity position with regard to slot is predefined in the structure. In some embodiments, the order varies, e.g., in accordance with a pseudo-random function known to the pair of wireless terminals. In various embodiments, the order is biased to favor one direction over the other. In some such embodiments, the bias is established at set-up, e.g., when a connection between the two wireless terminals is established. In some embodiments, the bias is negotiated between the two wireless terminals.

Figure 7:
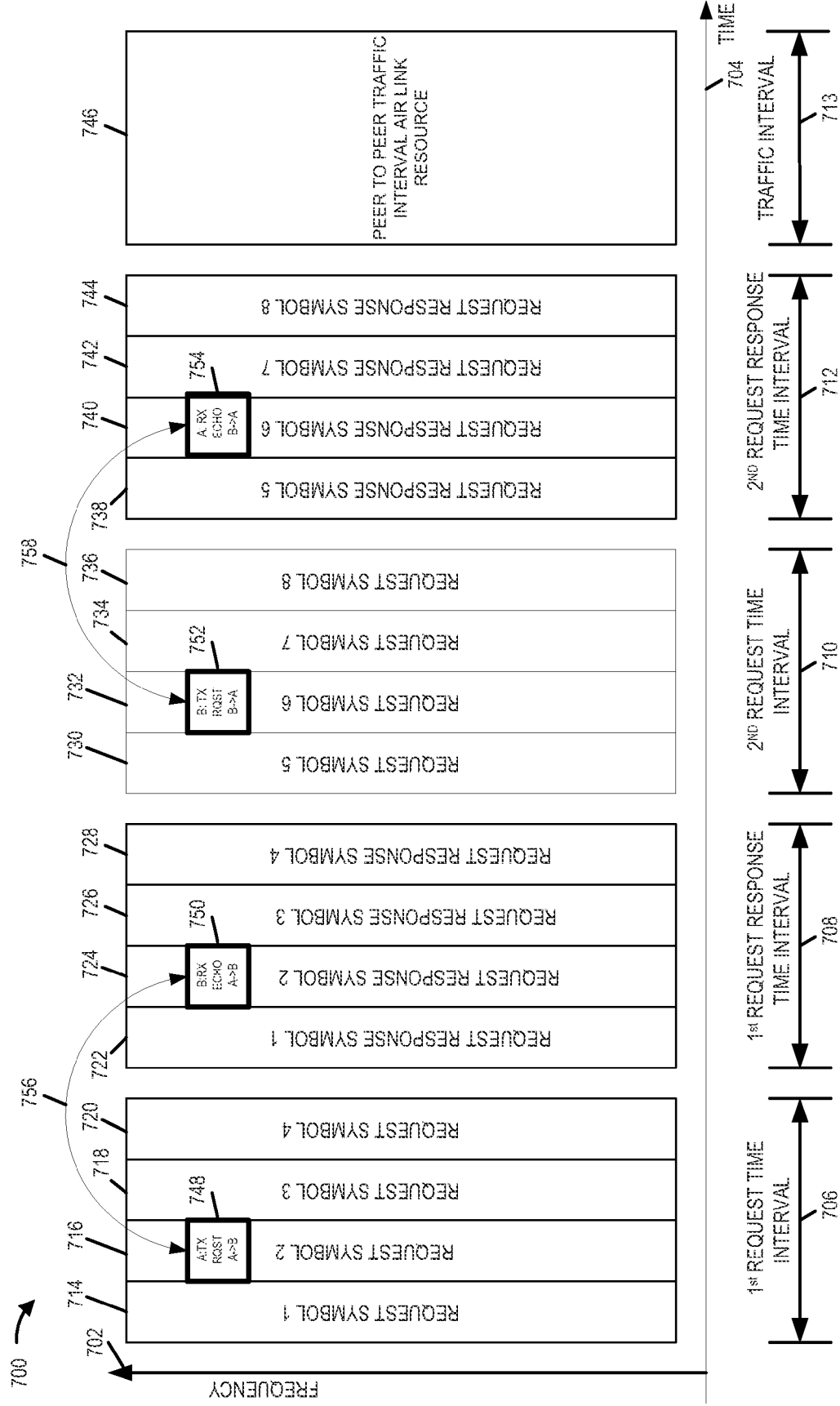
FIG. 7 is a drawing illustrating an exemplary scheme of peer to peer traffic interval request and response signaling in accordance with various embodiments.

FIG. 7 is a drawing 700 illustrating a scheme of peer to peer traffic interval request and response signaling in accordance with various embodiments. In this scheme a pair of peer to peer wireless terminals, having an existing connection, are designated request symbol resources and corresponding response symbol resources corresponding to a peer to peer traffic interval air link resource, e.g., a peer to peer traffic segment. Drawing 700 illustrates frequency on the vertical axis 702 vs time on the horizontal axis 704. Drawing 700 illustrates a first request time interval 706, followed by a first response time interval 708, followed by a $2^{nd}$ request time interval 710, followed by a $2^{nd}$ response time interval 712, followed by a traffic interval 713.

During first request time interval 706 there are a plurality of request symbols (request symbol 1 714, request symbol 2 716, request symbol 3 718, request symbol 4 720). During the $1^{st}$ response time interval 708, there are a plurality of request response symbols (request responses symbol 1 722, request response symbol 2 724, request response symbol 3 726, request response symbol 4 728). A request resource of $1^{st}$ request time interval 706 for carrying a request signal requesting to transmit traffic signals into peer to peer traffic interval air link resource 746 is associated with a corresponding request response resource of $1^{st}$ response time interval 708 for carrying a response signal. In this example, OFDM tone symbol 748 of request symbol 2 716 is designated to be used for wireless terminal A to transmit a transmission request signal to wireless terminal B; and OFDM tone-symbol 750 of request response symbol 2 724 is designated to be used for wireless terminal B to transmit a RX echo signal to wireless terminal A, wherein the echo signal conveys wireless terminal B's approval for wireless terminal A to transmit peer to peer traffic signals to wireless terminal B using the peer to peer traffic interval air link resource 746.

During second request time interval 710 there are a plurality of request symbols (request symbol 5 730, request symbol 6 732, request symbol 7 734, request symbol 8 736). During the $2^{nd}$ response time interval 712, there are a plurality of request response symbols (request responses symbol 5 738, request response symbol 6 740, request response symbol 7 742, request response symbol 8 744). A request resource of $2^{nd}$ request time interval 710 for carrying a request signal requesting to transmit traffic signals into peer to peer traffic interval air link resource 746 is associated with a corresponding request response resource of $2^{nd}$ response time interval 712 for carrying a response signal. In this example, OFDM tone symbol 752 of request symbol 6 732 is designated to be used for wireless terminal B to transmit a transmission request signal to wireless terminal A; and OFDM tone-symbol 754 of request response symbol 6 740 is designated to be used for wireless terminal A to transmit a RX echo signal to wireless terminal B, wherein the echo signal conveys wireless terminal A's approval for wireless terminal B to transmit peer to peer traffic signals to wireless terminal A using the peer to peer traffic interval air link resource 746.

It should be noted, that with regard to the connected wireless terminal pair (A, B) that at most one of wireless terminal A and wireless terminal B should transmit into peer to peer traffic interval air link resource 746. The determination as to whether a wireless terminal should, with regard to the traffic interval 713, transmit peer to peer signals, receive peer to peer signals, or do neither is a function of request signals, response signals, and protocol information, e.g., priority designation information and/or override information.

In this example, for each resource allocated for a request corresponding to a single direction of a connected pair, there is a corresponding request response resource. For example, corresponding to request resource 748 there is response resource 750, the linkage indicated by arrow 756. Similarly, corresponding to request resource 752 there is response resource 754, the linkage indicated by arrow 758.

In some embodiments, a set of air link resources including request resources and request response resources corresponding a connected pair of peer to peer wireless terminals for a traffic transmission slot, includes at least some frequencies, e.g., tones, which are different.

Note that a different connected pair of peer to peer wireless terminals, e.g., WT C and WT D, would be designated a different set of request and request responses resources, e.g., a different set of OFDM tone-symbols in the timing frequency structure corresponding to the slot. In various embodiments, connection identification information, e.g., a connection identifier or identifiers, associated with the connected pair is used to determine the set of request and/or request response resources corresponding to the pair and/or which request resource is used by which device of the pair to transmit a transmission request corresponding to a particular slot.

During traffic interval 713, there is the peer to peer traffic interval air link resource 746, e.g., a peer to peer traffic segment.

Figure 8:
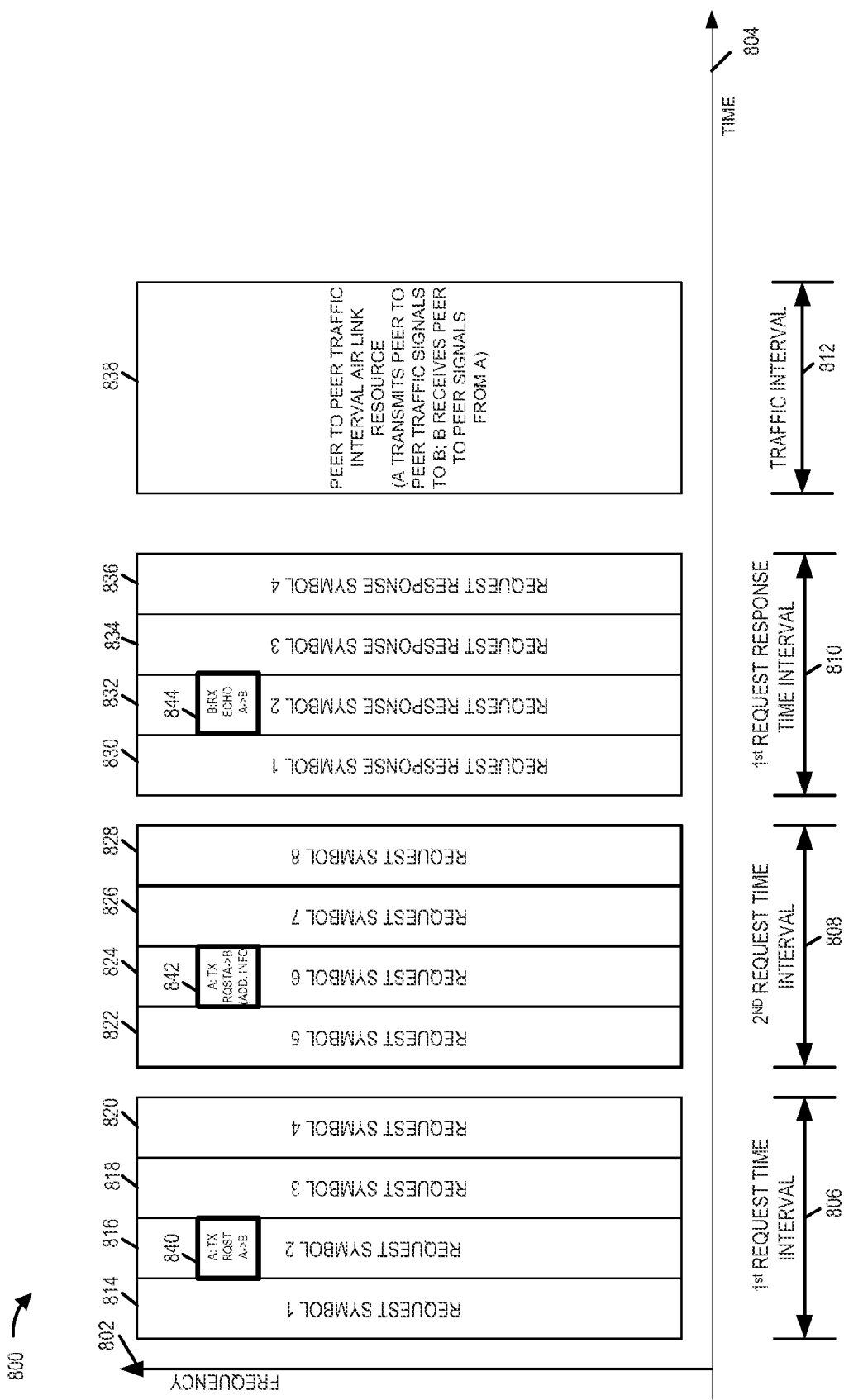
FIG. 8 is a drawing illustrating an exemplary scheme of peer to peer traffic interval request and response signaling in accordance with various embodiments.

FIG. 8 is a drawing 800 illustrating a scheme of peer to peer traffic interval request and response signaling in accordance with various embodiments. In this scheme a pair of peer to peer wireless terminals, having an existing connection, are designated a first request symbol resource from a first request time interval, a second request symbol resource from a $2^{nd}$ request time interval and a response symbol resource from a request response time interval, the set of designated resources corresponding to a peer to peer traffic interval air link resource, e.g., a peer to peer traffic segment. Drawing 800 illustrates frequency on the vertical axis 802 vs time on the horizontal axis 804. Drawing 800 illustrates a first request time interval 806, followed by a second request time interval 808, followed by a request response time interval 810, followed by a traffic interval 812.

During first request time interval 806 there are a plurality of request symbols (request symbol 1 814, request symbol 2 816, request symbol 3 818, request symbol 4 820). During second request time interval 808 there are a plurality of request symbols (request symbol 5 822, request symbol 6 824, request symbol 7 826, request symbol 8 828). During the response time interval 810, there are a plurality of request response symbols (request response symbol 1 830, request response symbol 2 832, request response symbol 3 834, request response symbol 4 836). A set of resources, e.g., one OFDM tone symbol from each time interval, are associated with a particular pair of peer to peer wireless terminals having an existing connection. For example, OFDM tone-symbol 840 of request symbol 2 816 of $1^{st}$ request time interval 806, OFDM tone-symbol 842 of request symbol 6 824 of $2^{nd}$ request time interval 808, and OFDM tone-symbol 844 of request response symbol 2 832 of request response time interval 810 form a set for peer to peer wireless terminal pair (WT A and WT B) which have a connection.

The first request resource of the set, OFDM tone symbol 840 is reserved for WT A to send a traffic transmission request to WT B requesting to transmit traffic using peer to peer traffic interval air link resource 838. The second request resource of the set, OFDM tone-symbol 842, in this exemplary embodiment, is designated to be used to send either (i) a repeat request signal from WT A to WT B or (ii) an initial traffic transmission request from WT B to WT A, the request from WT B requesting that WT B be permitted to transmit traffic signals to WT A using peer to peer traffic interval air link resource 838. The request response signal resource of the set, OFDM tone-symbol 844, is designated to be used to carry a receiver response signal, e.g., an RX echo signal, the signal being in response to the received request signal which has priority.

In the example of FIG. 8, OFDM tone-symbol 840 carries a traffic transmission request signal from WT A to WT B requesting WT B to permit WT A to transmit traffic signals to WT B using peer to peer traffic interval air link resource 838. Since the first request resource, OFDM tone-symbol 840 has been utilized, then, corresponding second request resource, OFDM tone-symbol 842 is also to be used by WT A to send a signal representing a repeat traffic transmission request. The signal representing a repeat request also carries additional information. The request response resource, e.g., OFDM tone-symbol 844, in this example, carries the receiver echo (RX echo) signal from wireless terminal B to wireless terminal A, the RX echo signal conveying that from WT B's perspective WT A is allowed to use peer to peer traffic interval air link resource 838 to transmit traffic signals to WT B. If WT B had instead decided not to allow WT A to transmit, in this embodiment, WT B would not transmit an RX echo signal on response resource 844, and would allow this response resource to be unused.

In some embodiments, a set of air link resources including request resources and request response resources corresponding a connected pair of peer to peer wireless terminals for a traffic transmission slot, includes at least some frequencies, e.g., tones, which are different.

Note that a different connected pair of peer to peer wireless terminals, e.g., WT C and WT D, would be designated a different set of request and request responses resources, e.g., a different set of OFDM tone-symbols in the timing frequency structure corresponding to the slot. In various embodiments, connection identification information, e.g., a connection identifier or identifiers, associated with the connected pair is used to determine the set of request and/or request response resources corresponding to the pair and/or which request resource is used by which device of the pair to transmit a transmission request corresponding to a particular slot.

Figure 9:
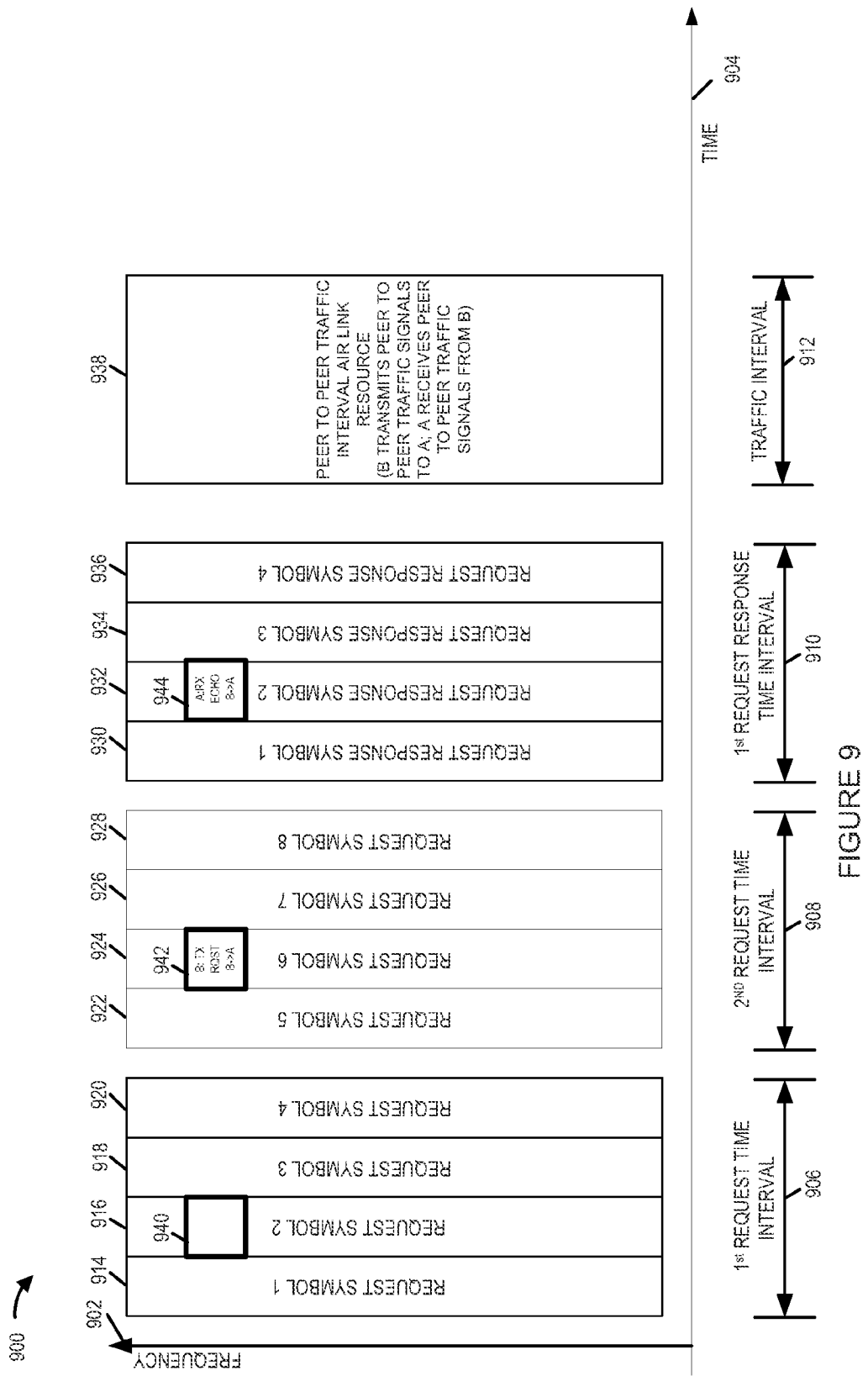
FIG. 9 is a drawing illustrating the exemplary scheme of peer to peer traffic interval request and response signaling described with respect to FIG. 8, for a different signaling possibility.

FIG. 9 is a drawing 900 illustrating the scheme of peer to peer traffic interval request and response signaling described with respect to FIG. 8, for a different signaling possibility. In this scheme a pair of peer to peer wireless terminals, having an existing connection, are designated a first request symbol resource from a first request time interval, a second request symbol resource from a $2^{nd}$ request time interval and a response symbol resource from a request response time interval, the set of designated resources corresponding to a peer to peer traffic interval air link resource, e.g., a peer to peer traffic segment. Drawing 900 illustrates frequency on the vertical axis 902 vs time on the horizontal axis 904. Drawing 900 illustrates a first request time interval 906, followed by a second request time interval 908, followed by a request response time interval 910, followed by a traffic interval 912.

During first request time interval 906 there are a plurality of request symbols (request symbol 1 914, request symbol 2 916, request symbol 3 918, request symbol 4 920). During second request time interval 908 there are a plurality of request symbols (request symbol 5 922, request symbol 6 924, request symbol 7 926, request symbol 8 928). During the response time interval 910, there are a plurality of request response symbols (request response symbol 1 930, request response symbol 2 932, request response symbol 3 934, request response symbol 4 936). A set of resources, e.g., one OFDM tone symbol from each time interval, are associated with a particular pair of peer to peer wireless terminals having an existing connection. For example, OFDM tone-symbol 940 of request symbol 2 916 of $1^{st}$ request time interval 906, OFDM tone-symbol 942 of request symbol 6 942 of $2^{nd}$ request time interval 908, and OFDM tone-symbol 944 of request response symbol 2 932 of request response time interval 910 form a set for peer to peer wireless terminal pair (WT A and WT B) which have a connection.

The first request resource of the set, OFDM tone symbol 940 is reserved for WT A to send a traffic transmission request to WT B requesting to transmit traffic using peer to peer traffic interval air link resource 938. The second request resource of the set, OFDM tone-symbol 942, in this exemplary embodiment, is designated to be used to send either (i) a repeat request signal from WT A to WT B or (ii) an initial traffic transmission request from WT B to WT A, the request from WT B requesting that WT B be permitted to transmit traffic signals to WT A using peer to peer traffic interval air link resource 938. The request response signal resource of the set, OFDM tone-symbol 944, is designated to be used to carry a receiver response signal, e.g., an RX echo signal, the signal being in response to the received request signal which has priority.

In the example of FIG. 9, OFDM tone-symbol 940 does not carry a traffic transmission request signal and is not used. Since the first request resource, OFDM tone-symbol 940 has not been utilized, then, corresponding second request resource, OFDM tone-symbol 942 is available to be used by WT B to send an initial traffic transmission request to WT A, the request requesting WT A for permission to use the peer to peer traffic interval air link resource 938 to send peer to peer traffic signals from WT B to WT A. In this example, WT B decides that it wants to send a request and sends a transmission traffic request signal in OFDM tone-symbol 942. The request response resource, e.g., OFDM tone-symbol 944, in this example, carries the receiver echo (RX echo) signal from wireless terminal A to wireless terminal B, the RX echo signal conveying that from WT A's perspective WT B is allowed to use peer to peer traffic interval air link resource 938 to transmit traffic signals to WT A. If WT A had instead decided not to allow WT B to transmit, in this embodiment, WT A would not transmit an RX echo signal on response resource 944, and would allow this response resource to be unused.

It may be observed in this embodiment, as illustrated by FIGS. 8 and 9, that the amount of air link resources reserved in the timing/frequency structure for overhead signaling has been reduced from the embodiment of FIG. 7, since the request response resource is shared, e.g., a single OFDM tone-symbol can carry RX echo signals for either signaling direction. In addition, this embodiment, has the additional advantage that the second request resource is utilized differently at different times, thus allowing additional information to be conveyed in situations where a request is sent during the $1^{st}$ request time interval.

FIG. 8 and FIG. 9 may represent two traffic slots in a recurring timing frequency structure, e.g., two successive slots. Alternatively, FIGS. 8 and 9 may represent the same traffic slot in the structure, e.g., with time intervals (806, 808, 810, 812) being the same as time intervals (906, 908, 910, 912), respectively, with air link resources for symbols (814, 816, 818, 820, 822, 824, 826, 828, 830, 832, 834, 836) being the same as for symbols (914, 916, 918, 920, 922, 924, 926, 928, 930, 932, 934, 936), respectively, and with resources (840, 842, 844, 838) being the same as resources (940, 942, 944, 938), respectively; but with different signals being conveyed in this resources as indicated in FIGS. 8 and 9.

Figure 10:
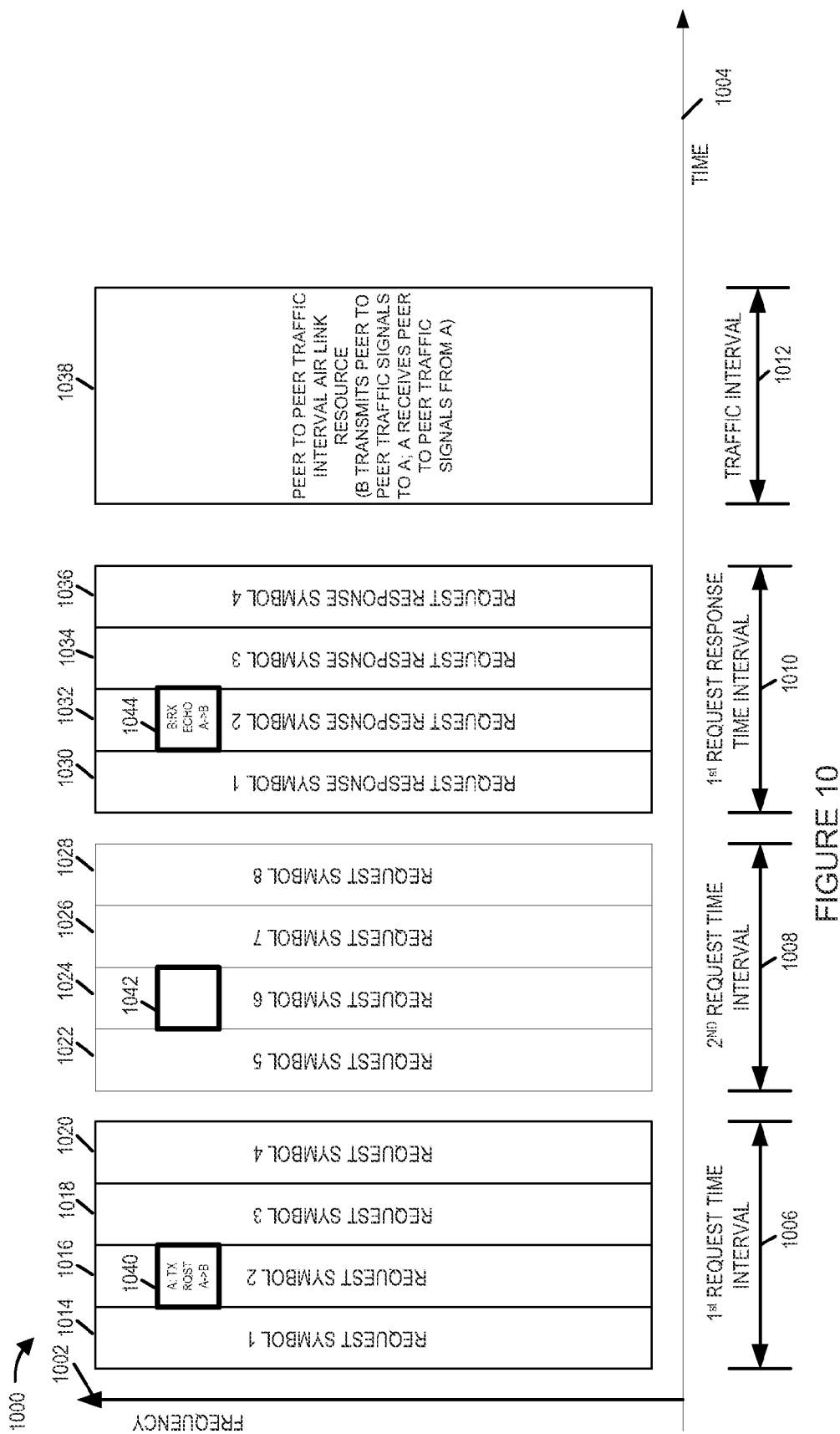
FIG. 10 is a drawing illustrating an exemplary scheme of peer to peer traffic interval request and response signaling in accordance with various embodiments.

FIG. 10 is a drawing 1000 illustrating a scheme of peer to peer traffic interval request and response signaling in accordance with various embodiments. In this scheme a pair of peer to peer wireless terminals, having an existing connection, are designated a first request symbol resource from a first request time interval, a second request symbol resource from a $2^{nd}$ request time interval and a response symbol resource from a request response time interval, the set of designated resources corresponding to a peer to peer traffic interval air link resource, e.g., a peer to peer traffic segment. Drawing 1000 illustrates frequency on the vertical axis 1002 vs time on the horizontal axis 1004. Drawing 1000 illustrates a first request time interval 1006, followed by a second request time interval 1008, followed by a request response time interval 1010, followed by a traffic interval 1012.

During first request time interval 1006 there are a plurality of request symbols (request symbol 1 1014, request symbol 2 1016, request symbol 3 1018, request symbol 4 1020). During second request time interval 1008 there are a plurality of request symbols (request symbol 5 1022, request symbol 6 1024, request symbol 7 1026, request symbol 8 1028). During the response time interval 1010, there are a plurality of request response symbols (request response symbol 1 1030, request response symbol 2 1032, request response symbol 3 1034, request response symbol 4 1036). A set of resources, e.g., one OFDM tone symbol from each time interval, are associated with a particular pair of peer to peer wireless terminals having an existing connection. For example, OFDM tone-symbol 1040 of request symbol 2 1016 of $1^{st}$ request time interval 1006, OFDM tone-symbol 1042 of request symbol 6 1024 of $2^{nd}$ request time interval 1008, and OFDM tone-symbol 1044 of request response symbol 1032 of request response time interval 1010 form a set for peer to peer wireless terminal pair (WT A and WT B) which have a connection.

The first request resource of the set, OFDM tone symbol 1040 is reserved for WT A to send a traffic transmission request to WT B requesting to transmit traffic using peer to peer traffic interval air link resource 1038. The second request resource of the set, OFDM tone-symbol 1042, in this exemplary embodiment, is reserved for WT B to send a traffic transmission request to WT A requesting to transmit traffic using peer to peer traffic interval air link resource 1038. The request response signal resource of the set, OFDM tone-symbol 1044, is designated to be used to carry a receiver response signal, e.g., an RX echo signal, the signal being in response to the received request signal which has priority.

In the example of FIG. 10, OFDM tone-symbol 1040 carries a traffic transmission request signal from WT A to WT B requesting WT B to permit WT A to transmit traffic signals to WT B using peer to peer traffic interval air link resource 1038. WT B does not send a transmission request in OFDM tone-symbol 1042. The request response resource, e.g., OFDM tone-symbol 1044, in this example, carries the receiver echo (RX echo) signal from wireless terminal B to wireless terminal A, the RX echo signal conveying that from WT B's perspective WT A is allowed to use peer to peer traffic interval air link resource 1038 to transmit traffic signals to WT B. If WT B had instead decided not to allow WT A to transmit, in this embodiment, WT B would not transmit an RX echo signal on response resource 1044, and would allow this response resource to be unused.

Figure 11:
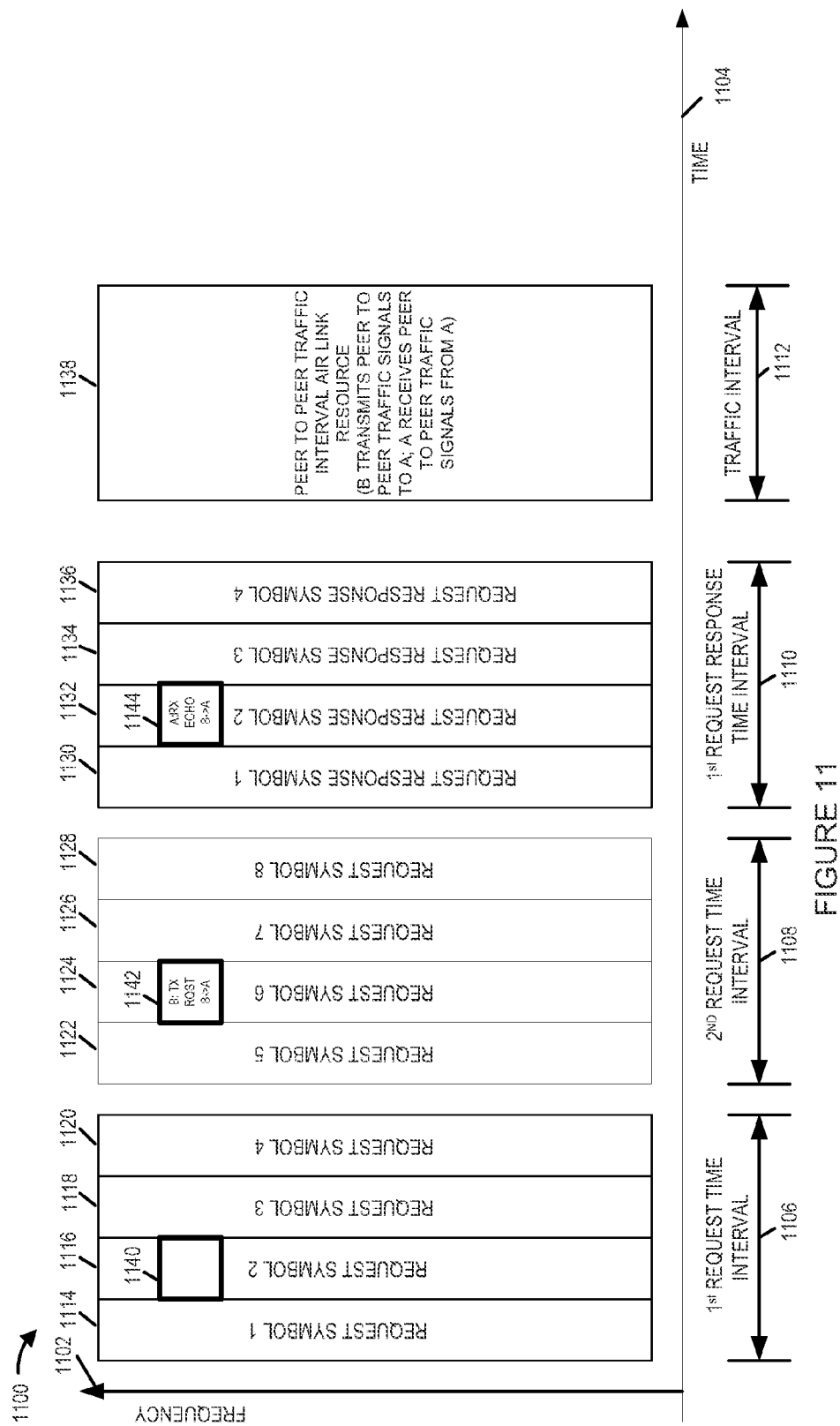
FIG. 11 is a drawing illustrating the exemplary scheme of peer to peer traffic interval request and response signaling described with respect to FIG. 10, for a different signaling possibility.

FIG. 11 is a drawing 1100 illustrating the scheme of peer to peer traffic interval request and response signaling described with respect to FIG. 10, for a different signaling possibility. In this scheme a pair of peer to peer wireless terminals, having an existing connection, are designated a first request symbol resource from a first request time interval, a second request symbol resource from a $2^{nd}$ request time interval and a response symbol resource from a request response time interval, the set of designated resources corresponding to a peer to peer traffic interval air link resource, e.g., a peer to peer traffic segment. Drawing 1100 illustrates frequency on the vertical axis 1102 vs time on the horizontal axis 1104. Drawing 1100 illustrates a first request time interval 1106, followed by a second request time interval 1108, followed by a request response time interval 1110, followed by a traffic interval 1112.

During first request time interval 1106 there are a plurality of request symbols (request symbol 1 1114, request symbol 2 1116, request symbol 3 1118, request symbol 4 1120). During second request time interval 1108 there are a plurality of request symbols (request symbol 5 1122, request symbol 6 1124, request symbol 7 1126, request symbol 8 1128). During the response time interval 1110, there are a plurality of request response symbols (request response symbol 1 1130, request response symbol 2 1132, request response symbol 3 1134, request response symbol 4 1136). A set of resources, e.g., one OFDM tone symbol from each time interval, are associated with a particular pair of peer to peer wireless terminals having an existing connection. For example, OFDM tone-symbol 1140 of request symbol 2 1116 of $1^{st}$ request time interval 1106, OFDM tone-symbol 1142 of request symbol 6 1124 of $2^{nd}$ request time interval 1108, and OFDM tone-symbol 1144 of request response symbol 1132 of request response time interval 1110 form a set for peer to peer wireless terminal pair (WT A and WT B) which have a connection.

The first request resource of the set, OFDM tone symbol 1140 is reserved for WT A to send a traffic transmission request to WT B requesting to transmit traffic using peer to peer traffic interval air link resource 1138. The second request resource of the set, OFDM tone-symbol 1142, in this exemplary embodiment, is reserved for WT B to send a traffic transmission request to WT A requesting to transmit traffic using peer to peer traffic interval air link resource 1138. The request response signal resource of the set, OFDM tone-symbol 1144, is designated to be used to carry a receiver response signal, e.g., an RX echo signal, the signal being in response to the received request signal which has priority.

In the example of FIG. 11, OFDM tone-symbol 1140 is left unused since WT A is not requesting to transmit into peer to peer traffic interval air link resource 1138. WT B sends a transmission request in OFDM tone-symbol 1142, the request being directed to WT A, the request requesting for permission from WT A for WT B to transmit peer to peer traffic signals to WT A using peer to peer interval air link resource 1138. The request response resource, e.g., OFDM tone-symbol 1144, in this example, carries the receiver echo (RX echo) signal from wireless terminal A to wireless terminal B, the RX echo signal conveying that from WT A's perspective WT B is allowed to use peer to peer traffic interval air link resource 1138 to transmit traffic signals to WT A. If WT A had instead decided not to allow WT B to transmit, in this embodiment, WT A would not transmit an RX echo signal on response resource 1144, and would allow this response resource to be unused.

Figure 12:
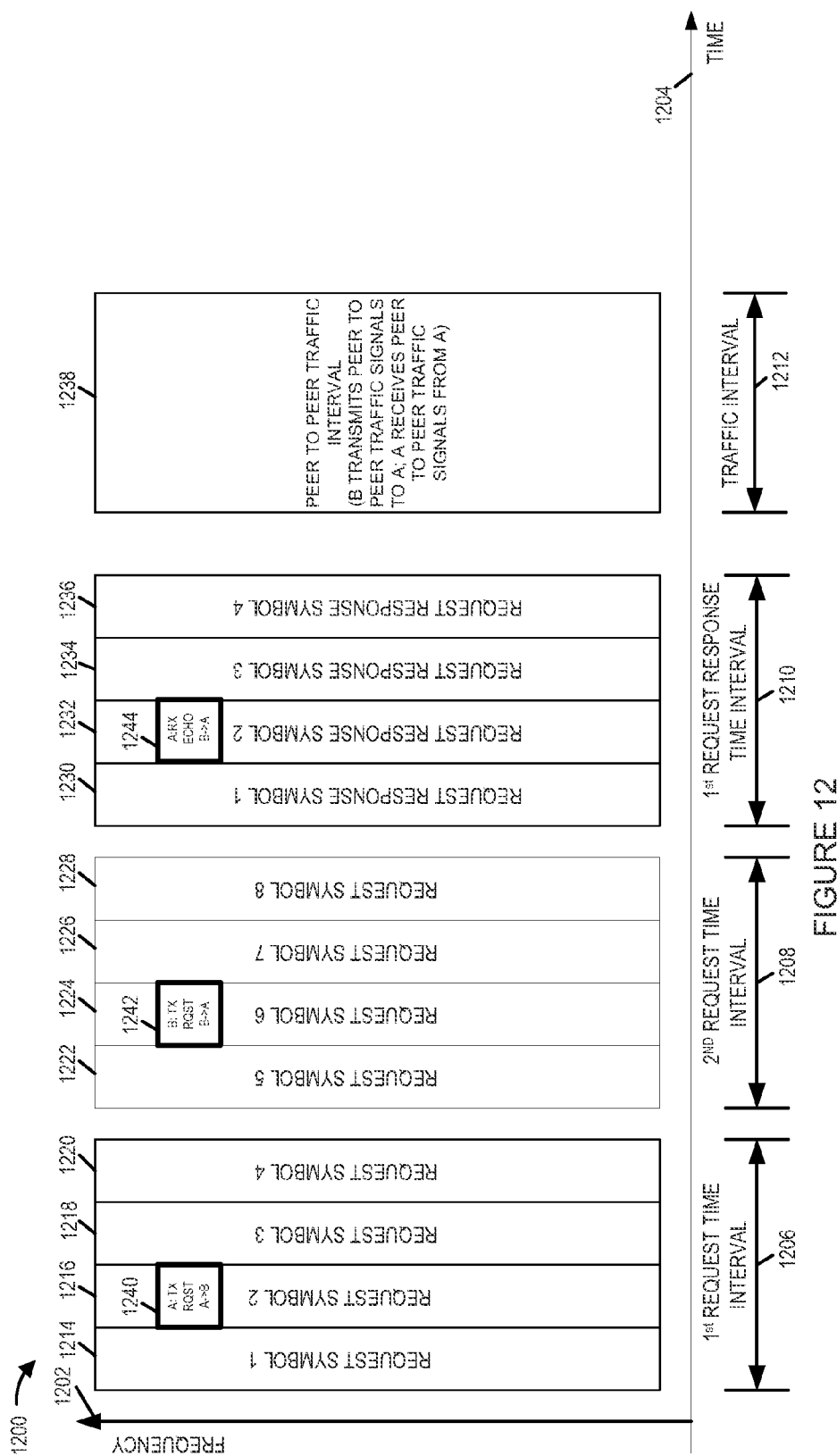
FIG. 12 is a drawing illustrating the exemplary scheme of peer to peer traffic interval request and response signaling described with respect to FIG. 10 and FIG. 11, for a different signaling possibility.

FIG. 12 is a drawing 1200 illustrating the scheme of peer to peer traffic interval request and response signaling described with respect to FIG. 10 and FIG. 11, for a different signaling possibility. In this scheme a pair of peer to peer wireless terminals, having an existing connection, are designated a first request symbol resource from a first request time interval, a second request symbol resource from a $2^{nd}$ request time interval and a response symbol resource from a request response time interval, the set of designated resources corresponding to a peer to peer traffic interval air link resource, e.g., a peer to peer traffic segment. Drawing 1200 illustrates frequency on the vertical axis 1202 vs time on the horizontal axis 1204. Drawing 1200 illustrates a first request time interval 1206, followed by a second request time interval 1208, followed by a request response time interval 1210, followed by a traffic interval 1212.

During first request time interval 1206 there are a plurality of request symbols (request symbol 1 1214, request symbol 2 1216, request symbol 3 1218, request symbol 4 1220). During second request time interval 1208 there are a plurality of request symbols (request symbol 5 1222, request symbol 6 1224, request symbol 7 1226, request symbol 8 1228). During the response time interval 1210, there are a plurality of request response symbols (request response symbol 1 1230, request response symbol 2 1232, request response symbol 3 1234, request response symbol 4 1236). A set of resources, e.g., one OFDM tone symbol from each time interval, are associated with a particular pair of peer to peer wireless terminals having an existing connection. For example, OFDM tone-symbol 1240 of request symbol 2 1216 of $1^{st}$ request time interval 1206, OFDM tone-symbol 1242 of request symbol 6 1224 of $2^{nd}$ request time interval 1208, and OFDM tone-symbol 1244 of request response symbol 1232 of request response time interval 1210 form a set for peer to peer wireless terminal pair (WT A and WT B) which have a connection.

The first request resource of the set, OFDM tone symbol 1240 is reserved for WT A to send a traffic transmission request to WT B requesting to transmit traffic using peer to peer traffic interval air link resource 1238. The second request resource of the set, OFDM tone-symbol 1242, in this exemplary embodiment, is reserved for WT B to send a traffic transmission request to WT A requesting to transmit traffic using peer to peer traffic interval air link resource 1238. In this example, WT B is allowed to override a request from WT A. In some other embodiments, WT B is not allowed to override a request from WT A. In some such embodiments, WT B is restricted from transmitting on its request resource if WT A has transmitted on its request resource.

The request response signal resource of the set, OFDM tone-symbol 1244, is designated to be used to carry a receiver response signal, e.g., an RX echo signal, the signal being in response to the received request signal which has priority.

In the example of FIG. 12, OFDM tone-symbol 1240 carries a traffic transmission request signal from WT A to WT B requesting WT B to permit WT A to transmit traffic signals to WT B using peer to peer traffic interval air link resource 1238. However, WT B also wants to transmit using peer to peer traffic interval air link resource 1238, and a WT B request can override a WT A request. WT B sends a transmission request in OFDM tone-symbol 1242 requesting to transmit traffic signals to WT A using air link resource 1238. The request response resource, e.g., OFDM tone-symbol 1244, in this example, carries the receiver echo (RX echo) signal from wireless terminal A to wireless terminal B, the RX echo signal conveying that from WT A's perspective WT B is allowed to use peer to peer traffic interval air link resource 1238 to transmit traffic signals to WT A. If WT A had instead decided not to allow WT B to transmit, in this embodiment, WT A would not transmit an RX echo signal on response resource 1244, and would allow this response resource to be unused.

Figure 13:
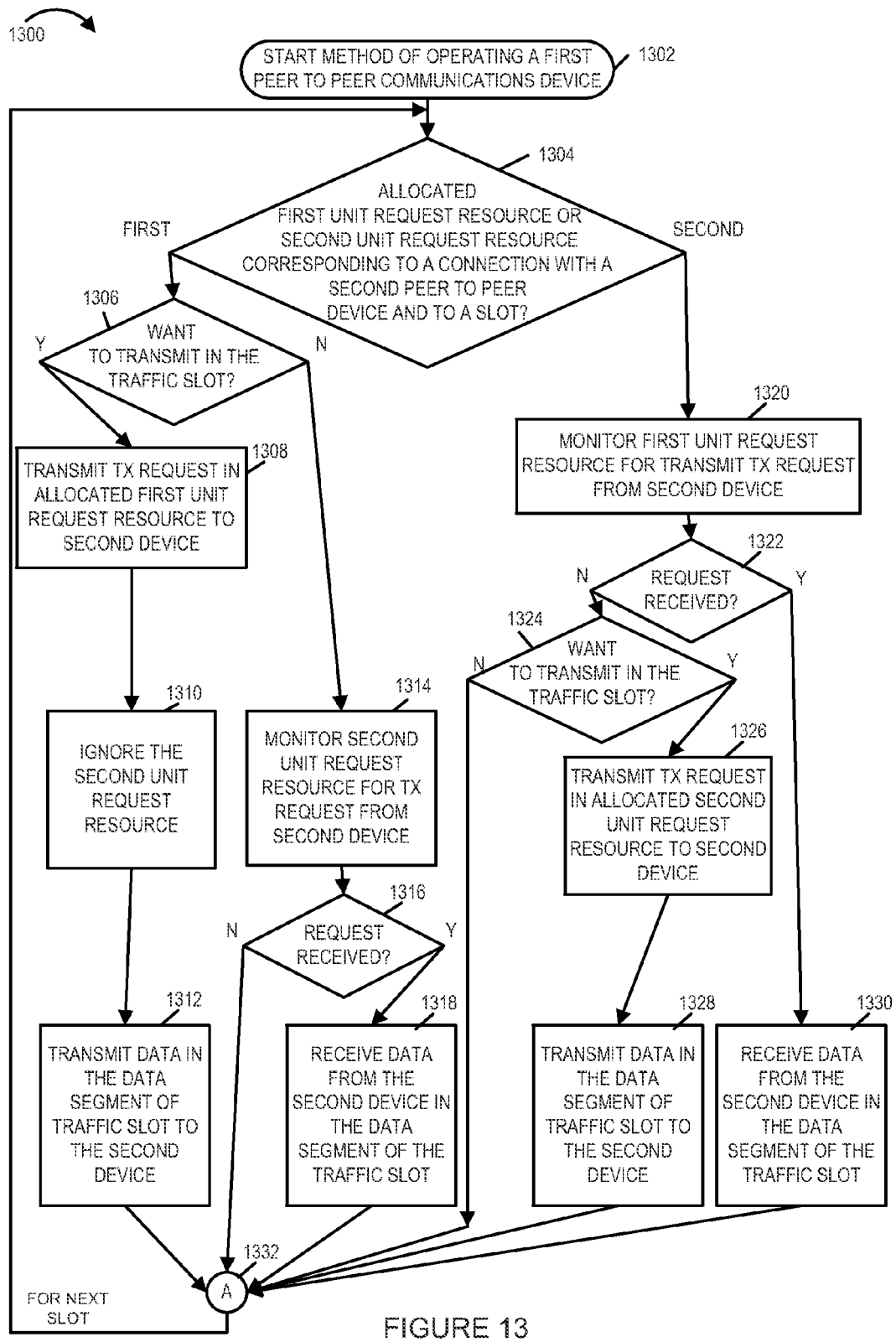
FIG. 13 is a flowchart of an exemplary method of operating a first peer to peer communications device in accordance with various embodiments.

FIG. 13 is a flowchart 1300 of an exemplary method of operating a first peer to peer communications device in accordance with various embodiments. The first peer to peer communications device is, e.g., a peer to peer communications device which has an existing connection with a second peer to peer communications device. The first and second peer to peer communications devices are, in various embodiments, using a recurring peer to peer timing structure including a plurality of traffic slots. In this exemplary embodiment, corresponding to a data segment of a traffic slot and the connection between the first and second peer to peer devices, there is a first unit request resource and a second unit request resource, one of the two is designated to carry a transmission request from the first device to the second device, while the other is designated to carry a transmission request from the second device to the first device, the request being a request to transmit in the data segment of the traffic slot.

Operation of the exemplary method starts in start step 1302 and proceeds to step 1304. In step 1304 the first device determines whether it has been allocated the first unit request resource or second unit request resource corresponding to the connection with the second peer to peer device and corresponding to the slot under consideration. If the first device has been allocated the first unit request resource, then operation proceeds from step 1304 to step 1306. However, if the first device has been allocated the second unit request resource then operation proceeds from step 1304 to step 1320.

Returning to step 1306, in step 1306 the first device determines whether or not it wants to transmit data in the traffic slot. If the first device wants to transmit data, e.g., it has a backlog in its traffic data transmit queue corresponding to the second device, then operation proceeds from step 1306 to step 1308; otherwise, operation proceeds from step 1306 to step 1314.

In step 1306, the first device transmits a transmission request (TX request) in the allocated first unit request resource to the second device. Then, in step 1310, the first device ignores the second unit request resource. Operation proceeds from step 1310 to step 1312. In step 1312 the first device transmits data in the data segment of the traffic slot to the second device. Operation proceeds from step 1312 to connecting node A 1332.

Returning to step 1314, in step 1314 the first device monitors the second unit request resource for a TX request from the second device. Operation proceeds from step 1314 to step 1316. In step 1316, the first device determines whether a request was received from the second device in the monitoring of step 1314. If a request was received, then operation proceeds from step 1316 to step 1318; otherwise operation proceeds from step 1316 to connecting node A 1332. In step 1318 the first device receives data from the second device in the data segment of the traffic slot. Operation proceeds from step 1318 to connecting node A 1332.

Returning to step 1320, in step 1320 the first device monitors the first unit request resource for a transmit TX request from the second device. Operation proceeds from step 1320 to step 1322. In step 1322, the first device determines whether or not a request was received from the second device in the monitoring of step 1320. If a request was received from the second device, then operation proceeds from step 1322 to step 1330; otherwise operation proceeds from step 1322 to step 1324.

Returning to step 1324, in step 1324 the first device determines whether or not it want to transmit data traffic signals to the second device in the traffic slot. If the first device does want to transmit, then operation proceeds from step 1324 to step 1326; otherwise, operation proceeds from step 1324 to connecting node A 1332.

Retuning to step 1326, in step 1326 the first device transmits a TX request signal in the allocated second unit request resource to the second device. Then, in step 1328 the first device transmits data in the data segment of the traffic slot to the second device. Operation proceeds from step 1328 to connecting node A 1332.

Returning to step 1330, in step 1330 the first device receives data from the second device in the data segment of the traffic slot. Operation proceeds from step 1330 to connecting node A 1332. Operation proceeds from connecting node A 1332 to step 1304 for the next slot to be considered.

In this exemplary embodiment, the first unit request resource precedes the second unit request resource in time. For a particular slot, the device allocated the first unit request resource has the first opportunity to stake claim to use the data segment of the traffic slot, and a second unit request cannot override a granted first unit request.

In some embodiments, additional request response signaling in utilized in the flow, e.g., a RX echo signal is utilized to send a positive acknowledgement in response to a TX request. In some such embodiments, step 1312 is not performed if an RX echo signal is not received from the second communications device on a corresponding responses signal resource prior to step 1312. Similarly, step 1328 is not performed if an RX echo signal is not received from the second communications device on the corresponding response signal resource prior to step 1328. In some embodiments, prior to step 1318 the first device transmits an RX echo signal to the second device using the response signal resource. Similarly, in some embodiments, prior to step 1330, the first device transmits an RX echo signal to the second device using the response signal resource.

In one exemplary embodiment, a first unit request resource is an OFDM tone-symbol in a first OFDM symbol and a second unit request resource is an OFDM tone-symbol in a second OFDM symbol, wherein the first OFDM tone-symbol precedes the second OFDM tone-symbol, and the first and second OFDM tone-symbols precede the data segment. In some embodiments, the response signal resource is an OFDM tone-symbol of a third OFDM symbol which occurs subsequent to the first and second OFDM symbols, but prior to the data segment.

Figure 14:
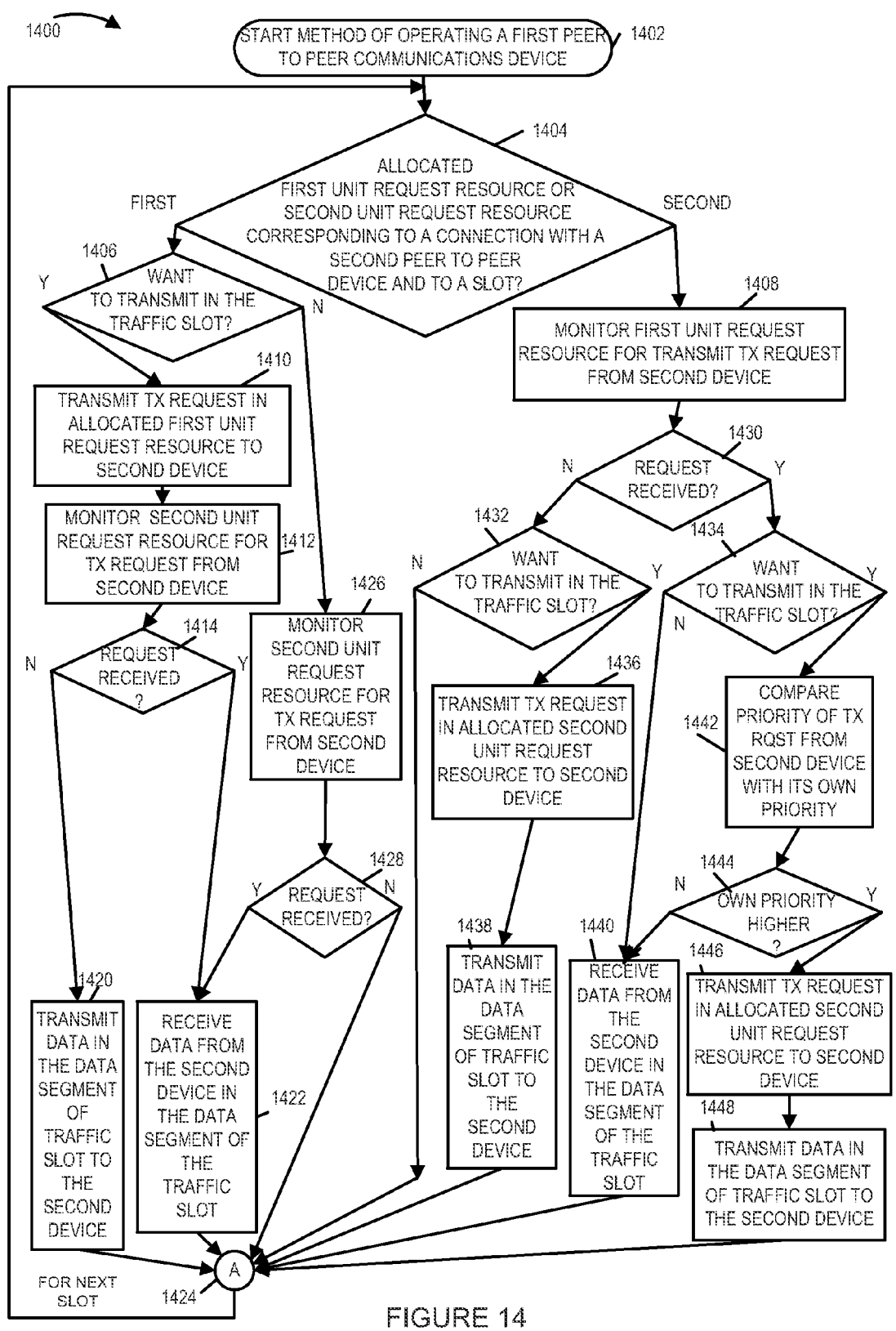
FIG. 14 is a flowchart of an exemplary method of operating a first peer to peer communications device in accordance with various embodiments.

FIG. 14 is a flowchart 1400 of an exemplary method of operating a first peer to peer communications device in accordance with various embodiments. The first peer to peer communications device is, e.g., a peer to peer communications device which has an existing connection with a second peer to peer communications device. The first and second peer to peer communications devices are, in various embodiments, using a recurring peer to peer timing structure including a plurality of traffic slots. In this exemplary embodiment, corresponding to a data segment of a traffic slot and the connection between the first and second peer to peer devices, there is a first unit request resource and a second unit request resource, one of the two is designated to carry a transmission request from the first device to the second device, while the other is designated to carry a transmission request from the second device to the first device, the request being a request to transmit in the data segment of the traffic slot.

Operation of the exemplary method starts in start step 1402 and proceeds to step 1404. In step 1404 the first device determines whether it has been allocated the first unit request resource or second unit request resource corresponding to the connection with the second peer to peer device and corresponding to the slot under consideration. If the first device has been allocated the first unit request resource, then operation proceeds from step 1404 to step 1406. However, if the first device has been allocated the second unit request resource then operation proceeds from step 1404 to step 1408.

Returning to step 1406, in step 1406 the first device determines whether or not it wants to transmit data in the traffic slot. If the first device wants to transmit data, e.g., it has a backlog in its traffic data transmit queue corresponding to the second device, then operation proceeds from step 1406 to step 1410; otherwise, operation proceeds from step 1406 to step 1426.

In step 1410, the first device transmits a transmission request (TX request) in the allocated first unit request resource to the second device. Then, in step 1412, the first device monitors the second request resource for a TX request from the second device. Operation proceeds from step 1412 to step 1414. In step 1414 the first device determines whether or not it has received a TX request from the second device during the monitoring of step 1412. If the first device has received a TX request from the second device then operation proceeds from step 1414 to step 1422; otherwise operation proceeds from step 1414 to step 1420.

In step 1420 the first device transmits data in the data segment of the traffic slot to the second device. Operation proceeds from step 1420 to connecting node A 1424.

Returning to step 1422, in step 1422 the first device receives data from the second device in the data segment of the traffic slot. Operation proceeds from step 1422 to connecting node A 1424.

Returning to step 1426, in step 1426 the first device monitors the second unit request resource for a transmission request (TX request) from the second device. Operation proceeds from step 1426 to step 1428. In step 1428 if a request was received in step 1426, then operation proceeds from step 1428 to step 1422; otherwise operation proceeds from step 1428 to connecting node A 1424.

Returning to step 1408, in step 1408 the first device monitors the first unit request resource for a transmit TX request from the second device. Operation proceeds from step 1408 to step 1430. In step 1430, the first device determines whether or not a request was received from the second device in the monitoring of step 1408. If a request was received from the second device, then operation proceeds from step 1430 to step 1434; otherwise operation proceeds from step 1430 to step 1432.

Returning to step 1432, in step 1432 the first device determines whether or not it want to transmit data traffic signals to the second device in the traffic slot. If the first device does not want to transmit, then operation proceeds from step 1432 to connecting node A 1424; otherwise, operation proceeds from step 1432 to step 1436. In step 1436 the first device transmits a TX request in the allocated second unit request resource to the second device. Then, in step 1438, the first device transmits data in the data segment of the traffic slot to the second device. Operation proceeds from step 1438 to connecting node A 1424.

Returning to step 1434, in step 1434 the first device determines whether or not it want to transmit data traffic signals to the second device in the traffic slot. If the first device does not want to transmit, then operation proceeds from step 1434 to step 1440; otherwise, operation proceeds from step 1434 to step 1442.

Returning to step 1440, in step 1440 the first device receives data from the second device in the data segment of the traffic slot. Operation proceeds from step 1440 to connecting node A 1424.

Returning to step 1442, in step 1442 the first device compares the priority of the received TX request from the second device with its own priority. Operation proceeds from step 1442 to step 1444. In step 1444 if the comparison of step 1442 determined that the first wireless terminal has a priority associated with traffic that it would like to transmit to the second device in the traffic slot which exceeds the priority associated with the received TX request from the second device, then operation proceeds from step 1444 to step 1446; otherwise operation proceeds from step 1444 to step 1440.

Returning to step 1446, in step 1446 the first wireless terminal transmits a TX request in the allocated second unit request resource to the second device. Then, in step 1448, the second device transmits data in the data segment of the traffic slot to the second device. Operation proceeds from step 1448 to connecting node A 1424. Operation proceeds from connecting node A 1424 to step 1404 for the next slot to be considered.

In this exemplary embodiment, the first unit request resource precedes the second unit request resource in time. For a particular slot, the device allocated the second unit request resource has the opportunity to override a request communicated in the first unit request resource, e.g., as a function of priority information.

In some embodiments, additional request response signaling is utilized in the flow, e.g., a RX echo signal is utilized to send a positive acknowledgement in response to a TX request. In some such embodiments, if the first device fails to receive a request response signal prior to step (1420, 1438, 1448) in a request response resource associated with the connection and the data segment of the traffic slot, the first device does not perform step (1420, 1438, 1448), respectively. In some embodiments, prior to performing step (1422, 1440), the first device transmits a request response signal, e.g., an RX echo signal, into the request response resource associated with the connection and the data segment of the traffic slot.

In one exemplary embodiment, a first unit request resource is an OFDM tone-symbol in a first OFDM symbol and a second unit request resource is an OFDM tone-symbol in a second OFDM symbol, wherein the first OFDM tone-symbol precedes the second OFDM tone-symbol, and the first and second OFDM tone-symbols precede the data segment. In some embodiments, the request responses resource is an OFDM tone-symbol in a third OFDM symbol, wherein the third OFDM symbol is subsequent to the first and second OFDM symbols but precedes the data segment of the traffic slot.

Figure 15:
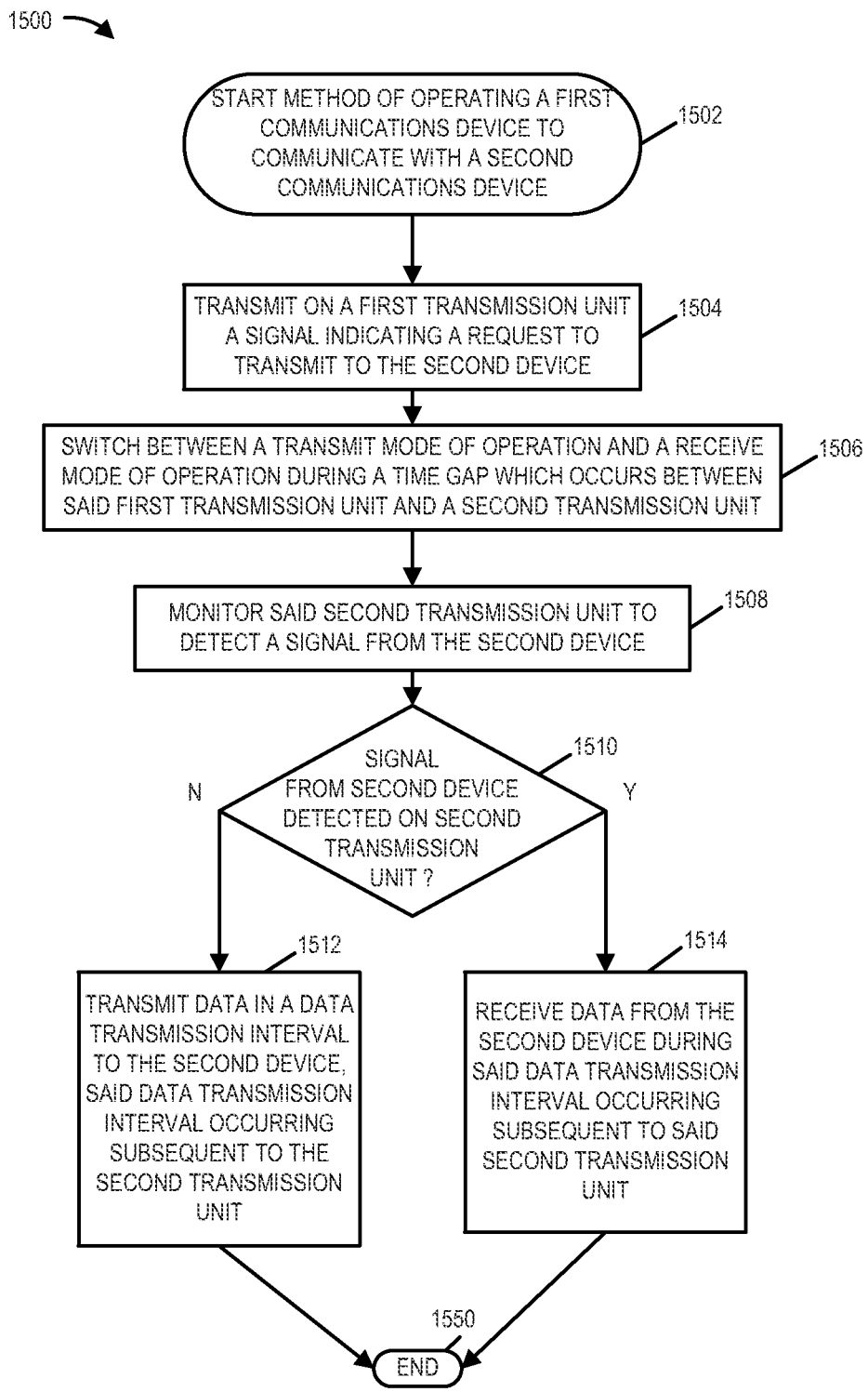
FIG. 15 is a flowchart of an exemplary method of operating a first communications device to communicate with a second communications device in accordance with various embodiments.

FIG. 15 is a flowchart 1500 of an exemplary method of operating a first communications device to communicate with a second communications device. The first and second communications devices are, e.g., peer to peer communications devices. The first and second communications devices are communications devices in a system having a plurality of transmission units, each transmission unit communicating at least one symbol, a first pair of said transmission units corresponding to a first pair of communications devices, said first pair of communications devices including said first and second communications devices, the first and second communications devices having an existing connection, said first pair of transmission units including a first transmission unit corresponding to the first device and a second transmission unit corresponding to the second device, the first and second transmission units being non-overlapping in time, the first transmission unit preceding the second transmission unit.

Operation of the exemplary method starts in step 1502 and proceeds to step 1504. In step 1504, the first communications device transmits on a first transmission unit a signal indicating a request to transmit to the second device. Then, in step 1506 the first communications device switches between a transmit mode of operation and a receive mode of operation during a time gap which occurs between said first transmission unit and said second transmission unit. In some embodiments, when operating in a receive mode of operation transmission functionality is disabled. In some embodiments, switching from a receive mode of operation to a transmit mode of operation includes disabling receiver operation and enabling transmitter operation. In various embodiments, the time gap is at least 1 microsecond. In some embodiments, the time gap is at least one symbol in duration. In some embodiments, the time gap between the first and second transmission units is fixed and predetermined. Operation proceeds from step 1506 to step 1508.

In step 1508, the first communications device monitors the second transmission unit to detect a signal from the second device. Then, in step 1510, the first communications device proceeds differently as a function of the whether or not a signal from the second device was detected on the second transmission unit. If a signal from the second device was not detected on the second transmission unit, then operation proceeds from step 1510 to step 1512. In step 1512 the first device transmits data in a data transmission interval to the second device, said data transmission interval occurring subsequent to the second transmission unit.

Returning to step 1510, if a signal from the second device was detected on the second transmission unit then operation proceeds from step 1510 to step 1514. In step 1514, the first device receives data from the second device during said data transmission interval occurring subsequent to said second transmission unit.

Operation proceeds from step 1512 or step 1514 to end step 1550. In some embodiments, operation proceeds from step 1512 or step 1514 back to step 1504, e.g., for a repeat of flowchart steps for operation pertaining to a subsequent data transmission interval.

In some embodiments, prior to step 1512, there is a step of monitoring for a transmission request response signal, e.g., an RX echo signal, from the second device, and if a response signal is detected then operation proceeds to step 1512; otherwise operation proceeds to step 1550.

Figure 16:
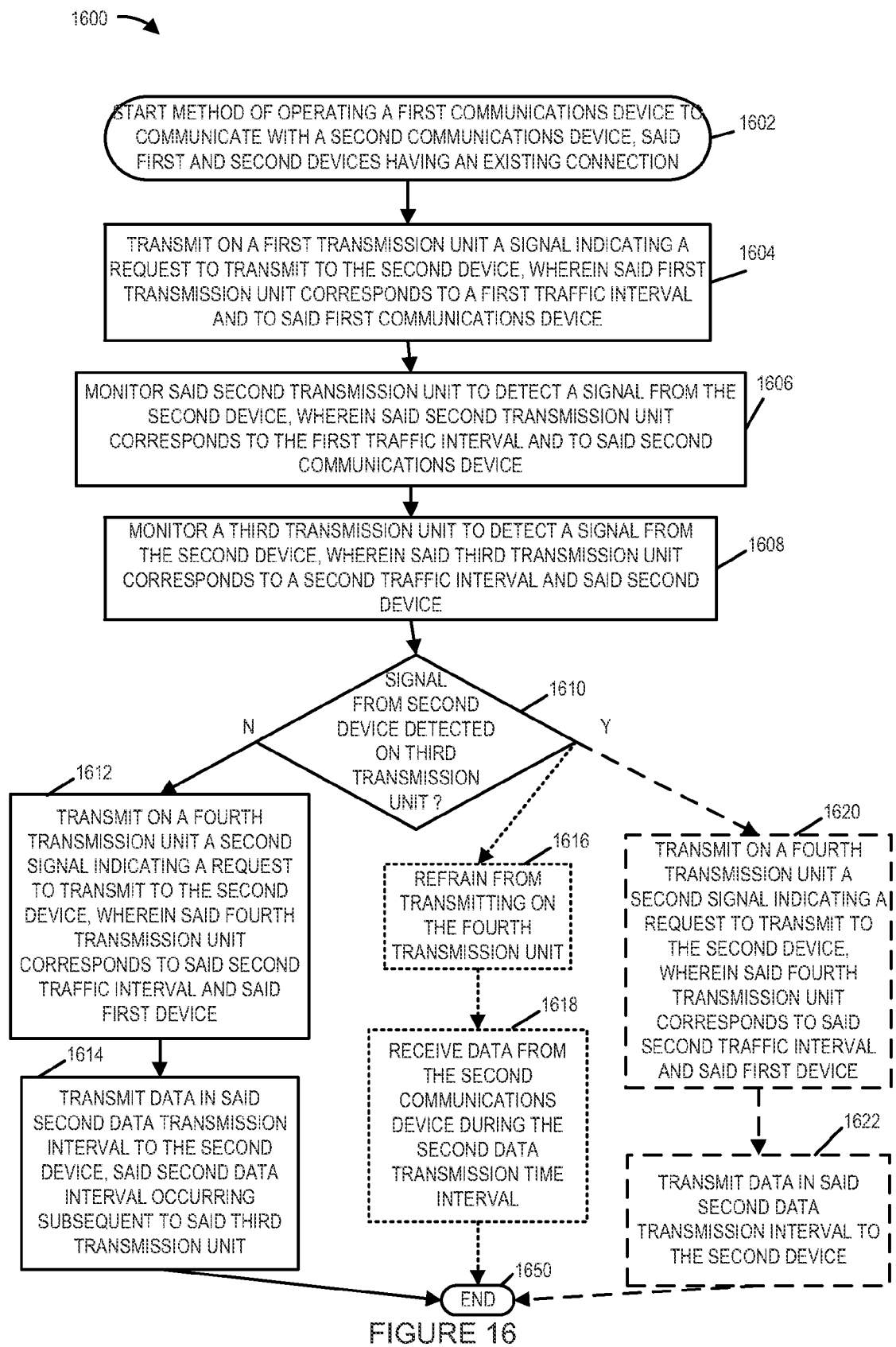
FIG. 16 is a flowchart of an exemplary method of operating a first communications device to communicate with a second communications device in accordance with various embodiments.

FIG. 16 is a flowchart 1600 of an exemplary method of operating a first communications device to communicate with a second communications device. The first and second communications devices are, e.g., peer to peer wireless communications devices. The first and second communications devices are communications devices in a system having a plurality of transmission units, each transmission unit communicating at least one symbol, a first pair of said transmission units corresponding to a first pair of communications devices, said first pair of communications devices including said first and second communications devices, the first and second communications devices having an existing connection, said first pair of transmission units including a first transmission unit corresponding to the first device and a second transmission unit corresponding to the second device, the first and second transmission units being non-overlapping in time, the first transmission unit preceding the second transmission unit.

The first and second transmission units correspond to a first traffic interval, the plurality of transmission units further include third and fourth transmission units corresponding to a second traffic interval, said third transmission unit corresponding to the second device said fourth transmission unit corresponding to the first device, said third and fourth transmission units being non-overlapping in time, the third transmission unit preceding the fourth transmission unit.

Operation of the exemplary method starts in step 1602 and proceeds to step 1604. In step 1604, the first communications device transmits on a first transmission unit a signal indicating a request to transmit to the second device, wherein said first transmission unit corresponds to a first traffic interval and to said first communications device. Operation proceeds from step 1604 to step 1606. In step 1606, the first device monitors the second transmission unit to detect a signal from the second device, wherein said second transmission unit corresponds to the first traffic interval and the second communications device. Operation proceeds from step 1606 to step 1608.

In step 1608, the first communications device monitors a third transmission unit to detect a signal from the second device, wherein said third transmission unit corresponds to a second traffic interval and said second device. Operation proceeds from step 1608 to step 1610.

In step 1610, the first communications device checks if a signal from the second device was detected on the third transmission unit. If a signal from the second device was not detected on the third transmission unit, then operation proceeds from step 1610 to step 1612. In step 1612, the first device transmits on a fourth transmission unit a second signal indicating a request to transmit to the second device, wherein said fourth transmission unit corresponds to the second traffic interval and the first device. Operation proceeds from step 1612 to step 1614. In step 1614, the first device transmits data in said second data transmission interval to the second device, said second data interval occurring subsequent to said third transmission unit. Operation proceeds from step 1614 to end step 1650.

Returning to step 1610, in step 1610 if a signal from the second device is detected on the third transmission unit, then operation proceeds from step 1610 to one or step 1616 and 1620. Steps 1616 and 1618 represent an embodiment, where the first communications device cannot override the request of the second communications device which is detected on the third transmission unit. Steps 1620 and 1622 represent an alternative embodiment in which the first device can override the request of the second communications device which is detected on the third transmission unit.

Returning to step 1616, in step 1616 the first device refrains from transmitting in the fourth transmission unit. Then, in step 1618 the first device receives data from the second communications device during the second data transmission time interval. Operation proceeds from step 1618 to end step 1650.

Returning to step 1620, in step 1620 the first device transmits on a fourth transmission unit a second signal indicating a request to transmit to the second device, wherein said fourth transmission unit corresponds to said second traffic interval and said first device. Operation proceeds from step 1620 to step 1622. In step 1622 the first device transmits data in said second data transmission interval to the second device. Operation proceeds from step 1622 to end step 1650.

In some embodiments, operation proceeds from step 1614, 1618 or 1622 back to step 1604, e.g., for a repeat of flowchart steps for operation pertaining to a subsequent pair of data transmission intervals.

In some embodiments, prior to step 1614 and step 1622 a step of monitoring for a transmission request response signal, e.g., an RX echo signal, from the second communications device is performed, and if a response signal from the first device is detected then operation proceeds to step 1614 or step 1622; otherwise operation proceeds to end step 1650. In some embodiments, prior to step 1618 the first device transmits a request response signal, e.g., an RX echo signal, to the second communications device.

Figure 17:
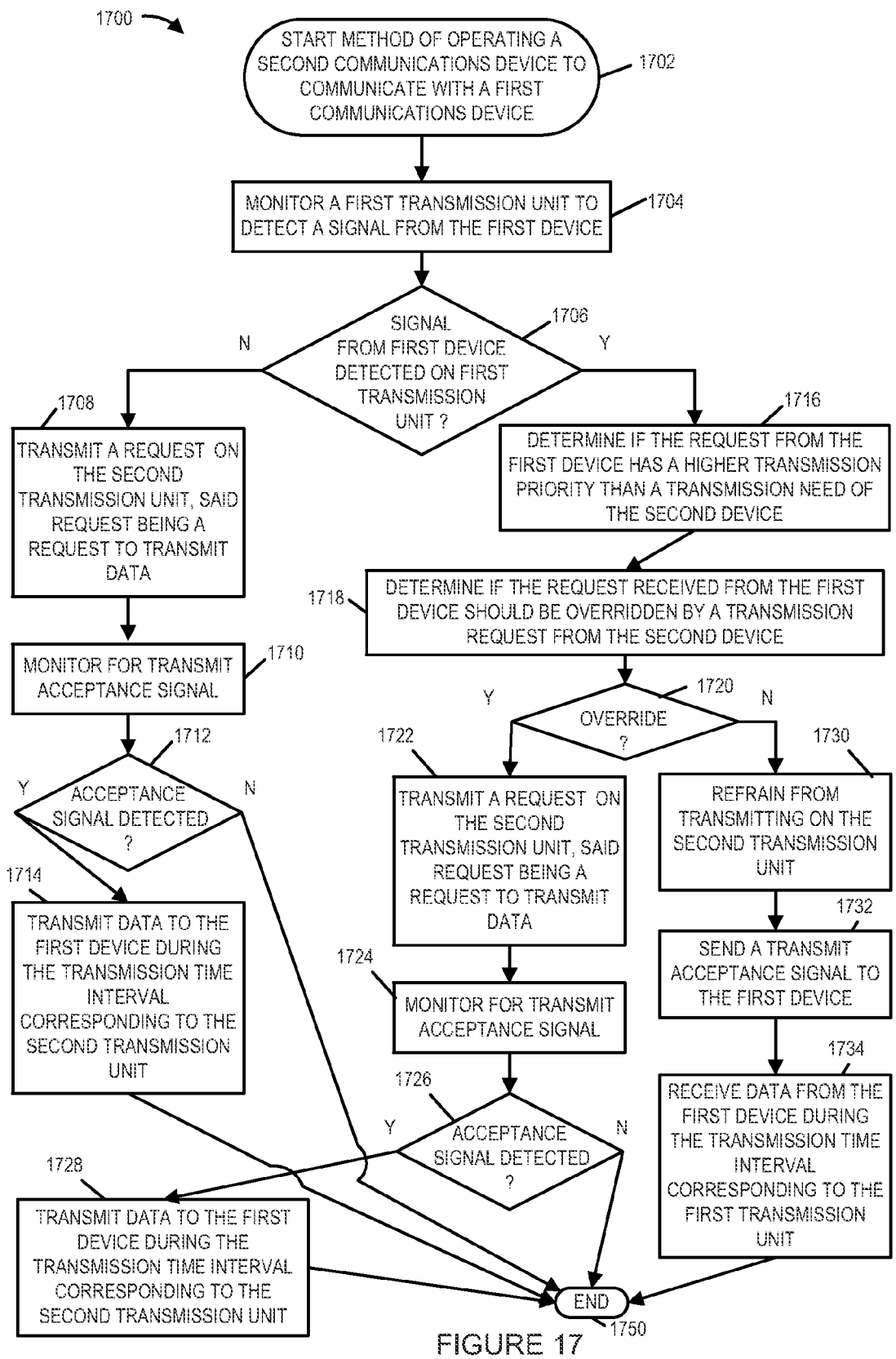
FIG. 17 is a flowchart of an exemplary method of operating a second communications device to communicate with a first communications device in accordance with various embodiments.

FIG. 17 is a flowchart 1700 of an exemplary method of operating a second communications device to communicate with a first communications device. The first and second communications devices are, e.g., peer to peer wireless communications devices. The first and second communications devices are in a system having a plurality of transmission units, each transmission unit communicating at least one symbol, a first pair of said transmission units correspond to a first pair of communications devices, said first pair of communications devices including said first and second communications devices, the first and second communications devices having an existing connection, said first pair of transmission units including a first transmission unit corresponding to the first device and a second transmission unit corresponding to the second device, the first and second transmission units being non-overlapping in time, the first transmission unit preceding the second transmission unit.

Operation of the exemplary method starts in step 1702 and proceeds to step 1704. In step 1704, the second communications device monitors a first transmission unit to detect a signal from the first device. Then, in step 1706 the second communications device proceeds differently depending upon whether or not the second communications device has detected a signal from the first communications device.

If the second communications device has not detected a signal from the first communication device on the first transmission unit, then operation proceeds from step 1706 to step 1708. However, if the second communications device has detected a signal from the first device on the first transmission unit, then operation proceeds from step 1706 to step 1716.

Returning to step 1708, in step 1708 the second communications device transmits a request on the second transmission unit, said request being a request to transmit data. Operation proceeds from step 1708 to step 1710. In step 1710, the second communications device monitors for a transmit acceptance signal. In step 1712, the second communications devices checks if an acceptance signal was detect, and if it was detected, then operation proceeds from step 1712 to step 1714. If an acceptance signal was not detected, then operation proceeds from step 1712 to end step 1750.

Returning to step 1714, in step 1714, the second communications device transmits data to the first device during the transmission traffic time interval corresponding to the second transmission unit.

Returning to step 1716, in step 1716 the second communications device determines if the request from the first device has a higher transmission priority than a transmission need of the second device. In various embodiments, the priority of the transmission need of the second device is a function of the priority of data at said second device waiting to be transmitted. Then, in step 1718, the second communications device determines if the request received from the first device should be overridden by a transmission request from the second device. Operation proceeds from step 1718 to step 1720.

In step 1720 the second device proceeds differently as a function of the override determination decision of step 1718. If second device has decided to override, then operation proceeds from step 1720 to step 1722; otherwise, if the second device has decided not to override, then operation proceeds from step 1720 to step 1730.

Returning to step 1722, in step 1722 the second communications device transmits a request on the second transmission unit, said request being a request to transmit data. Then, in step 1724, the second communications device monitors for a transmit acceptance signal. Operation proceeds from step 1724 to step 1726. In step 1726, the second communications device proceeds differently depending upon whether or not the acceptance signal was detected. If the acceptance signal was detected, then operation proceeds from step 1726 to step 1728, where the second communications device transmits data to the first device during the transmission time interval corresponding to the second transmission unit, and then operation proceeds to end step 1750. However if the acceptance signal was not detected then operation proceeds from step 1726 to end step 1750.

Returning to step 1730, in step 1730 the second communications device refrains form transmitting on the second transmission unit and in step 1732 the second communications device sends a transmit acceptance signal to the first device. Operation proceeds from step 1732 to step 1734, in which the second device receives data from the first device during the transmission time interval corresponding to the first transmission unit. Operation proceeds from step 1734 to end step 1750.

In various embodiments, the transmission time interval corresponding to the second transmission unit and the transmission time interval corresponding to first transmission unit are the same. In some such embodiments, the transmission time interval corresponding to both the first and second transmission units is a traffic transmission time interval used for conveying user data between peer to peer wireless communications devices.

In some embodiments, operation proceeds from step 1714, 1728, 1726 (no condition) or 1734 back to step 1704, e.g., for a repeat of flowchart steps for operation pertaining to a subsequent slot including another first transmission unit, second transmission unit and corresponding data transmission interval.

Figure 18:
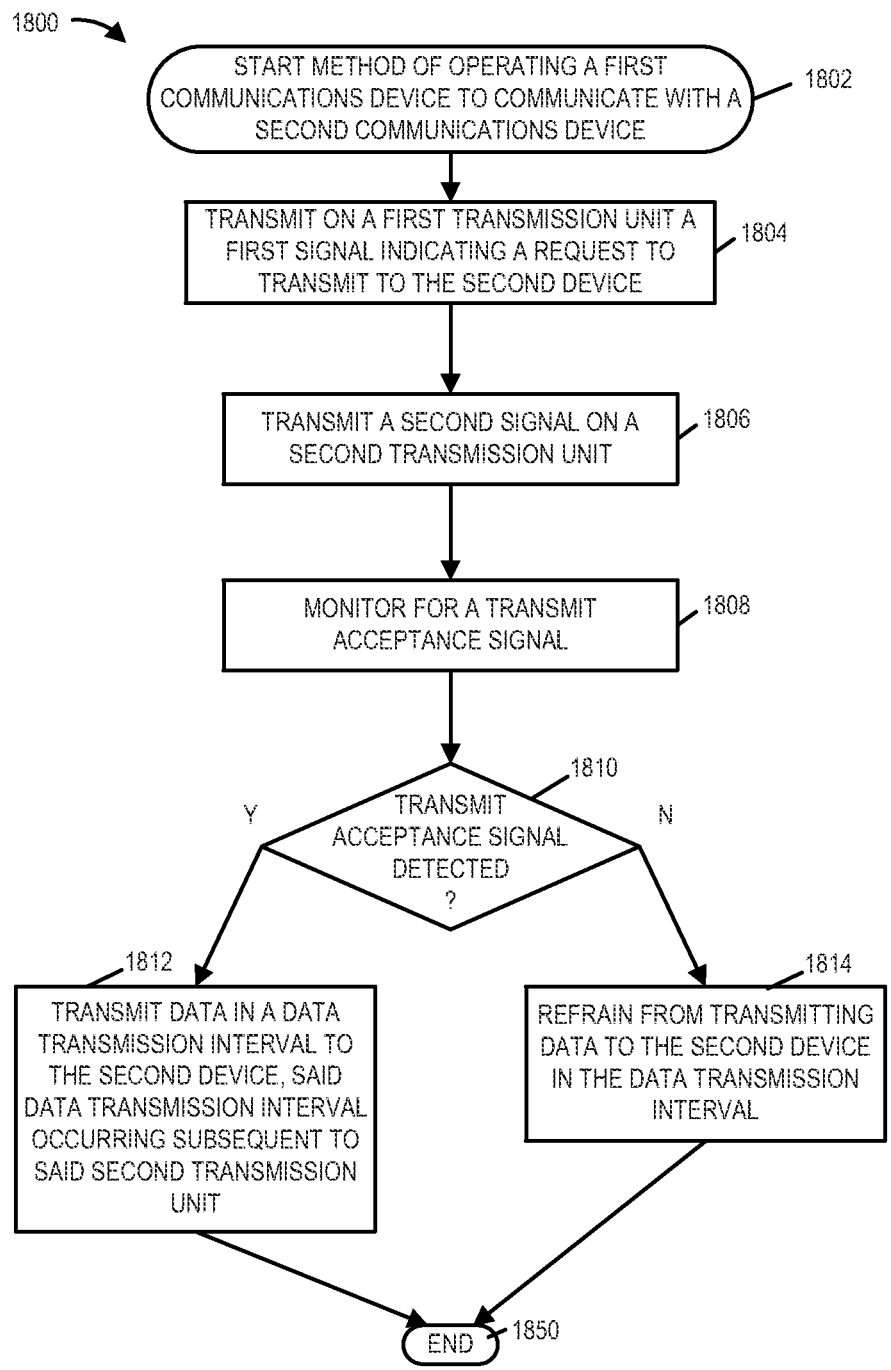
FIG. 18 is a flowchart of an exemplary method of operating a first communications device to communicate with a second communications device in accordance with various embodiments.

FIG. 18 is a flowchart 1800 of an exemplary method of operating a first communications device to communicate with a second communications device. The first and second communications devices are, e.g., peer to peer wireless terminals. The first and second communications devices are in a system having a plurality of transmission units, each transmission unit communicates at least one symbol, a first pair of said transmission units corresponding to a first pair of communications devices, said first pair of communications devices including said first and second communications devices, the first pair of communications devices including a first communications device and a second communications device, the first and second communications devices having an existing connection, said first pair of transmission units including a first transmission unit corresponding to the first device and a second transmission unit corresponding to the second device, the first and second transmission units being non-overlapping in time, the first transmission unit preceding the second transmission unit. The exemplary method of flowchart 1800 is, e.g., a method in a peer to peer wireless communications system wherein the second device does not have the authority to transmit corresponding to a data transmission unit, e.g., a peer to peer traffic segment, if the first device requests to transmit into that data transmission unit.

Operation of the exemplary method starts in step 1802 and proceeds to step 1804. In step 1804, the first communications device transmits on a first transmission unit a first signal indicating a request to transmit to the second device. Then, in step 1806, the first communications device transmits a second signal on a second transmission unit. In some embodiments, the second signal conveys additional information corresponding to the data. In various embodiments, the additional information is quality of service information. In some embodiments, the addition information provides information about the transmit power level to be used to transmit data. In some embodiments, the additional information is interpreted based on both the first and second signals.

Operation proceeds from step 1806 to step 1808. In step 1808 the first communications device monitors for a transmit acceptance signal from the second communications device. Operation proceeds from step 1808 to step 1810. In step 1810, if the first device determines that a transmit acceptance signal has been detected from the second device during the monitoring of step 1808, then operation proceeds from step 1810 to step 1812; otherwise, operation proceeds from set 1810 to step 1814.

Returning to step 1810, in step 1810 the first communications device transmits data in a data transmission interval to the second device, said data transmission interval occurring subsequent to said second transmission unit. Operation proceeds from step 1812 to end step 1850. Returning to step 1814, in step 1814, the first communications device refrains from transmitting data to second device in the data transmission interval. Operation proceeds from step 1814 to end step 1850.

In some embodiments, operation proceeds from step 1812 or 1814 to step 1804, e.g., for a repeat of flowchart steps for operation pertaining to a subsequent slot including another first transmission unit, second transmission unit and corresponding data transmission interval.

In some embodiments, in which the first communications device transmits a first signal in the first transmission unit and a second signal in the second transmission unit, a codeword is communicated using the two units. In some embodiments, in which the first communications device transmits a first signal in the first transmission unit and a second signal in the second transmission unit, one of the two units is used to convey a reference and the other is used to convey information.

Figure 19:
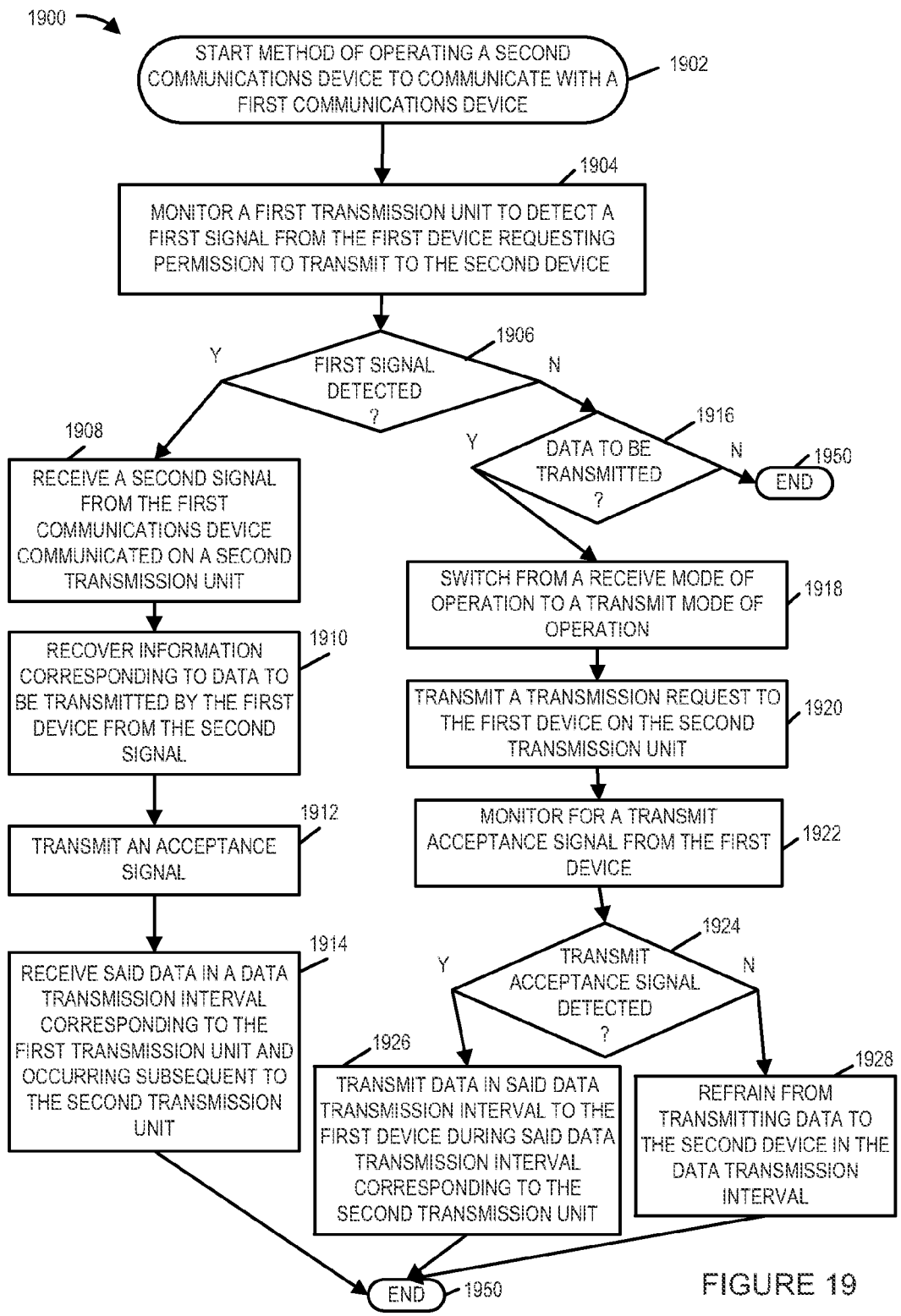
FIG. 19 is a flowchart of an exemplary method of operating a second communications device to communicate with a first communications device in accordance with various embodiments.

FIG. 19 is a flowchart 1900 of an exemplary method of operating a second communications device to communicate with a first communications device in accordance with various embodiments. The first and second communications devices are, e.g., peer to peer wireless communications devices. The first and second communications devices are communications devices in a system having a plurality of transmission units, each transmission unit communicating at least one symbol, a first pair of said transmission units corresponding to a first pair of communications devices, said first pair of communications devices including said first and second communications devices, the first and second communications devices having an existing connection, said first pair of transmission units including a first transmission unit corresponding to the first device and a second transmission unit corresponding to the second device, the first and second transmission units being non-overlapping in time, the first transmission unit preceding the second transmission unit.

Operation of the exemplary method starts in step 1902 and proceeds to step 1904. In step 1904, the second communications device monitors the first transmission unit to detect a first signal from the first device requesting permission to transmit to the second device. Operation proceeds from step 1904 to step 1906.

In step 1906, the second communications device proceeds differently depending upon whether or not the first signal was detected. If the second device detected the first signal from the first device, then operation proceeds from step 1906 to step 1908; otherwise, operation proceeds from step 1906 to step 1916.

In step 1908, the second device receives a second signal from the first communications device communicated on a second transmission unit. Operation proceeds from step 1908 to step 1910.

In step 1910, the second communications device recovers information corresponding to data to be transmitted by the first device from the second signal. In some embodiments additional information obtained from the recovery is interpreted based on both the first and second signals. In some embodiments, the additional information is quality of service information. In some embodiments, the additional information provides information about the transmit power to be used to transmit data. Operation proceeds from step 1910 to step 1912. In step 1912, the second communications device transmits an acceptance signal to the first communications device. Operation proceeds from step 1912 to step 1914.

In step 1914, the second device receives said data in a data transmission interval corresponding to the first transmission unit and occurring subsequent to the second transmission unit.

Returning to step 1916, in step 1916, the second device considers whether or not it has data to be transmitted. If the second device has data to be transmitted, operation proceeds from step 1916 to step 1918. If the second communications device does not have data to be transmitted, then operation proceeds to end step 1950.

Returning to step 1918, in step 1918, the second device switches from a receive mode of operation to a transmit mode of operation. In some embodiments, during a receive mode of operation transmitter functionality is disabled. In some embodiments, switching from a receive mode of operation to a transmit mode of operation includes disabling receiver operation and enabling transmitter operation. Then, in step 1920, the second device transmits a transmission request to the first device on the second transmission unit. Operation proceeds from step 1920 to step 1922. In step 1932 the second communications device monitors for a transmit acceptance signal from the first device. Operation proceeds from step 1922 to step 1924.

In step 1924, the second device determines if a transmit acceptance signal has been detected from the first communications device during the monitoring of step 1922, and proceeds differently depending upon the determination. If a transmit acceptance signal was detected, then operation proceeds from step 1924 to step 1926; otherwise operation proceeds from step 1924 to step 1928.

In step 1926 the second device transmits data in said data transmission interval to the first device during data transmission interval corresponding to the second transmission unit. Operation proceeds from step 1926 to end step 1950.

Returning to step 1928, in step 1928 the second communications device refrains from transmitting data to the second device in the data transmission interval. Operation proceeds from step 1928 to end step 1950.

In some embodiments, operation proceeds from step 1914, 1926 or 1928 to step 1904 instead of to end step 1950, e.g., for a repeat of flowchart steps for operation pertaining to a subsequent slot including another first transmission unit, second transmission unit and corresponding data transmission interval.

In some embodiments, in which the second communications device receives a first signal in the first transmission unit and a second signal in the second transmission unit, both from the first device, a codeword is communicated using the two units. In some embodiments, in which the second communications device receives a first signal in the first transmission unit and a second signal in the second transmission unit, both from the first device, one of the two units is used to convey a reference and the other is used to convey information.

Figure 20:
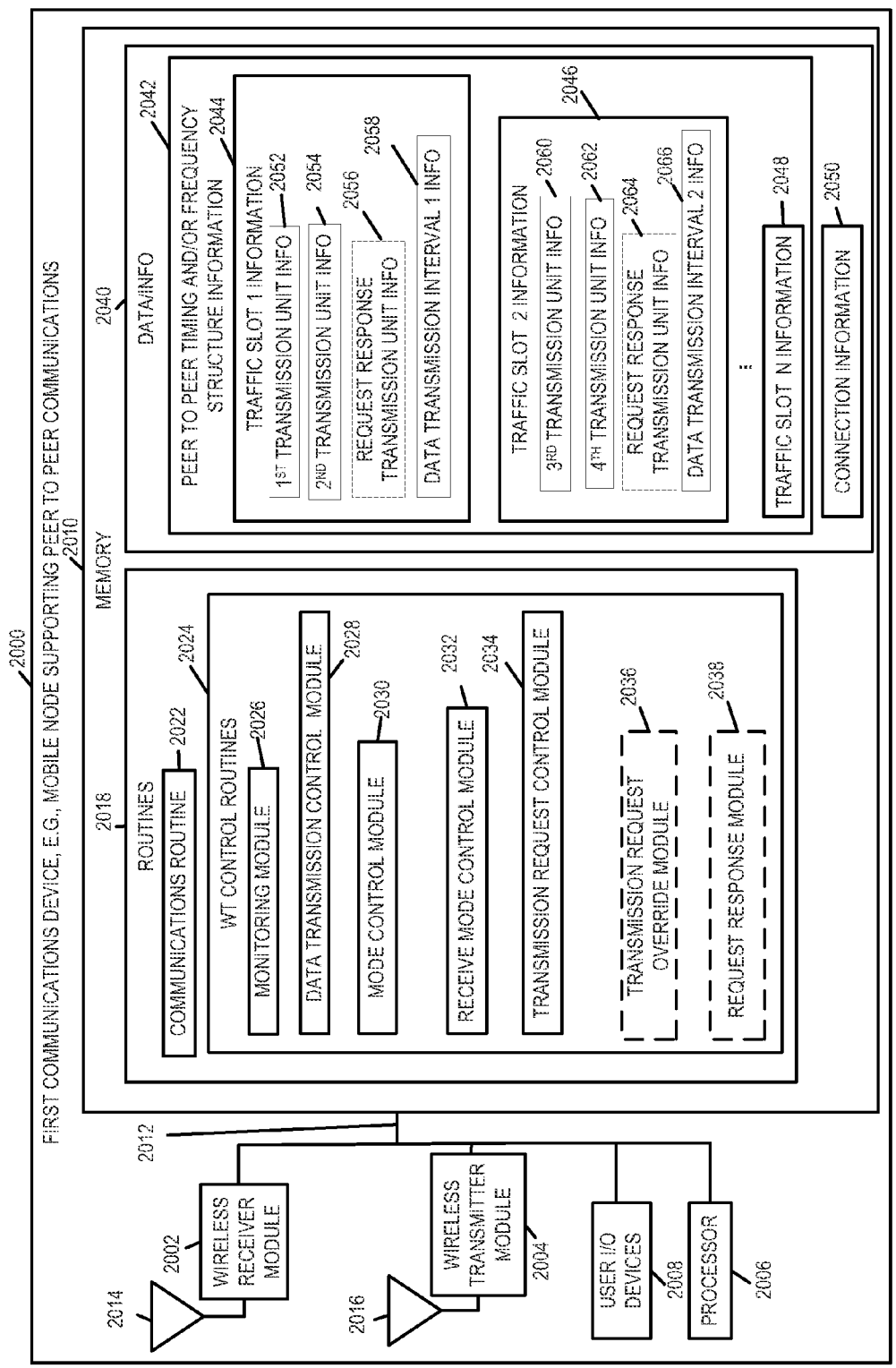
FIG. 20 is a drawing of an exemplary first communications device in accordance with various embodiments.

FIG. 20 is a drawing of an exemplary first communications device 2000 in accordance with various embodiments. First communications device 2000 is, e.g., a wireless mobile communications device supporting peer to peer communications. The first communications device 2000 is for use in a system including a second communications device supporting peer to peer communications, said system having a plurality of transmission units, each transmission unit communicating at least one symbol, a first pair of said transmission units corresponding to a first pair of communications devices having a connection, said first pair of communications devices including said first and second communications devices, said first pair of transmission units including a first transmission unit corresponding to the first device and a second transmission unit corresponding to the second device, the first and second transmission units being non-overlapping in time, the first transmission unit preceding the second transmission unit.

First communications device 2000 includes a wireless receiver module 2002, a wireless transmitter module 2004, user I/O devices 2008, a processor 2006 and memory 2010 coupled together via a bus 2012 via which the various elements may interchange data and information.

Wireless receiver module 2002, e.g., an OFDM receiver, is coupled to receive antenna 2014 via which the communications device 2000 receives signals from other communications devices, e.g., a second communications device supporting peer to peer communications. Wireless receiver module 2002 receives data from the second communications device during the data transmission interval occurring subsequent to the second transmission unit when a signal from the second device has been detected on the second transmission unit. In some embodiments, the wireless receiver module 2002 is for receiving data from the second communications device during a second data transmission time interval when a transmission request received from the second communications device has been accepted.

Wireless transmitter module 2004, e.g., an OFDM transmitter, is coupled to transmit antenna 2016 via which the communications device transmits signals to other communications devices, e.g., a second communications device supporting peer to peer communications. Wireless transmitter module 2004 is for transmitting on a first transmission unit a signal indicating a request to transmit to the second communications device. Wireless transmitter module 2004 is also for transmitting on the fourth transmission unit a second signal indicating a request to transmit to the second communications device.

User I/O devices 2008 include, e.g., a microphone, keyboard, keypad, camera, speaker, display, etc. User I/O devices 2008 allow a user of communications device 2000 to input data/information, access output data/information, and control at least some functions of the communications device 2000.

Memory 2010 includes routines 2018 and data/information 2040. The processor 2006, e.g., a CPU, executes the routines 2018 and uses the data/information 2040 in memory 2010 to control the operation of the first communications device 2000 and implement methods, e.g., the method of flowchart 1500 of FIG. 15 or the method of flowchart 1600 of FIG. 16. Routines 2018 include a communications routine 2022 and wireless terminal control routines 2024. The communications routine 2022 implements the various communications protocols used by the first communications device 2000.

Wireless terminal control routines 2024 include a monitoring module 2026, a data transmission control module 2028, a mode control module 2030, a receive mode control module 2032, and a transmission request control module 2034. In some embodiments, the wireless terminal control routines 2034 include one or more of a transmission request override module 2036 and a request response module 2038.

Data/information 2040 includes peer to peer timing and/or frequency structure information 2042 and connection information 2050. The peer to peer timing and/or frequency structure information 2042 includes information corresponding to a plurality of traffic slots in a recurring peer to peer structure (traffic slot 1 information 2044, traffic slot 2 information 2046, . . . traffic slot N information 2048). Traffic slot 1 information 2044 includes $1^{st}$ transmission unit information 2052, $2^{nd}$ transmission unit information 2054, and data transmission interval 1 information 2058. In some embodiments, traffic slot 1 information 2044 includes request response transmission unit information 2056. Traffic slot 2 information 2046 includes $3^{rd}$ transmission unit information 2060, $4^{th}$ transmission unit information 2062, and data transmission interval 2 information 2066. In some embodiments, traffic slot 2 information 2046 includes request response transmission unit information 2064.

Monitoring module 2026 monitors the second transmission unit to detect a signal, e.g., a transmission request, from the second communications device. Monitoring module 2026 is also for monitoring the third transmission unit to detect a signal, e.g., a transmission request signal, from the second device. In various embodiments, the monitoring module 2026 outputs an indication indicating whether or not a signal was detected from the second communications device on the transmission unit being monitored when the first communications device has a connection with the second communications device.

Data transmission control module 2028 controls the wireless transmitter module 2004 to transmit data in a data transmission interval to the second communications device when the first device has transmitted a signal indicating a request on the first transmission unit and a signal from the second communications device has not been detected on the second transmission unit, said data transmission interval occurring subsequent to the second transmission unit. Data transmission control module 2028 also controls the wireless transmitter module 2004 to transmit data in a second data transmission interval to the second device occurring subsequent to the fourth transmission interval following a request signal communicated by the first device on the fourth transmission unit.

Mode control module 2030 switches between a transmit mode of operation and receive mode of operation during a time gap between the first and second transmission units. In some embodiments, the time gap is at least one microsecond. In some embodiments, the time gap is at least one symbol in duration. In various embodiments, the time gap is fixed and predetermined.

Receive mode control module 2032 controls transmission mode functionality to be disabled when operating in a receive mode of operation.

Transmission request control module 2034 is for controlling the wireless transmitter module 2004 to transmit on the fourth transmission unit a second signal indicating a request to transmit to the second device when said first communications device has data to transmit to the second communications device and when a signal from the second device has not been detected by the monitoring module 2026 on the third transmission unit. In some embodiments, the transmission request control module 2034 controls the wireless transmitter module 2004 to refrain from transmitting on the fourth transmission unit when a signal from the second device is detected on the third transmission unit.

Transmission request override module 2036 is for controlling the wireless device 2000 to transmit on the fourth transmission unit a second signal indicating a request to transmit to the second device when a signal from the second device is detected on the third transmission unit and when the first device has data to transmit to the second communications device.

Request response module 2038 generates a response signal, e.g., an RX echo signal signifying a positive response, to be transmitted in response to a transmission request signal which has been received. For example, in response to a transmission request signal from the second communications device received on the second transmission unit the request response module 2038 generates an RX echo signal and controls communication of the RX echo signal on the request response transmission unit identified by information 2056. Similarly, in response to a transmission request signal from the second communications device received on the third transmission unit, which is not being overridden, the request response module 2038 generates an RX echo signal and controls communication of the RX echo signal on the request response transmission unit identified by information 2064.

Request response module 2038 also identifies received request responses from the second communications device in response to a request to transmit from the first communications device. For example, consider that the first communications device 2000 has transmitted a request on the $1^{st}$ transmission unit 2052, and the request has not been overridden and the request was accepted, the first communications device 2000 expects to identify an RX echo signal from the second communications device communicated on the request response transmission unit identified by information 2056. Similarly, consider that the first communications device has transmitted a request on the $4^{th}$ transmission unit 2062, and the request was accepted, the first communications device 2000 expects to identify an RX echo signal from the second communications device communicated on the request response transmission unit identified by information 2064.

$1^{st}$ transmission unit information 2052 includes information identifying a time position of the first transmission unit in the timing structure and information identifying frequency information corresponding to the $1^{st}$ transmission unit. $2^{nd}$ transmission unit information 2054 includes information identifying a time position of the second transmission unit in the timing structure and information identifying frequency information corresponding to the $2^{nd}$ transmission unit. Request response transmission unit information 2056 includes information identifying a time position of a request response air link resource corresponding to both the $1^{st}$ and $2^{nd}$ transmission units in the timing structure and information identifying frequency information for the request response air link resource. Data transmission interval 1 information 2058 includes information identifying a time position of data transmission interval 1 in the timing structure and information identifying frequency information for the data transmission interval. In some embodiments, the data transmission interval 1 information 2058 identifies a peer to peer traffic segment linked with a request which may be communicated using the $1^{st}$ transmission unit or the $2^{nd}$ transmission unit.

$3^{rd}$ transmission unit information 2060 includes information identifying a time position of the third transmission unit in the timing structure and information identifying frequency information corresponding to the $3^{rd}$ transmission unit. $4^{th}$ transmission unit information 2062 includes information identifying a time position of the fourth transmission unit in the timing structure and information identifying frequency information corresponding to the $4^{th}$ transmission unit. Request response transmission unit information 2064 includes information identifying a time position of a request response air link resource corresponding to both the $3^{rd}$ and $4^{th}$ transmission units in the timing structure and information identifying frequency information for the request response air link resource. Data transmission interval 2 information 2066 includes information identifying a time position of data transmission interval 2 in the timing structure and information identifying frequency information for the data transmission interval. In some embodiments, the data transmission interval 2 information 2066 identifies a peer to peer traffic segment linked with a request which may be communicated using the $3^{rd}$ transmission unit or the $4^{th}$ transmission unit.

Connection information 2050 includes information identifying an ongoing peer to peer connection which first communications device 2000 currently has, e.g., a connection with the second communications device. In various embodiments, the air link resources used to carry transmission requests and/or transmission request response signals are a function of a connection identifier. For example, if the first communications device 2000 had a connection with a third communications device instead of the second communications device, information (2052, 2054, 2056) for traffic slot 1 and information (2060, 2062, 2064), in some embodiments, identify different air link resources.

In some embodiments, 1st, $2^{nd}$, $3^{rd}$ and $4^{th}$ transmission unit information (2052, 2054, 2060, 2062) each identify a single different OFDM tone-symbol in a recurring timing structure. In some embodiments, the data transmission interval 1 information identifies a peer to peer traffic segment including at least 10 OFDM tone-symbols.

Figure 21:
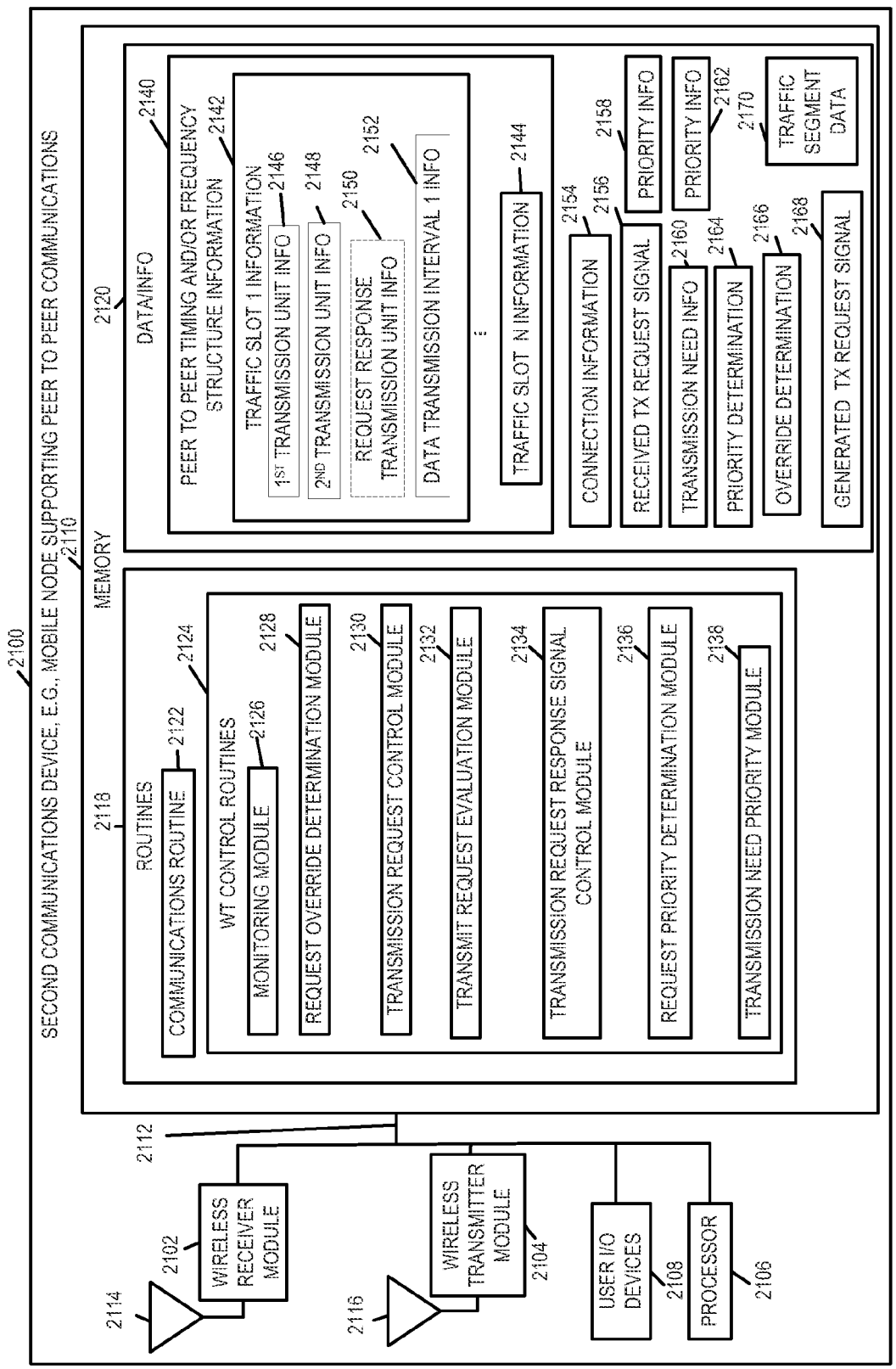
FIG. 21 is a drawing of an exemplary second communications device in accordance with various embodiments.

FIG. 21 is a drawing of an exemplary second communications device 2100 in accordance with various embodiments. Second communications device 2100 is, e.g., a wireless mobile communications device supporting peer to peer communications. The second communications device 2100 is for use in a system including a first communications device supporting peer to peer communications, said system having a plurality of transmission units, each transmission unit communicating at least one symbol, a first pair of said transmission units corresponding to a first pair of communications devices having a connection, said first pair of communications devices including said first and second communications devices, said first pair of transmission units including a first transmission unit corresponding to the first device and a second transmission unit corresponding to the second device, the first and second transmission units being non-overlapping in time, the first transmission unit preceding the second transmission unit.

First communications device 2100 includes a wireless receiver module 2102, a wireless transmitter module 2104, user I/O devices 2108, a processor 2106 and memory 2110 coupled together via a bus 2112 via which the various elements may interchange data and information.

Wireless receiver module 2102, e.g., an OFDM receiver, is coupled to receive antenna 2114 via which the communications device 2100 receives signals from other communications devices, e.g., a first communications device supporting peer to peer communications. Wireless receiver module 2102 receives transmission request from other peer to peer devices, request response signals from other peer to peer devices, and traffic data segment signals from other peer to peer devices, e.g., from the first communications device which has a connection with the second communications device 2100. Wireless receiver module 2102 receives, at times, a transmit acceptance signal transmitted in response to a transmission request signal in a time period subsequent to the sending of the request to transmit data, the request having been sent on the second transmission unit. For example, transmit acceptance signal is received on the air link resource identified by request response transmission unit information 2150. Wireless receiver module 2102 is also for receiving data during the transmission time interval corresponding to the first transmission unit when the transmission request evaluation module 2132 determines that a received request should be accepted.

Wireless transmitter module 2104, e.g., an OFDM transmitter, is coupled to transmit antenna 2116 via which the communications device 2100 transmits signals to other communications devices, e.g., to a first communications device supporting peer to peer communications. In some embodiments, the same antenna is used for transmitter and receiver. Wireless transmitter module 2104 transmits a request to transmit data, the request being transmitted on the second transmission unit, when a signal from the first communications device is not detected on the first transmission unit and when the second device 2100 has data to transmit to the first device. The wireless transmitter module 2104 also transmits data to the first device during the transmission time interval corresponding to the second transmission unit following a transmitted request on the second transmission unit. In some embodiments, the wireless transmitter module 2104 transmits data to the first device during the transmission time interval corresponding to the second transmission unit in response to a received transmit acceptance signal. In some such embodiments, if the second communications device 2100 does not recover a transmit acceptance signal in response to a transmit request communicated on the $2^{nd}$ transmission unit, the wireless transmitter module 2104 does not transmit data to the first device during the transmission time interval corresponding to the second transmission unit.

User I/O devices 2108 include, e.g., a microphone, keyboard, keypad, camera, speaker, display, etc. User I/O devices 2108 allow a user of communications device 2100 to input data/information, access output data/information, and control at least some functions of the communications device 2100.

Memory 2110 includes routines 2118 and data/information 2120. The processor 2106, e.g., a CPU, executes the routines 2118 and uses the data/information 2120 in memory 2110 to control the operation of the second communications device 2100 and implement a method, e.g. the method of flowchart 1700 of FIG. 17. Routines 2118 include a communications routine 2122 and wireless terminal control routines 2124. The communications routine 2122 implements the various communications protocols used by the second communications device 2100.

Wireless terminal control routines 2124 include a monitoring module 2126, a request override determination module 2128, a transmission request control module 2130, a transmit request evaluation module 2132, a transmission request response signal control module 2134, a request priority determination module 2136, and a transmission need priority module 2138. Data/information 2120 includes peer to peer timing and/or frequency structure information 2140, connection information 2154, a received TX request signal 2156 and associated priority information 2158, transmission need information 2160 and associated priority information 2162, a priority determination indicator 2164, an override determination 2166, a generated TX request signal 2168 and traffic segment data 2170.

Peer to peer timing and/or frequency structure information 2140 includes a plurality of sets of information corresponding to different indexed traffic slots in a recurring peer to peer structure (traffic slot 1 information 2142, . . . , traffic slot N information 2144). Traffic slot 1 information 2142 includes $1^{st}$ transmission unit information 2146, second transmission unit information 2148 and data transmission interval 1 information 2144. In some embodiments, traffic slot 1 information 2142 includes request response transmission unit information 2150.

Monitoring module 2126 monitors the first transmission unit to detect a signal from a first communications device, e.g., a traffic transmission request signal from the first device requesting permission to transmit traffic data in a corresponding traffic data segment to the second communications device 2100. In various embodiments, the monitoring module 2166 outputs and indicator indicating whether or not a signal was detected from the first communications device in the first transmission unit when the second communications device has a connection with the first communications device.

Request override determination module 2128 determines if a transmission request received from the first device should be overridden by a transmission request from the second device when a signal from the first device is detected on the first transmission unit by the monitoring module 2126, the detected signal being a transmission request. Request override determination module 2128 uses the determination from the request priority determination module 2136 to make an override determination.

Transmission request control module 2130 controls the wireless transmitter module 2104 to transmit a request to transmit data on the second transmission unit when the request override determination module 2128 determines that the request received from the first device should be overridden. If the transmission request override determination module 2128 determines that the request received from the first device should not be overridden, the transmission request control module 2130 controls the wireless transmitter module 2104 to refrain from transmitting on the second transmission unit.

Transmission request evaluation module 2132 determines if a received transmission request should be accepted or rejected. Transmission request evaluation module 2132 performs a determination as a function of interference information. Transmission request evaluation module 2132 also performs the determination as a function of a request override determination, in instances where the second communications device has data that it would like to communicate to the first communications device. If it has been decided to override the transmission request from the first device, then the transmission request from the first device is rejected. A transmission request from the first device can be, and sometimes is, rejected on the basis of interference considerations, e.g., interference that would be generated to other communications in the system and/or interference from other communications that is anticipated to interfere with the recovery of data being sent to the second communications device should the first device being allowed to transmit traffic data to the second device in the corresponding data traffic interval.

Transmission request response signal control module 2134 controls the wireless transmitter module 2104 to send a transmit acceptance signal to the first device at a point in time following the received first transmission unit when the transmit request evaluation module 2132 determines that a received request should be accepted, e.g., sends a transmit acceptance signal such as an RX echo signal in the time interval and using the frequency identified by request response transmission unit information 2150.

Request priority determination module 2136 determines if a transmission request from the first device has a higher transmission priority than a transmission need of the second device. Transmission need priority module 2138 determines the priority of the transmission need of the second device as a function of the priority of data at the second device waiting to be transmitted.

$1^{ST}$ transmission unit information 2146 identifies an air link resource, e.g., an OFDM tone symbol, in a peer to peer timing/frequency structure used to carry a transmission request from the first communications device to the second communications device, the transmission request being a request to transmit traffic data signals to the second communications device 2100 using air link resources identified by data transmission interval 1 information 2152, e.g., a first peer to peer traffic segment. $2^{nd}$ transmission unit information 2148 identifies an air link resource, e.g., an OFDM tone symbol, in a peer to peer timing/frequency structure used to carry a transmission request from the second communications device 2100 to the first communications device, the transmission request being a request to transmit traffic data signals to the first communications device using air link resources identified by data transmission interval 1 information 2152, e.g., a first peer to peer traffic segment. Request response transmission unit information 2150 identifies an air link resource, e.g., an OFDM tone-symbol, in a peer to peer timing/frequency structure used to carry a positive response to a request received from in one of the first and second transmission units. In various embodiments, the resources are structured in time such that the $1^{st}$ transmission unit precedes the second transmission unit, and the $2^{nd}$ transmission unit precedes the request response transmission unit, and the request response transmission unit precedes the data transmission interval.

Connection information 2154 includes information identifying the peer to peer communications device with which the second communications device has an existing connection, e.g., the first communications device. Received transmission request signal 2156 is a signal transmitted by the first communications device using the air link resource of the $1^{st}$ transmission unit, which has been detected by the monitoring module 2126. Priority information 2158, which is associated with the received TX request signal 2156, is an output of request priority determination module 2136. Transmission need information 2160 is, e.g., information identifying an amount of backlog of traffic information waiting to be communicated to the first communications device, information identifying latency information associated with the backlog of traffic waiting to be communicated to the first communications device, information identifying the type of traffic, e.g., voice traffic, non-voice traffic such as image data/information and text data/information, etc., waiting to be transmitted to the first communications device, quality of service levels associated with traffic waiting to be communicated to the first communications device, and/or service levels associated with the traffic waiting to be communicated to the first communications device. Transmission need information 2160 is an input to transmission need priority module 2138, while priority information 2162 is an output of transmission need priority module. Override determination 2166 is an output of request override determination module 2128. Generated transmission request signal 2168 is a generated signal communicating a request to transmit traffic to the first communications device which is which is transmitted under the control of transmission request control module 2128.

Traffic segment data 2170 corresponding to a traffic segment, e.g., a traffic segment identified by data transmission interval 1 information 2152, is one of received peer to peer traffic signals from the first communications device or peer to peer traffic signals to be transmitted to the first communications device depending upon whether the determinations for the traffic slot have resulted in the first or second communications device being authorized to use the traffic segment, as a result of the implemented request/response signaling protocol.

Figure 22:
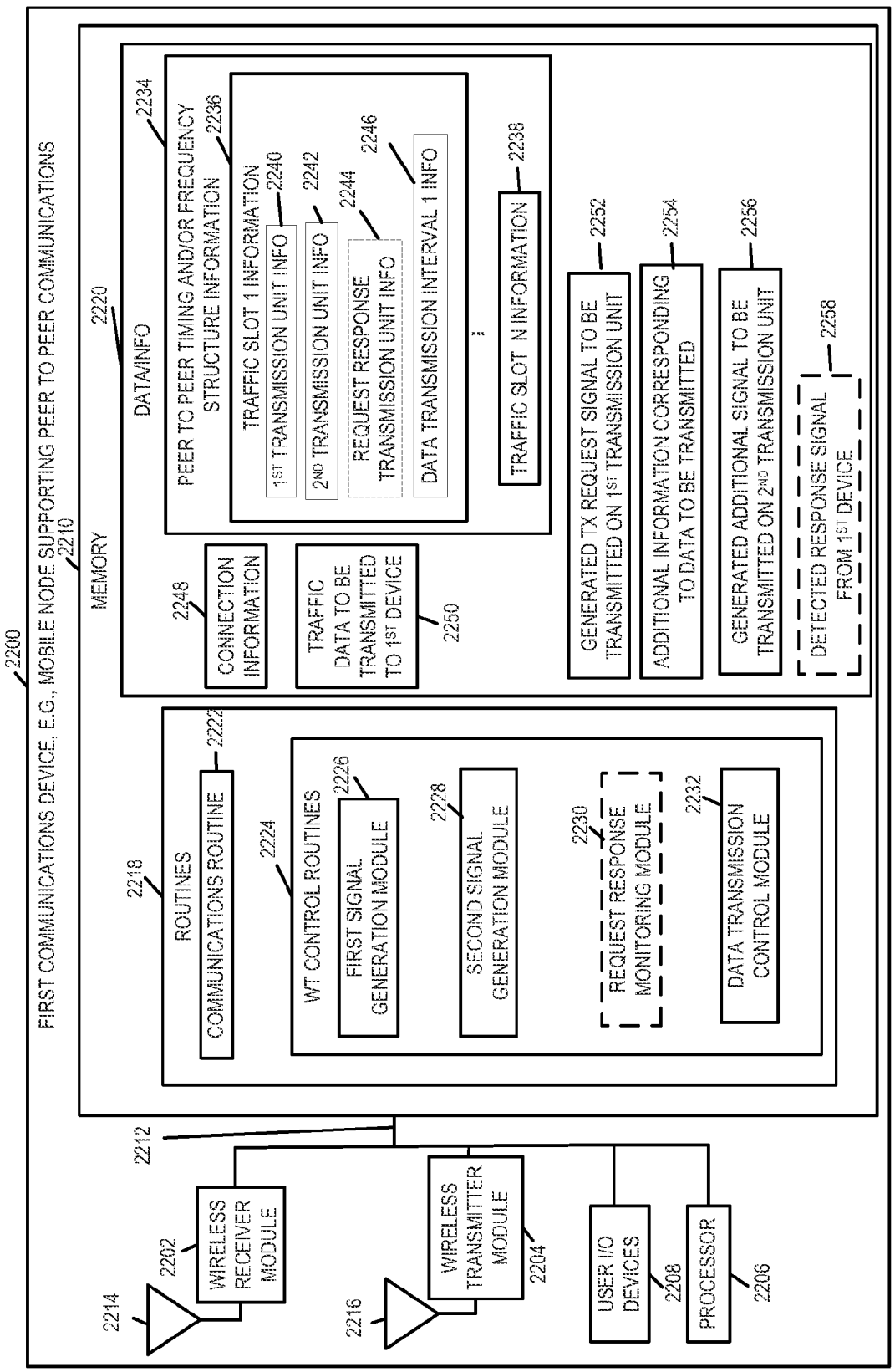
FIG. 22 is a drawing of an exemplary first communications device in accordance with various embodiments.

FIG. 22 is a drawing of an exemplary first communications device 2200 in accordance with various embodiments. First communications device 2200 is, e.g., a wireless mobile communications device supporting peer to peer communications. The first communications device 2200 is for use in a system including a second communications device supporting peer to peer communications, said system having a plurality of transmission units, each transmission unit communicating at least one symbol, a first pair of said transmission units corresponding to a first pair of communications devices having a connection, said first pair of communications devices including said first and second communications devices, said first pair of transmission units including a first transmission unit corresponding to the first device and a second transmission unit corresponding to the second device, the first and second transmission units being non-overlapping in time, the first transmission unit preceding the second transmission unit.

First communications device 2200 includes a wireless receiver module 2202, a wireless transmitter module 2204, user I/O devices 2208, a processor 2206 and memory 2210 coupled together via a bus 2212 via which the various elements may interchange data and information.

Wireless receiver module 2202, e.g., an OFDM receiver, is coupled to receive antenna 2214 via which the communications device 2200 receives signals from other communications devices, e.g., a second communications device supporting peer to peer communications.

Wireless transmitter module 2204, e.g., an OFDM transmitter, is coupled to transmit antenna 2216 via which the communications device 2200 transmits signals to other communications devices, e.g., a second communications device supporting peer to peer communications. Wireless transmitter module 2204 is for transmitting on the first transmission unit a first signal indicating a request to transmit to the second device and for transmitting data in a data transmission interval to the second device, said data transmission interval occurring subsequent to the second transmission unit. Wireless transmitter module 2204 is also for transmitting a second signal, e.g., a second signal conveying additional information corresponding to the request of the first transmission unit, in the second transmission unit prior to transmitting data in the data transmission interval.

User I/O devices 2208 include, e.g., a microphone, keyboard, keypad, camera, speaker, display, etc. User I/O devices 2208 allow a user of communications device 2200 to input data/information, access output data/information, and control at least some functions of the communications device 2200.

Memory 2210 includes routines 2218 and data/information 2220. The processor 2206, e.g., a CPU, executes the routines 2218 and uses the data/information 2220 in memory 2210 to control the operation of the first communications device 2200 and implement methods, e.g., the method of flowchart 1800 of FIG. 18.

Routines 2218 include a communications routine 2222 and wireless terminal control routines 2224. The communications routine 2222 implements the various communications protocols used by the first communications device 2200.

Wireless terminal control routines 2224 include a first signal generation module 2226, a second signal generation module 2228, a request response monitoring module 2230, in some embodiments, and a data transmission control module 2232.

Data/information 2220 includes peer to peer timing and/or frequency structure information 2234, connection information 2248, traffic data to be transmitted to the $1^{st}$ communications device 2250, a generated TX request signal to be transmitted on the $1^{st}$ transmission unit 2252, additional information corresponding to data to be transmitted 2254, and a generated additional signal to be transmitted on the $2^{nd}$ transmission unit 2256. In some embodiments, data/information 2220 includes a detected response signal from the $1^{st}$ device 2258.

Peer to peer timing and/or frequency structure information 2234 includes a plurality of sets of information corresponding to different indexed traffic slots in a recurring peer to peer structure (traffic slot 1 information 2236, . . . , traffic slot N information 223 8). Traffic slot 1 information 2236 includes $1^{st}$ transmission unit information 2240, second transmission unit information 2242 and data transmission interval 1 information 2246. In some embodiments, traffic slot 1 information 2236 includes request response transmission unit information 2244.

First signal generation module 2226 generates a first signal prior to transmitting the first signal using the wireless transmitter module 2204. For example, first signal generation module 2226 generates generated transmission request signal to be transmitted on the first transmission unit 2252, the generated signal to be communicated on the air link resource identified by $1^{st}$ transmission unit information 2240, the first signal being a TX request to the second communications device.

Second signal generation module 2228 generates a second signal. For example, from additional information corresponding to data, e.g., traffic data, to be transmitted 2254, the second signal generation module 2228 generates generated additional signal to be transmitted on the $2^{nd}$ transmission unit 2256. The generated second signal is to be communicated on the air link resource identified by $2^{nd}$ transmission unit information 2242.

In some embodiments, the additional information is interpreted based on both the first and second signals. In some embodiments, the additional information is communicated via both the first and second signals, e.g., a codeword is communicated using both the first and second signals to communicate information. In some embodiments, the additional information is quality of service information. In some embodiments, the additional information provides information about the transmit power level to be used to transmit data, e.g. peer to peer traffic data.

Request response monitoring module 2230, included in some embodiments, monitors for a transmit acceptance signal after transmitting said first signal and prior to transmitting said data, e.g., peer to peer traffic data. In various embodiments, the request monitoring module 2230 monitors for a transmit acceptance signal after transmitting the first and second signals and prior to transmitting the data, e.g., peer to peer traffic data.

Data transmission control module 2232 controls the transmission of data, e.g., peer to peer traffic data. In various embodiments including a request response monitoring module 2230, the data transmission control module 2232 controls the transmitter module 2204 to refrain from transmitting data when a transmit acceptance signal is not detected by the request response monitoring module 2230.

Consider an exemplary embodiment including request response monitoring module 2230. Consider that the first communications device 2200 wants to transmit peer to peer data traffic to the second communications device in traffic slot 1 of the peer to peer timing/frequency structure being used by the communications system. The first communications device 2200 generates a TX request signal which it transmits using the transmission unit, e.g., OFDM tone-symbol identified by 2240. Then, since the first communications device transmitted a request in the first transmission unit, the first communications device 2200 also is scheduled to use the $2^{nd}$ transmission unit, e.g., the OFDM symbol identified by $2^{nd}$ transmission unit information 2242, to convey and additional signal. Therefore, the communications device 2200 generates and transmits a second signal conveying additional information in the $2^{nd}$ transmission unit. The additional information is, e.g., quality of service information corresponding to peer to peer traffic that the first device intends to transmit to the second device or power level information corresponding to traffic that the first device intends to transmit to the second device. In this embodiment, if the first device 2200 had not transmitted a TX request on the first transmission unit, then the second transmission unit would have been designated to carry a TX request from the second device to the first device should the $2^{nd}$ device desire to transmit traffic data to the first device during this traffic slot.

Continuing with the example, where the first communications device 2200 transmitted the first signal, which was a TX request, on the first transmission unit and a second signal conveying additional information on the second transmission unit, subsequently, the first device 2200 monitors for a request response signal communicated on the air link resource, e.g., OFDM tone-symbol identified by request response transmission unit information 2244. If the first device 2200 receives a response, e.g., an RX echo signal, from the second device, signifying acceptance of the transmission request, then the first device 2200 transmits traffic data to be transmitted to the $1^{st}$ device 2250 on a peer to peer traffic data segment identified by data transmission interval 1 information 2246. However, if the first device 2200 does not recover a response signal, e.g., an RX echo, from the second device on the request response resource identified by information 2244, then the first communications device 2200 does not transmit the traffic data 2250 on the traffic data segment identified by information 2246.

Figure 23:
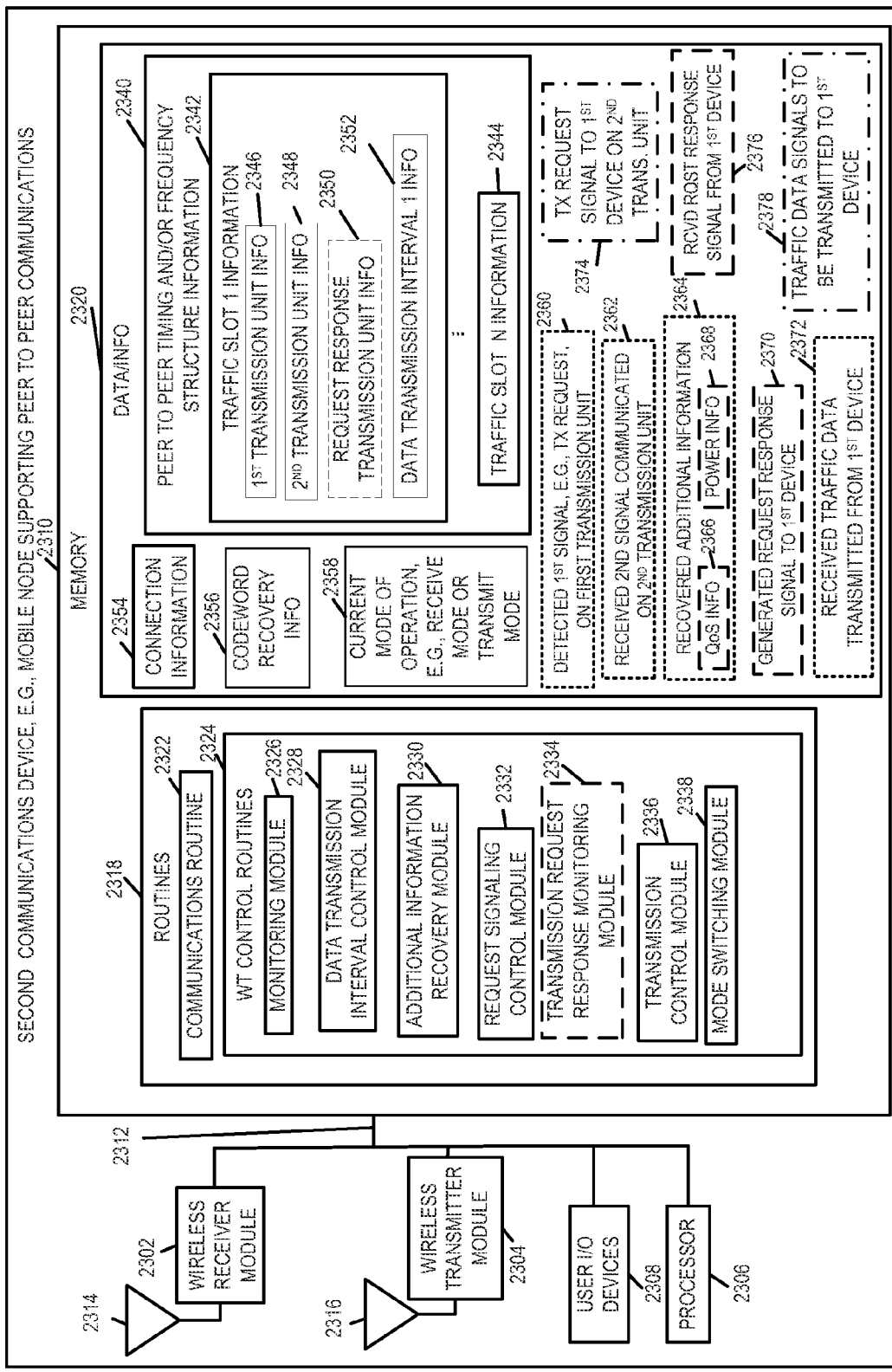
FIG. 23 is a drawing of an exemplary second communications device in accordance with various embodiments.

FIG. 23 is a drawing of an exemplary second communications device 2300 in accordance with various embodiments. Second communications device 2300 is, e.g., a wireless mobile communications device supporting peer to peer communications. The second communications device 2300 is for use in a system including a first communications device supporting peer to peer communications, said system having a plurality of transmission units, each transmission unit communicating at least one symbol, a first pair of said transmission units corresponding to a first pair of communications devices having a connection, said first pair of communications devices including said first and second communications devices, said first pair of transmission units including a first transmission unit corresponding to the first device and a second transmission unit corresponding to the second device, the first and second transmission units being non-overlapping in time, the first transmission unit preceding the second transmission unit.

First communications device 2300 includes a wireless receiver module 2302, a wireless transmitter module 2304, user I/O devices 2308, a processor 2306 and memory 2310 coupled together via a bus 2312 via which the various elements may interchange data and information.

Wireless receiver module 2302, e.g., an OFDM receiver, is coupled to receive antenna 2314 via which the communications device 2300 receives signals from other communications devices, e.g., a first communications device supporting peer to peer communications. Wireless receiver module 2302 is for receiving a first signal, e.g., signal 2360, from the first communications device communicated on the first transmission unit, e.g., identified by information 2346, and for receiving a second signal, e.g., signal 2362, received from the first communications device communicated on the second transmission unit, e.g., identified by information 2348.

Wireless transmitter module 2304, e.g., an OFDM transmitter, is coupled to transmit antenna 2316 via which the communications device 2300 transmits signals to other communications devices, e.g., a first communications device supporting peer to peer communications. In some embodiments, the same antenna is used for transmitter and receiver. In various embodiments, e.g., an embodiment including a request response transmission unit identified by request response transmission unit information, the wireless transmitter module 2304 conditionally transmits an acceptance signal after receiving a transmission request in the first transmission unit and prior to receiving corresponding traffic data in the corresponding data transmission interval. Wireless transmitter module 2304, at times, transmits traffic data to the first device during a data transmission time interval corresponding to the second transmission unit, when the wireless transmitter module 2304 has previously transmitted a transmission request, TX request, to the first device during the second transmission unit. In some embodiments, the traffic data transmission is conditional upon receiving a transmission request response signal, e.g., an RX echo signal from the first device.

User I/O devices 2308 include, e.g., a microphone, keyboard, keypad, camera, speaker, display, etc. User I/O devices 2308 allow a user of communications device 2300 to input data/information, access output data/information, and control at least some functions of the communications device 2300.

Memory 2310 includes routines 2318 and data/information 2320. The processor 2306, e.g., a CPU, executes the routines 2318 and uses the data/information 2320 in memory 2310 to control the operation of the second communications device 2300 and implement a method, e.g. the method of flowchart 1900 of FIG. 19. Routines 2318 include a communications routine 2322 and wireless terminal control routines 2324. The communications routine 2322 implements the various communications protocols used by the second communications device 2300.

Wireless terminal control routines 2324 include a monitoring module 2326, a data transmission interval control module 2328, an additional information recovery module 2330, a request signaling control module 2332, a transmission control module 2336, a mode switching module 2338, and, in some embodiments, a transmission request response monitoring module 2334.

Data information 2320 includes peer to peer timing and/or frequency structure information 2340, connection information 2354, codeword recovery information 2356, and information indicating a current mode of operation 2358, e.g., a receive mode or a transmit mode of operation. Peer to peer timing and/or frequency structure information 2340 includes a plurality of sets of information corresponding to different indexed traffic slots in a recurring peer to peer structure (traffic slot 1 information 2342, . . . , traffic slot N information 2344). Traffic slot 1 information 2342 includes $1^{st}$ transmission unit information 2346, second transmission unit information 2348 and data transmission interval 1 information 2352. In some embodiments, traffic slot 1 information 2342 includes request response transmission unit information 2350.

$1^{ST}$ transmission unit information 2346 identifies an air link resource, e.g., an OFDM tone symbol, in a peer to peer timing/frequency structure used to carry a transmission request from the first communications device to the second communications device, the transmission request being a request to transmit traffic data signals to the second communications device 2300 using air link resources identified by data transmission interval 1 information 2352, e.g., a first peer to peer traffic segment. $2^{nd}$ transmission unit information 2348 identifies an air link resource, e.g., an OFDM tone symbol, in a peer to peer timing/frequency structure used for different purposes at different times. If the $1^{st}$ transmission unit identified by information 2346 has been used to convey a transmission request from the $1^{st}$ device to the second device 2300, then the $2^{nd}$ transmission unit identified by information 2348 is used to carry additional information from the first device to the second device. However; if the $1^{st}$ transmission unit identified by information 2346 is not used to carry a request from the $1^{st}$ device to the $2^{nd}$ device 2300, then the $2^{nd}$ transmission unit may be used by the second device 2300 to carry a transmission request from the second communications device 2300 to the first communications device, the transmission request being a request to transmit traffic data signals to the first communications device using air link resources identified by data transmission interval 1 information 2352, e.g., a first peer to peer traffic segment. Request response transmission unit information 2350 identifies an air link resource, e.g., an OFDM tone-symbol, in a peer to peer timing/frequency structure used to carry a positive response to a request communicated in one of the first and second transmission units. In various embodiments, the resources are structured in time such that the $1^{st}$ transmission unit precedes the second transmission unit, and the $2^{nd}$ transmission unit precedes the request response transmission unit, and the request response transmission unit precedes the data transmission interval.

Connection information 2354 includes information identifying the peer to peer communications device with which the second communications device has an existing connection, e.g., the first communications device. Codeword recovery information 2356 includes stored decoding information used to recover information communicated via signals on the $1^{st}$ and $2^{nd}$ transmission units identified by information (2346, 2348), wherein the information is communicated via a codeword. Current mode of operation 2358 includes information identifying whether the second communications device 2300 is in a receive mode of operation or a transmit mode of operation.

Information (2360, 2362, 2664, 2372, and optionally 2370), which are at time included in data/information 2320, form a set of information corresponding to the case where the first communications device has transmitted a request to transmit to the second communications device 2300 corresponding to traffic slot 1. In this case the second communications device 2300 is in a receive mode of operation during time intervals corresponding to the $1^{st}$ transmission unit, the second transmission unit and the data transmission interval 1. However, during the time interval corresponding to the request response transmission unit the second communications device 2300 is controlled to be in a transmit mode of operation. Information 2360 is a detected $1^{st}$ signal, e.g., a TX request, communicated on the first transmission unit, while information 2362 is a received $2^{nd}$ signal communicated on the $2^{nd}$ transmission unit, the first and second signals being transmitted from the first communications device. The second signal being used to communicate addition information, e.g. quality of service information or power information. Recovered additional information 2364 represents information recovered from the received second signal 2362 by additional information recovery module 2330. In some embodiments, the recovered information includes one or more of quality of service information 2366 and power information 2368. Generated request response signal to $1^{st}$ device 2370 is a positive response signal, e.g., an RX echo signal, from the second device 2300 to the first device signifying that from the second device's perspective it is ok for the $1^{st}$ device to transmit peer to peer traffic signals in the data transmission interval identified by information 2352. Information 2372 is received traffic data transmitted from the $1^{st}$ device in the air link resource, e.g., peer to peer traffic segment, identified by data transmission interval 1 information 2352.

Information (2374, 2378, and optionally 2376), which are at times included in data/information 2320, form a set of information corresponding to the case where the second communications device has not detected a request from first communications device in the first transmission unit and has decided to transmit a request to transmit to the first communications device corresponding to traffic slot 1. In this case the second communications device 2300 is in a receive mode of operation during time intervals corresponding to the $1^{st}$ transmission unit, and the request response transmission unit. However, during the time interval corresponding to the second transmission unit and the data transmission interval 1, the second communications device 2300 is controlled to be in a transmit mode of operation. Information 2374 is a transmission request signal, e.g., a TX request signal to the first device which is communicated on the $2^{nd}$ transmission unit identified by information 2348. Received request response signal from the $1^{st}$ device, e.g., a received RX echo signal from the first device in response to the TX request 2374, is a positive acknowledgment which allows the second device 2300 to proceed with the intended traffic data signal transmission in the interval identified by information 2352. Information 2378 represents peer to peer traffic data signals to be transmitted by the $2^{nd}$ device 2300 to the first device on the air link resource, e.g., peer to peer traffic segment, identified by information 2352.

Monitoring module 2326 monitors the first transmission unit to detect a first signal from the first device requesting transmission to transmit to the second device, e.g., during a corresponding peer to peer traffic segment associated with the request. In various embodiments, the monitoring module 2326 outputs an information indicating whether or not it has detected a request signal from the first communications device communicated on the first transmission unit when it has a connection with the first communications device.

Data transmission interval control module 2328 controls the second device to receive data in a data transmission interval corresponding to the first transmission unit and occurring subsequent to the second transmission unit, if a first signal is detected in the first transmission unit.

Additional information recovery module 2330 recovers additional information corresponding to the second signal, e.g., the signal communicated from the first device on the $2^{nd}$ transmission unit identified by information 2348. In some embodiments, the additional information recovery module 2330 interprets the additional information based on both the first and second signals, e.g., the signals communicated on the $1^{st}$ and $2^{nd}$ transmission units identified by information (2346, 2348) from the first communications device. In various embodiments, the additional information is quality of service information. In some embodiments, the additional information provides information about the transmit power used to transmit said data. In some embodiments, the additional information is communicated via a codeword communicated using both the first and second signals, e.g., the first and seconds signals corresponding to first and second transmission units identified by information (2346, 2348) convey in combination a codeword conveying information. In some embodiments, the first signal, e.g., the signal on the $1^{st}$ transmission unit is a reference signal and the additional information recovery module 2330 uses the reference signal to recover the additional information from the second signal.

Request signaling control module 2332 controls the wireless transmitter module 2304 to transmit a transmission request to the first device on the second transmission unit if a signal from the first device is not detected on the first transmission unit and there is data to be transmitted to the first device.

Transmission request response monitoring module 2334 monitors to receive a transmission acceptance signal from the first device subsequent to transmitting on the second transmission unit and prior to transmitting traffic data on the corresponding data transmission interval. Transmission control module 2336, e.g., a peer to peer traffic transmission control module, controls, in some embodiments, the transmitter module 2304 to refrain from transmitting data when a transmit acceptance signal is not received, e.g., when an RX echo signal is not received.

Mode switching module 2338 is for switching from a receive mode of operation to a transmit mode of operation during a time period between said first and second transmission units in a situation in which a transmission request from the first device directed to the second device 2300 is not received in the first transmission unit. Information 2358 identifies the current mode of operation of device 2300. In various embodiments, switching from a receive mode of operation to a transmit mode of operation includes disabling receiver operation and enabling transmitter operation.

In various embodiments, there is a linkage between the first transmission unit, second transmission unit and corresponding data transmission traffic interval such that a request from the $1^{st}$ device on the $1^{st}$ transmission unit and a request from the $2^{nd}$ device 2300 on the $2^{nd}$ transmission unit each convey a request to use the same data transmission traffic interval. However, the requesting protocol is such that there should be no conflict as to which of the first and second device is to transmit using the data transmission interval. For example, in one embodiment, if the first device transmits a request in the first transmission unit, the second device 2300 is precluded from issuing a request in the second transmission unit. Continuing with the example, if the first device does not transmit a request in the first transmission unit, the second device 2300 may, and sometimes does, transmit a request in the second transmission unit.

While described in the context of an OFDM system, the methods and apparatus of various embodiments are applicable to a wide range of communications systems including many non-OFDM and/or non-cellular systems. Some exemplary systems include a mixture of technologies utilized in the peer to peer signaling, e.g., some OFDM type signals and some CDMA type signals.

In various embodiments nodes described herein are implemented using one or more modules to perform the steps corresponding to one or more methods, for example, transmitting a peer to peer traffic transmission request signal in a first transmission unit, monitoring a second transmission unit to detect a peer to peer traffic transmission request signal, transmitting traffic signals in a traffic transmission interval corresponding to the request, monitoring the first transmission unit to detect a request signal, determining whether or not to override a received request, transmitting a request in the second transmission unit, encoding additional information corresponding to a request, and recovering additional information corresponding to a request. In some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s).

In some embodiments, the processor or processors, e.g., CPUs, of one or more devices, e.g., communications devices such as wireless terminals are configured to perform the steps of the methods described as being as being performed by the communications device. Accordingly, some but not all embodiments are directed to a device, e.g., communications device, with a processor which includes a module corresponding to each of the steps of the various described methods performed by the device in which the processor is included. In some but not all embodiments a device, e.g., communications device, includes a module corresponding to each of the steps of the various described methods performed by the device in which the processor is included. The modules may be implemented using software and/or hardware.

Numerous additional variations on the methods and apparatus described above will be apparent to those skilled in the art in view of the above descriptions. Such variations are to be considered within scope. The methods and apparatus of various embodiments may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods of various embodiments.

What is claimed is:

1. A method of operating a first communications device to communicate with a second communications device in a system having a plurality of transmission intervals, each transmission interval communicating at least one symbol, a first pair of said transmission intervals being utilized by a first pair of communications devices, said first pair of communications devices including said first and second communications devices, the first and second communications devices having an existing connection, said first pair of transmission intervals including a first transmission interval in which the first communications device can transmit and a second transmission interval in which the first communications device or the second communications device can transmit, the first and second transmission intervals being non-overlapping in time, the first transmission interval preceding the second transmission interval, the method comprising:
   transmitting on the first transmission interval a first signal indicating a request to transmit to said second communications device;
   transmitting data in a data transmission interval to the second communications device, said data transmission interval occurring subsequent to said second transmission interval; and
   transmitting a second signal from the first communications device to the second communications device in the second transmission interval, prior to transmitting the data in the data transmission interval, wherein the second signal conveys additional information corresponding to said data.

2. The method of claim 1, wherein said additional information is interpreted based on both the first and second signals.

3. The method of claim 1, wherein said additional information is quality of service information.

4. The method of claim 1, wherein said additional information provides information about the transmit power level to be used to transmit said data.

5. The method of claim 1, further comprising,
   monitoring for a transmit acceptance signal after transmitting said first signal and prior to transmitting said data.

6. The method of claim 5, wherein said step of transmitting data is not performed when a transmit acceptance signal is not received.

7. A first communications device for use in a system including a second communications device, said system having a plurality of transmission intervals, each transmission interval communicating at least one symbol, a first pair of said transmission intervals being utilized by a first pair of communications devices, said first pair of communications devices having a connection, said first pair of communications devices including said first and second communications devices, said first pair of transmission intervals including a first transmission interval in which the first communications device can transmit and a second transmission interval in which the first communications device or the second communications device can transmit, the first and second transmission intervals being non-overlapping in time, the first transmission interval preceding the second transmission interval, the first communications device comprising:
   a wireless transmitter module for transmitting on the first transmission interval a first signal indicating a request to transmit to said second communications device, and for transmitting data in a data transmission interval to the second communications device, said data transmission interval occurring subsequent to said second transmission interval;
   a first signal generation module for generating said first signal prior to transmitting said first signal; and
   a second signal generation module for generating a second signal, wherein said wireless transmitter module transmits said second signal from the first communications device to the second communications device in the second transmission interval prior to transmitting the data in the data transmission interval, wherein said second signal conveys additional information corresponding to said data.

8. The first communications device of claim 7, wherein said additional information is interpreted based on both the first and second signals.

9. The first communications device of claim 7, wherein said additional information is quality of service information.

10. The first communications device of claim 7, wherein said additional information provides information about the transmit power level to be used to transmit said data.

11. The first communications device of claim 7, further comprising:
    a request response monitoring module for monitoring for a transmit acceptance signal after transmitting said first signal and prior to transmitting said data.

12. The first communications device of claim 11, further comprising:
    a data transmission control module for controlling the transmission of data,
    and wherein said transmitter module is controlled to refrain from transmitting data when a transmit acceptance signal is not detected by said request response monitoring module.

13. A first communications device for use in a system including a second communications device, said system having a plurality of transmission intervals, each transmission interval communicating at least one symbol, a first pair of said transmission intervals being utilized by a first pair of communications devices, said first pair of communications devices having a connection, said first pair of communications devices including said first and second communications devices, said first pair of transmission intervals including a first transmission interval in which the first communications device can transmit and a second transmission interval in which the first communications device or the second communications device can transmit, the first and second transmission intervals being non-overlapping in time, the first transmission interval preceding the second transmission interval, the first communications device comprising:
    wireless transmitter means for transmitting on the first transmission interval a first signal indicating a request to transmit to said second communications device, and for transmitting data in a data transmission interval to the second communications device, said data transmission interval occurring subsequent to said second transmission interval;
    first signal generation means for generating said first signal prior to transmitting said first signal; and
    second signal generation means for generating a second signal, wherein said wireless transmitter means transmits said second signal from the first communications device to the second communications device in the second transmission interval prior to transmitting the data in the data transmission interval, wherein said second signal conveys additional information corresponding to said data.

14. A non-transitory computer readable medium embodying machine executable instruction for controlling a first communications device to implement a method of communicating with a second communications device in a system having a plurality of transmission intervals, each transmission interval communicating at least one symbol, a first pair of said transmission intervals being utilized by a first pair of communications devices, said first pair of communications devices including said first and second communications devices, the first and second communications devices having an existing connection, said first pair of transmission intervals including a first transmission interval in which the first communications device can transmit and a second transmission interval in which the first communications device or the second communications device can transmit, the first and second transmission intervals being non-overlapping in time, the first transmission interval preceding the second transmission interval, the method comprising:
- transmitting on the first transmission interval a first signal indicating a request to transmit to said second communications device;
- transmitting data in a data transmission interval to the second communications device, said data transmission interval occurring subsequent to said second transmission interval; and
- transmitting a second signal from the first communications device to the second communications device in the second transmission interval prior to transmitting the data in the data transmission interval, wherein said second signal conveys additional information corresponding to said data.

15. An apparatus comprising:
a processor for use in a first communications device which communicates with a second communications device in a system having a plurality of transmission intervals, each transmission interval communicating at least one symbol, a first pair of said transmission intervals being utilized by a first pair of communications devices, said first pair of communications devices including said first and second communications devices, the first and second communications devices having an existing connection, said first pair of transmission intervals including a first transmission interval in which the first communications device can transmit and a second transmission interval in which the first communications device or the second communications device can transmit, the first and second transmission intervals being non-overlapping in time, the first transmission interval preceding the second transmission interval, the processor configured to control the first communications device to:
- transmit on the first transmission interval a first signal indicating a request to transmit to said second communications device;
- transmit data in a data transmission interval to the second communications device, said data transmission interval occurring subsequent to said second transmission interval; and
- transmit a second signal from the first communications device to the second communications device in the second transmission interval, prior to transmitting the data in the data transmission interval, wherein said second signal conveys additional information corresponding to said data.

16. A method of operating a second communications device to communicate with a first communications device in a system having a plurality of transmission intervals, each transmission interval communicating at least one symbol, a first pair of said transmission intervals being utilized by a first pair of communications devices, said first pair of communications devices including said first and second communications devices, the first and second communications devices having an existing connection, said first pair of transmission intervals including a first transmission interval in which the first communications device can transmit and a second transmission interval in which the first communications device or the second communications device can transmit, the first and second transmission intervals being non-overlapping in time, the first transmission interval preceding the second transmission interval, the method comprising:
- monitoring the first transmission interval to detect a first signal from the first communications device requesting permission to transmit to the second communications device;
- if the first signal is detected in the first transmission interval, receiving data in a data transmission interval corresponding to the first transmission interval and occurring subsequent to said second transmission interval;
- receiving a second signal from the first communications device communicated on the second transmission interval; and
- recovering additional information corresponding to said data from said second signal.

17. The method of claim 16, wherein said additional information is interpreted based on both the first and second signals.

18. The method of claim 16, wherein said additional information is quality of service information.

19. The method of claim 16, wherein said additional information provides information about a transmit power level to used to transmit said data.

20. The method of claim 16, further comprising,
transmitting an acceptance signal after receiving the first signal in said first transmission interval and prior to receiving said data.

21. The method of claim 16, wherein if the first signal from the first device is not detected in the first transmission interval and there is data to be transmitted from the second device to the first device,
transmitting a transmission request to the first device on the second transmission interval.

22. The method of claim 21, further comprising:
transmitting said data to be transmitted to the first device during a data transmission interval corresponding to the second transmission interval.

23. The method of claim 22, wherein said data transmission interval corresponding to the first transmission interval is the data transmission interval corresponding to the second transmission interval.

24. The method of claim 22, further comprising:
monitoring to receive a transmission acceptance from the first device subsequent to transmitting on the second transmission interval and prior to transmitting said data.

25. The method of claim 24, wherein said step of transmitting data is not performed when a transmit acceptance signal is not received.

26. The method of claim 21, further comprising, during a time period between said first and second transmission intervals, switching from a receive mode of operation to a transmit mode of operation.

27. The method of claim 26, wherein switching from a receive mode of operation to a transmit mode of operation includes disabling receiver operation and enabling transmitter operation.

28. A second communications device for use in a communications system including a first communications device, said system having a plurality of transmission intervals, each transmission interval communicating at least one symbol, a first pair of said transmission intervals being utilized by a first pair of communications devices having a connection, said first pair of communications devices including said first and second communications devices, said first pair of transmission intervals including a first transmission interval in which the first communications device can transmit and a second transmission interval in which the first communications device or the second communications device can transmit, the first and second transmission intervals being non-overlapping in time, the first transmission interval preceding the second transmission interval, the second communications device comprising:
- a monitoring module for monitoring the first transmission interval to detect a first signal from the first communications device requesting permission to transmit to the second communications device;
- a data transmission interval control module for controlling said second communications device to receive data in a data transmission interval corresponding to the first transmission interval and occurring subsequent to said second transmission interval, if the first signal is detected in the first transmission interval;
- a wireless receiver module for receiving said first signal from the first communications device communicated on the first transmission interval and for receiving a second signal from the first communications device communicated on the second transmission interval; and
- an additional information recovery module for recovering additional information corresponding to said data from said second signal.

29. The second communications device of claim 28, wherein said additional information recovery module interprets said additional information based on both the first and second signals.

30. The second communications device of claim 28, wherein said additional information is quality of service information.

31. The second communications device of claim 28, wherein said additional information provides information about a transmit power level to used to transmit said data.

32. The second communications device of claim 28, wherein said additional information is communicated via a codeword communicated using both said first and second signals.

33. The second communications device of claim 28, wherein said first signal is a reference signal and wherein said additional information recovery module uses said reference signal to recover said additional information from said second signal.

34. The second communications device of claim 28, further comprising:
- a wireless transmitter module for transmitting an acceptance signal after receiving the first signal in said first transmission interval and prior to receiving said data.

35. The second communications device of claim 28, further comprising:
- a wireless transmitter module for transmitting signals to said first communications device; and
- a request signaling control module for controlling said wireless transmitter to transmit a transmission request to the first device on the second transmission interval if the first signal from the first device is not detected in the first transmission interval and there is data to be transmitted from the second device to the first device.

36. The second communications device of claim 35, wherein said wireless transmitter module transmits said data to be transmitted to the first device during a data transmission interval corresponding to the second transmission interval.

37. The second communications device of claim 36, wherein said data transmission interval corresponding to the first transmission interval is the data transmission interval corresponding to the second transmission interval.

38. The second communications device of claim 36, further comprising:
- a transmission request response monitoring module for monitoring to receive a transmission acceptance from the first device subsequent to transmitting on the second transmission interval and prior to transmitting said data.

39. The second communications device of claim 38 further comprising:
- a transmission control module and wherein said transmission control module controls said transmitter module to refrain from transmitting data when a transmit acceptance signal is not received.

40. The second communications device of claim 35, further comprising:
- a mode switching module for switching from a receive mode of operation to a transmit mode of operation during a time period between said first and second transmission intervals.

41. The second communications device of claim 40, wherein switching from a receive mode of operation to a transmit mode of operation includes disabling receiver operation and enabling transmitter operation.

42. A second communications device for use in a communications system including a first communications device, said system having a plurality of transmission intervals, each transmission interval communicating at least one symbol, a first pair of said transmission intervals being utilized by a first pair of communications devices having a connection, said first pair of communications devices including said first and second communications devices, said first pair of transmission intervals including a first transmission interval in which the first communications device can transmit and a second transmission interval in which the first communications device or the second communications device can transmit, the first and second transmission intervals being non-overlapping in time, the first transmission interval preceding the second transmission interval, the second communications device comprising:
- monitoring means for monitoring the first transmission interval to detect a first signal from the first communications device requesting permission to transmit to the second communications device;
- data transmission interval control means for controlling said second communications device to receive data in a data transmission interval corresponding to the first transmission interval and occurring subsequent to said second transmission interval, if the first signal is detected in the first transmission interval;
- wireless receiver means for receiving said first signal from the first communications device communicated on the first transmission interval and for receiving a second signal from the first communications device communicated on the second transmission interval; and additional information recovery means for recovering additional information corresponding to said data from said second signal.

43. A non-transitory computer readable medium embodying machine executable instructions for controlling a second communications device to implement a method of communicating with a first communications device in a system having a plurality of transmission intervals, each transmission interval communicating at least one symbol, a first pair of said transmission intervals being utilized by a first pair of communications devices, said first pair of communications devices including said first and second communications devices, the first and second communications devices having an existing connection, said first pair of transmission intervals including a first transmission interval in which the first communications device can transmit and a second transmission interval in which the first communications device or the second communications device can transmit, the first and second transmission intervals being non-overlapping in time, the first transmission interval preceding the second transmission interval, the method comprising:
- monitoring the first transmission interval to detect a first signal from the first communications device requesting permission to transmit to the second communications device;
- if the first signal is detected in the first transmission interval, receiving data in a data transmission interval corresponding to the first transmission interval and occurring subsequent to said second transmission interval;
- receiving a second signal from the first communications device communicated on the second transmission interval; and
- recovering additional information corresponding to said data from said second signal.

44. An apparatus comprising:
a processor for use in a second communications device which communicates with a first communications device in a system having a plurality of transmission intervals, each transmission interval communicating at least one symbol, a first pair of said transmission intervals being utilized by a first pair of communications devices, said first pair of communications devices including said first and second communications devices, the first and second communications devices having an existing connection, said first pair of transmission intervals including a first transmission interval in which the first communications device can transmit and a second transmission interval in which the first communications device or the second communications device can transmit, the first and second transmission intervals being non-overlapping in time, the first transmission interval preceding the second transmission interval, the processor configured to control the second communications device to:
monitor the first transmission interval to detect a first signal from the first communications device requesting permission to transmit to the second communications device;
if the first signal is detected in the first transmission interval, receive data in a data transmission interval corresponding to the first transmission interval and occurring subsequent to said second transmission interval;
receive a second signal from the first communications device communicated on the second transmission interval; and
recover additional information corresponding to said data from said second signal.

* * * * *